United States Patent
Scheuerell et al.

(10) Patent No.: US 12,257,990 B2
(45) Date of Patent: Mar. 25, 2025

(54) SYSTEMS AND METHODS FOR OPERATING AN ALL-TERRAIN VEHICLE

(71) Applicant: Polaris Industries Inc., Medina, MN (US)

(72) Inventors: Alex R. Scheuerell, Wyoming, MN (US); Jonathon P. Graus, Stacy, MN (US); Aidan B. Shaughnessy, Madison, AL (US); Michael F. Donoughe, Rochester, MI (US)

(73) Assignee: Polaris Industries Inc., Medina, MN (US)

( * ) Notice: Subject to any disclaimer, the term of this patent is extended or adjusted under 35 U.S.C. 154(b) by 803 days.

(21) Appl. No.: 17/235,322

(22) Filed: Apr. 20, 2021

(65) Prior Publication Data

US 2021/0323515 A1 Oct. 21, 2021

Related U.S. Application Data

(60) Provisional application No. 63/013,272, filed on Apr. 21, 2020.

(51) Int. Cl.
*B60T 7/12* (2006.01)
*B60K 17/06* (2006.01)
(Continued)

(52) U.S. Cl.
CPC .............. *B60T 7/12* (2013.01); *B60K 17/06* (2013.01); *B60K 35/22* (2024.01); *B60R 1/26* (2022.01);
(Continued)

(58) Field of Classification Search
CPC ..... B60R 1/00; B60R 1/26; B60R 2300/8066; B60K 17/06; B60K 17/344; B60K 17/348;
(Continued)

(56) References Cited

U.S. PATENT DOCUMENTS 5,176,234 A * 1/1993 Reik ..................... B60W 10/04
192/53.2
6,112,845 A * 9/2000 Oyama ................ B62D 5/0463
180/443

(Continued)

FOREIGN PATENT DOCUMENTS

CN 107031508 A 8/2017
CN 107433905 A 12/2017
(Continued)

OTHER PUBLICATIONS

International Preliminary Report on Patentability, issued by the International Searching Authority, dated Oct. 25, 2022, for International Patent Application No. PCT/US2021/028188; 9 pages.
(Continued)

*Primary Examiner* — John M Zaleskas
(74) *Attorney, Agent, or Firm* — Faegre Drinker Biddle & Reath LLP

(57) ABSTRACT

An all-terrain vehicle may include a frame and a plurality of ground-engaging members supporting the frame. The all-terrain vehicle may further include a powertrain assembly supported by the frame and shiftable transmission supported by the frame and operably coupled to the powertrain assembly. The all-terrain vehicle may also include a display, a back-up camera, and a controller supported by the frame. The controller may be configured to receive a signal from the shiftable transmission corresponding to the shiftable transmission being in a gear of the plurality of gears other than a reverse gear. Further, the controller may be configured to determine the all-terrain vehicle is moving backwards and send an activation signal to the back-up camera to display images of the back-up camera on the display.

19 Claims, 39 Drawing Sheets

(51) Int. Cl.
*B60K 35/22* (2024.01)
*B60R 1/26* (2022.01)
*G01P 13/00* (2006.01)

(52) U.S. Cl.
CPC ........ *G01P 13/00* (2013.01); *B60K 2360/167* (2024.01); *B60K 2360/173* (2024.01); *B60K 2360/176* (2024.01); *B60R 2300/8066* (2013.01); *B60T 2201/04* (2013.01); *B60T 2210/20* (2013.01); *B60T 2210/36* (2013.01); *B60T 2230/08* (2013.01); *B60T 2240/03* (2013.01); *B60T 2270/10* (2013.01)

(58) Field of Classification Search
CPC .............. B60K 23/08; B60K 2360/167; B60K 2360/173; B60K 2360/176; B60K 35/00; B60K 35/22; B60K 35/28; B60T 7/12; B60T 2201/04; B60T 2201/06; B60T 2210/36; B60T 2230/08; B60T 2270/10; B60T 2270/12
See application file for complete search history.

(56) References Cited

U.S. PATENT DOCUMENTS

| | | | |
|---|---|---|---|
| 7,712,845 B2 | 5/2010 | Mackovjak | |
| 10,717,501 B1 | 7/2020 | Gilhooley | |
| 2006/0250225 A1 | 11/2006 | Widmann et al. | |
| 2007/0267916 A1* | 11/2007 | Mackovjak | B60T 8/246 |
| | | | 303/146 |
| 2008/0049106 A1 | 2/2008 | Kallhammer et al. | |
| 2008/0068520 A1* | 3/2008 | Minikey | G02B 27/0101 |
| | | | 349/114 |
| 2008/0143833 A1 | 6/2008 | Yanai et al. | |
| 2009/0234543 A1* | 9/2009 | Groitzsch | B62D 15/0265 |
| | | | 701/45 |
| 2010/0318255 A1* | 12/2010 | Li | B60W 30/06 |
| | | | 701/31.4 |
| 2011/0301825 A1* | 12/2011 | Grajkowski | B60K 28/10 |
| | | | 180/54.1 |
| 2012/0133768 A1* | 5/2012 | Stephan | B60R 11/04 |
| | | | 348/148 |
| 2012/0152637 A1* | 6/2012 | Hapka | B60T 1/02 |
| | | | 180/233 |
| 2013/0069337 A1* | 3/2013 | Person | B60K 17/16 |
| | | | 280/124.156 |
| 2013/0211716 A1* | 8/2013 | Kellar | G01C 21/188 |
| | | | 701/472 |
| 2013/0250097 A1* | 9/2013 | Choi | B60K 35/00 |
| | | | 348/118 |
| 2014/0103627 A1* | 4/2014 | Deckard | B60R 22/00 |
| | | | 411/362 |
| 2014/0151979 A1 | 6/2014 | Puckett et al. | |
| 2014/0347489 A1* | 11/2014 | Kumon | H04N 7/183 |
| | | | 348/148 |
| 2015/0195052 A1* | 7/2015 | Fan | H04H 60/37 |
| | | | 455/420 |
| 2015/0259035 A1 | 9/2015 | Carli | |
| 2015/0350607 A1* | 12/2015 | Kim | B60R 1/00 |
| | | | 348/148 |
| 2016/0075386 A1 | 3/2016 | Zuchoski et al. | |
| 2016/0121924 A1* | 5/2016 | Norstad | B60G 17/02 |
| | | | 701/41 |
| 2016/0159395 A1* | 6/2016 | Kim | B62D 5/0463 |
| | | | 701/41 |
| 2016/0167655 A1* | 6/2016 | Minami | B60W 10/02 |
| | | | 477/176 |
| 2017/0136916 A1* | 5/2017 | Heisel | B60L 50/16 |
| 2017/0217368 A1 | 8/2017 | Lewis et al. | |
| 2017/0225710 A1* | 8/2017 | Yu | B60W 30/06 |
| 2017/0270374 A1* | 9/2017 | Myers | B60R 1/00 |
| 2017/0341583 A1 | 11/2017 | Zhang et al. | |
| 2017/0352275 A1 | 12/2017 | Maruyama et al. | |
| 2018/0056783 A1* | 3/2018 | Safranski | B60G 7/006 |
| 2018/0056871 A1* | 3/2018 | Karner | H04N 7/181 |
| 2018/0141543 A1* | 5/2018 | Krosschell | B60G 17/0164 |
| 2018/0156329 A1* | 6/2018 | Hose | B60W 10/113 |
| 2019/0007597 A1 | 1/2019 | Cordeiro | |
| 2019/0061762 A1* | 2/2019 | Bemetz | B60W 50/16 |
| 2019/0118711 A1 | 4/2019 | Kim et al. | |
| 2019/0118717 A1* | 4/2019 | Blank | H04N 7/181 |
| 2019/0152493 A1* | 5/2019 | Pongo | B60W 50/12 |
| 2019/0184985 A1* | 6/2019 | Tokish | B60W 30/0956 |
| 2019/0337497 A1* | 11/2019 | Scheuerell | B60T 8/171 |
| 2020/0094896 A1* | 3/2020 | Nolin | B60T 8/1769 |
| 2020/0156543 A1 | 5/2020 | Kubota et al. | |
| 2020/0290613 A1* | 9/2020 | Trainor | B60L 58/12 |
| 2020/0329216 A1* | 10/2020 | Ribighini | H04N 7/18 |
| 2021/0118184 A1 | 4/2021 | Pillai et al. | |
| 2021/0263513 A1 | 8/2021 | Liu et al. | |
| 2022/0116741 A1 | 4/2022 | Rentz et al. | |
| 2022/0165066 A1 | 5/2022 | Aoki et al. | |
| 2022/0360693 A1 | 11/2022 | Stein et al. | |

FOREIGN PATENT DOCUMENTS

| | | | | |
|---|---|---|---|---|
| CN | 108604320 A | | 9/2018 | |
| CN | 208376630 U | | 1/2019 | |
| DE | 19910153 A1 | | 1/2001 | |
| DE | 102014215786 A1 | * | 2/2016 | ......... B60W 40/107 |
| JP | 2002234399 A | * | 8/2002 | |
| JP | 2006214726 A | * | 8/2006 | |
| JP | 2014106786 A | * | 6/2014 | |
| JP | 2015039268 A | * | 2/2015 | |
| JP | 2015205540 A | * | 11/2015 | |
| KR | 20200020035 A | * | 2/2020 | |

OTHER PUBLICATIONS

International Search Report and Written Opinion received for PCT Patent Application No. PCT/US21/28188, mailed on Sep. 23, 2021, 14 pages.
Invitation to Pay Additional Fees received for PCT Patent Application No. PCT/US21/28188, mailed on Jun. 28, 2021, 3 pages.
Bryon Dorr, Invisible Tow-Behind: GMC Launches 'Transparent Trailer View', Gear Junkie, Feb. 12, 2019; 8 ages.
Hard-wired backup camera, 1960 Airstream Ambassador Blog!, Hosted by The Vintage Airstream Podcast, Jan. 27, 2020; 9 pages.
Michael Wayland, What if you could see through your trailer?, Automotive News, Apr. 8, 2019; 3 pages.
Pro Trailer Backup Assist, Ford Co-Pilot 360 Technology, Jan. 27, 2020; 7 pages.
Using the Rearview Camera in a Classic, Airstream, Feb. 16, 2017; 4 pages.

* cited by examiner

SYSTEMS AND METHODS FOR OPERATING AN ALL-TERRAIN VEHICLE

CROSS-REFERENCE TO RELATED APPLICATIONS

This application claims priority to U.S. Provisional Application No. 63/013,272, filed Apr. 21, 2020, which is incorporated herein by reference in its entireties for all purposes.

TECHNICAL FIELD OF THE DISCLOSURE

The present application relates to all-terrain vehicles and, more particularly, to operating an all-terrain vehicle configured for off-road applications.

BACKGROUND OF THE DISCLOSURE

Recreational vehicles operating in rough terrain experience conditions that are not normally experienced by traditional vehicles. For example, during operation in rough terrain, all-terrain vehicles may intentionally or unintentionally roll backwards and/or become airborne. Furthermore, it may be advantageous to limit the control modes in which the all-terrain vehicle can operate to prevent damage to an all-terrain vehicle operating under certain conditions. As such, there is a need for systems and methods for controlling the operation of an all-terrain vehicle while the all-terrain vehicle is operating under certain conditions.

SUMMARY OF THE DISCLOSURE

Examples embodiments of the present disclosure include, but are not limited to the following examples.

According to one example ("Example 1"), an all-terrain vehicle, comprising: a plurality of ground-engaging members; a frame supported by the plurality of ground-engaging members; a powertrain assembly supported by the frame and operably coupled to the plurality of ground-engaging members; a shiftable transmission supported by the frame and operably coupled to the powertrain assembly, the shiftable transmission comprising a plurality of gears; a display supported by the frame; a back-up camera supported by the frame; a controller operatively coupled to the shiftable transmission, the display, and the back-up camera, wherein the controller is configured to: receive a signal from the shiftable transmission corresponding to the shiftable transmission being in a gear of the plurality of gears other than a reverse gear; determine the all-terrain vehicle is moving backwards; and send an activation signal to the back-up camera to display images of the back-up camera on the display.

According to one example ("Example 2"), the all-terrain vehicle of Example 1, wherein to determine the all-terrain vehicle is moving backwards, the controller is configured to determine the all-terrain vehicle is oriented uphill.

According to one example ("Example 3"), the all-terrain vehicle of Example 2, further comprising at least one accelerometer, the controller being configured to determine the all-terrain vehicle is oriented uphill based upon measurements from the at least one accelerometer.

According to one example ("Example 4"), the all-terrain vehicle of Examples 2-2, wherein the all-terrain vehicle comprises an active descent mode, the controller being configured to determine the all-terrain vehicle is moving backwards based upon the active descent mode being active.

According to one example ("Example 5"), the all-terrain vehicle of Examples 1-4, further comprising at least one global positioning satellite (GPS) receiver, the controller being configured to determine the all-terrain vehicle is moving backwards based upon measurements from the at least one GPS receiver.

According to one example ("Example 6"), the all-terrain vehicle of Examples 1-5, further comprising a wheel speed sensor, the controller being configured to determine the all-terrain vehicle is moving backwards based upon measurements from the wheel speed sensor.

According to one example ("Example 7"), the all-terrain vehicle of Examples 2-6, further comprising a vehicle speed sensor, the controller being configured to determine the all-terrain vehicle is moving backwards based upon measurements from the vehicle speed sensor.

According to one example ("Example 8"), the all-terrain vehicle of Examples 2-7, further comprising a sensor, the controller being configured to determine the all-terrain vehicle is moving backwards is based upon the measurements from the sensor indicating the clutch is disengaged.

According to one example ("Example 9"), the all-terrain vehicle of Examples 2-8, further comprising a throttle sensor, wherein to determine the all-terrain vehicle is moving backwards, the controller is configured to: determine the all-terrain vehicle is moving after being stationary; and determine the all-terrain vehicle will not move forward in response to a throttle signal received from the throttle sensor.

According to one example ("Example 10"), the all-terrain vehicle of Examples 1-9, further comprising a brake system, the controller being configured to: receive a brake signal from the brake system; and enable an anti-lock braking mode in response to the brake signal.

According to one example ("Example 11"), a computer-implemented method for controlling a back-up camera installed on an all-terrain vehicle, the method comprising: receiving a signal from a shiftable transmission of the all-terrain vehicle, the shiftable transmission comprising a plurality of gears and the signal corresponding to the shiftable transmission being in a gear of a plurality of gears other than a reverse gear; determining the all-terrain vehicle is moving backwards; and sending an activation signal to the back-up camera to display images of the back-up camera on the user display.

According to one example ("Example 12"), the method of Example 11, wherein determining the all-terrain vehicle is moving in the reverse direction, comprises determining the all-terrain vehicle is oriented uphill.

According to one example ("Example 13"), the method of Example 12, further comprising receiving measurements from at least one accelerometer, wherein determining the all-terrain vehicle is oriented uphill is based upon the measurements from the at least one accelerometer.

According to one example ("Example 14"), the method of Examples 12-13, wherein the all-terrain vehicle comprises an active descent mode, wherein determining the all-terrain vehicle is moving backwards is based upon the active descent mode being active.

According to one example ("Example 15"), the method of Examples 11-14, further comprising receiving measurements from at least one GPS sensor, wherein determining the all-terrain vehicle is moving backwards is based upon the measurements from the at least one GPS sensor.

According to one example ("Example 16"), the method of Examples 11-15, further comprising receiving measurements from a wheel speed sensor, wherein determining the all-terrain vehicle is moving backwards is based upon the measurements from the wheel speed sensor.

According to one example ("Example 17"), the method of Examples 12-16, further comprising receiving measurements from a vehicle speed sensor, wherein determining the all-terrain vehicle is moving backwards is based upon the measurements from the vehicle speed sensor.

According to one example ("Example 18"), the method of Examples 12-17, further comprising receiving measurements from a sensor, wherein determining the all-terrain vehicle is moving backwards is based upon the measurements from the sensor indicating the clutch is disengaged.

According to one example ("Example 19"), the method of Examples 12-18, further comprising receiving measurements from a throttle sensor, wherein determining the all-terrain vehicle is moving backwards is based upon the measurements from the at least one throttle sensor.

According to one example ("Example 20"), an all-terrain vehicle, comprising: a plurality of ground-engaging members; a frame supported by the plurality of ground-engaging members; a powertrain assembly supported by the frame and operably coupled to the plurality of ground-engaging members; a braking system operably coupled to the plurality of ground-engaging members, the braking system configured to operate in an inactive run mode, an electronic stability control mode and/or an anti-lock braking system; and a controller operably coupled to the braking system, the controller configured to: determine the all-terrain vehicle is moving in a reverse direction; determine the braking system has been actuated; and automatically engage the electronic stability control mode and/or the anti-lock braking system mode in response to determining the all-terrain vehicle is moving in a reverse direction and the braking system has been actuated.

According to one example ("Example 21"), the all-terrain vehicle of Example 20, wherein to determine the all-terrain vehicle is moving backwards, the controller is configured to determine the all-terrain vehicle is oriented uphill.

According to one example ("Example 22"), the all-terrain vehicle of Example 21, further comprising at least one accelerometer, the controller being configured to determine the all-terrain vehicle is oriented uphill based upon measurements from the at least one accelerometer.

According to one example ("Example 23"), the all-terrain vehicle of Examples 21-22, wherein the all-terrain vehicle comprises an active descent mode, the controller being configured to determine the all-terrain vehicle is moving backwards based upon the active descent mode being activated.

According to one example ("Example 24"), the all-terrain vehicle of Examples 20-23, further comprising at least one global positioning satellite (GPS) receiver, the controller being configured to determine the all-terrain vehicle is moving backwards based upon measurements from the at least one GPS receiver.

According to one example ("Example 25"), the all-terrain vehicle of Examples 20-24, further comprising a wheel speed sensor, the controller being configured to determine the all-terrain vehicle is moving backwards based upon measurements from the wheel speed sensor.

According to one example ("Example 26"), the all-terrain vehicle of Examples 21-25, further comprising a vehicle speed sensor, the controller being configured to determine the all-terrain vehicle is moving backwards based upon measurements from the vehicle speed sensor.

According to one example ("Example 27"), the all-terrain vehicle of Examples 21-26, further comprising receiving measurements from a sensor, wherein determining the all-terrain vehicle is moving backwards is based upon the measurements from the sensor indicating the clutch is disengaged.

According to one example ("Example 28"), the all-terrain vehicle of Examples 21-27, further comprising a throttle sensor, wherein to determine the all-terrain vehicle is moving backwards, the controller is configured to: determine the all-terrain vehicle is moving after being stationary; and determined the all-terrain vehicle will not move forward in response to a throttle signal received from the throttle sensor.

According to one example ("Example 29"), the all-terrain vehicle of Examples 20-28, further comprising: a shiftable transmission supported by the frame and operably coupled to the powertrain assembly, the shiftable transmission comprising a plurality of gears; a display supported by the frame; and a back-up camera supported by the frame; the controller further configured to send an activation signal to the back-up camera to display images of the back-up camera on the display in response to determining the all-terrain vehicle is moving in the reverse direction.

According to one example ("Example 30"), the all-terrain vehicle of Examples 20-29, the controller further configured to: receive a signal from a shiftable transmission of the all-terrain vehicle, the shiftable transmission comprising a plurality of gears and the signal corresponding to the shiftable transmission being in a reverse gear of a plurality of gears; and automatically engage the electronic stability control mode and/or the anti-lock braking system mode in response to the reverse gear being selected.

According to one example ("Example 31"), an all-terrain vehicle, comprising: a plurality of ground-engaging members; a frame supported by the plurality of ground-engaging members; a powertrain assembly supported by the frame and operably coupled to the plurality of ground-engaging members; a braking system operably coupled to the plurality of ground-engaging members; at least wheel speed sensor configured to measure a speed of at least one of the plurality of ground-engaging members; and a controller operably coupled to the braking system, the controller configured to: determine a ground speed of the all-terrain vehicle; determine a ground-engaging member speed of at least one of the plurality of ground-engaging members; and send, in response to the all-terrain vehicle being airborne, a signal to the braking system to reduce the ground-engaging member speed based upon the ground speed of the all-terrain vehicle.

According to one example ("Example 32"), the all-terrain vehicle of Example 31, the controller further configured to determine the all-terrain vehicle is airborne.

According to one example ("Example 33"), the all-terrain vehicle of Example 32, wherein to determine the all-terrain vehicle is airborne is based upon the ground-engaging member speed increasing by more than a threshold amount.

According to one example ("Example 34"), the all-terrain vehicle of Examples 31-33, wherein to determine the ground speed of the all-terrain vehicle is based upon a ground speed of the all-terrain vehicle prior to the all-terrain vehicle being airborne.

According to one example ("Example 35"), the all-terrain vehicle of Example 34, wherein a decay factor is applied to the ground speed of the all-terrain vehicle prior to the all-terrain vehicle being airborne to determine the ground speed of the all-terrain vehicle.

According to one example ("Example 36"), the all-terrain vehicle of Example 35, wherein the decay factor is based upon a deceleration measured by an accelerometer oriented along an x-axis.

According to one example ("Example 37"), a computer-implemented method for controlling a speed of at least one ground-engaging member of an all-terrain vehicle, the method comprising: determining a ground speed of the all-terrain vehicle; determining the speed of the at least one ground-engaging member; and sending, in response to the all-terrain vehicle being airborne, a signal to a braking system of the all-terrain vehicle to reduce the speed of the at least one ground-engaging member based upon the ground speed of the all-terrain vehicle.

According to one example ("Example 38"), the method of Example 37, further comprising determining the all-terrain vehicle is airborne.

According to one example ("Example 39"), the method of Example 38, wherein determining the all-terrain vehicle is airborne is based upon the speed of the at least one ground-engaging member increasing by more than a threshold amount.

According to one example ("Example 40"), the method of Examples 37-39, wherein determining the ground speed of the all-terrain vehicle is based upon a ground speed of the all-terrain vehicle prior to the all-terrain vehicle being airborne.

According to one example ("Example 41"), the method of Example 40, wherein a decay factor is applied to the ground speed of the all-terrain vehicle prior to the all-terrain vehicle being airborne to determine the ground speed of the all-terrain vehicle.

According to one example ("Example 42"), the method of Example 41, wherein the decay factor is based upon a deceleration measured by an accelerometer oriented along an x-axis.

According to one example ("Example 43"), an all-terrain vehicle, comprising: a plurality of ground-engaging members; a frame supported by the plurality of ground-engaging members; a powertrain assembly supported by the frame and operably coupled to the plurality of ground-engaging members; a user interface supported by the frame, the user interface configured to provide a plurality of driveline configuration options; and a controller operatively coupled to the braking system, wherein the controller is configured to: receive a selected driveline configuration of the plurality of driveline configuration options; determine at least one allowed brake configuration mode based upon the selected driveline configuration; and provide the at least one allowed brake configuration mode to the user interface.

According to one example ("Example 44"), the all-terrain vehicle of Example 43, the controller further configured to: receive a selection for an allowed brake configuration mode of the at least one allowed brake configuration mode; and configure the all-terrain vehicle in the selected allowed brake configuration mode in response to the selection for the allowed brake configuration mode.

According to one example ("Example 45"), the all-terrain vehicle of Examples 43-44, the controller further configured to: receive a selection for a non-allowed brake configuration mode; and automatically configure the all-terrain vehicle in an allowed brake configuration mode of the at least one allowed brake configuration mode in response to the selection for the non-allowed brake configuration mode.

According to one example ("Example 46"), the all-terrain vehicle of Examples 43-45, wherein the driveline configurations comprise at least one driveline configuration of the following driveline configurations: two-wheel drive with a differential open, two-wheel drive with the differential locked, four-wheel drive with all differentials locked, all-wheel drive with a rear differential open and a front differential open, and all-wheel drive with the rear differential closed and the front differential open.

According to one example ("Example 47"), the all-terrain vehicle of Examples 43-46, wherein at least one of the brake configuration modes comprises a braking intervention based upon a comparison between a target yaw rate of the all-terrain vehicle and a measured yaw rate of the all-terrain vehicle.

According to one example ("Example 48"), a computer-implemented method for determining a brake configuration mode based upon a driveline configuration of an all-terrain vehicle, the method comprising: receiving a selected driveline configuration of a plurality of driveline configuration options for the all-terrain vehicle; determining at least one allowed brake configuration mode based upon the selected driveline configuration; and providing the at least one allowed brake configuration mode to the user interface.

According to one example ("Example 49"), the method of Example 48, further comprising: receiving a selection for an allowed brake configuration mode of the at least one allowed brake configuration mode; and configuring the all-terrain vehicle in the selected allowed brake configuration mode in response to the selection for the allowed brake configuration mode.

According to one example ("Example 50"), the method of Examples 48-49, further comprising: receiving a selection for a non-allowed brake configuration mode; and automatically configuring the all-terrain vehicle in an allowed brake configuration mode of the at least one allowed brake configuration mode in response to the selection for the non-allowed brake configuration mode.

According to one example ("Example 51"), the method of Examples 48-50, further comprising: receiving a selection for a non-allowed brake configuration mode; and outputting a notification corresponding to an allowed brake configuration mode of the at least one allowed brake configuration mode in response to the selection for the non-allowed brake configuration mode.

According to one example ("Example 52"), the method of Examples 48-51, wherein the driveline configurations comprise at least one driveline configuration of the following driveline configurations: two-wheel drive with a differential open, two-wheel drive with the differential locked, four-wheel drive with all differentials locked, all-wheel drive with a rear differential open and a front differential open, and all-wheel drive with the rear differential closed and the front differential open.

According to one example ("Example 53"), the method of Examples 48-52, wherein at least one of the brake configuration modes comprises a braking intervention based upon a comparison between a target yaw rate of the all-terrain vehicle and a measured yaw rate of the all-terrain vehicle.

According to one example ("Example 54"), an all-terrain vehicle, comprising: a plurality of ground-engaging members; a frame supported by the plurality of ground-engaging members; a powertrain assembly supported by the frame and operably coupled to the plurality of ground-engaging members; a user interface supported by the frame, the user interface configured to provide a plurality of vehicle mode options; and a controller operatively coupled to the braking system, wherein the controller is configured to: receive a selected vehicle mode option of the plurality of vehicle mode options; and automatically configure a driveline and a brake configuration mode of the all-terrain vehicle based upon the selected vehicle mode.

According to one example ("Example 55"), the all-terrain vehicle of Example 54, wherein the controller configures the driveline to two-wheel drive with a rear differential of the all-terrain vehicle open and the brake configuration mode to a first brake configuration in response to a first vehicle mode being selected.

According to one example ("Example 56"), the all-terrain vehicle of Examples 54-55, wherein the controller configures the driveline to all-wheel drive with a rear differential of the all-terrain vehicle open and a front differential of the all-terrain vehicle open and the brake configuration mode to a second brake configuration in response to a second vehicle mode being selected.

According to one example ("Example 57"), the all-terrain vehicle of Examples 54-56, wherein the controller configures the driveline to all-wheel drive with a rear differential of the all-terrain vehicle locked and a front differential of the all-terrain vehicle open and the brake configuration mode to a third brake configuration in response to a third vehicle mode being selected.

According to one example ("Example 58"), the all-terrain vehicle of Examples 54-57, wherein the controller configures the driveline to two-wheel drive with a rear differential of the all-terrain vehicle locked and the brake configuration mode to a third brake configuration in response to a fourth vehicle mode being selected.

According to one example ("Example 59"), the all-terrain vehicle of Examples 54-58, wherein the controller configures the driveline to all-wheel drive with a rear differential of the all-terrain vehicle locked and a front differential of the all-terrain vehicle locked and the brake configuration mode to a fourth brake configuration in response to a fifth vehicle mode being selected.

According to one example ("Example 60"), the all-terrain vehicle of Examples 54-59, wherein the user interface is a rotatable knob.

According to one example ("Example 61"), an all-terrain vehicle, comprising: a plurality of ground-engaging members; a frame supported by the plurality of ground-engaging members; a powertrain assembly supported by the frame and operably coupled to the plurality of ground-engaging members; a braking system operably coupled to the plurality of ground-engaging members; and a controller operably coupled to (i) the braking system and (ii) a second braking system of a vehicle flat towing the all-terrain vehicle, the controller configured to: receive an actuation signal from the second braking system; and actuate the braking system in response to the actuation signal.

According to one example ("Example 62"), the all-terrain vehicle of Example 61, wherein the controller is coupled to the second braking system by a 4-way connector.

According to one example ("Example 63"), the all-terrain vehicle of Example 62, further comprising an accelerometer and wherein the controller is further configured to apply a pressure to the braking system that is based upon measurements from the accelerometer and the actuation signal.

According to one example ("Example 64"), the all-terrain vehicle of Example 63, wherein the pressure increases in proportion to a deceleration of the all-terrain vehicle.

According to one example ("Example 65"), the all-terrain vehicle of Examples 61-64, wherein the controller is coupled to the second braking system by a 7-way connector.

According to one example ("Example 66"), the all-terrain vehicle of Example 65, wherein the actuation signal comprises an amount of pressure being applied to the second braking system and wherein the controller is configured to actuate the braking system using a proportional amount of pressure to the amount of pressure being applied to the second braking system.

According to one example ("Example 67"), an all-terrain vehicle, comprising: a plurality of ground-engaging members; a frame supported by the plurality of ground-engaging members; a powertrain assembly supported by the frame and operably coupled to the plurality of ground-engaging members; a braking system operably coupled to the plurality of ground-engaging members; and a wheel speed sensor configured to measure a speed of at least one of the plurality of ground-engaging members, wherein the wheel speed sensor is incorporated into a side of a knuckle of the at least one ground-engaging member.

According to one example ("Example 68"), the all-terrain vehicle of Example 67, wherein a distal portion of the wheel speed sensor is arranged interior to a brake caliper of the braking system.

According to one example ("Example 69"), the all-terrain vehicle of Examples 67-68, wherein wiring coupled to the wheel speed sensor is routed into a chassis of the all-terrain vehicle.

According to one example ("Example 70"), the all-terrain vehicle of Examples 67-69, wherein wiring coupled to the wheel speed sensor is routed inside an a-arm tube coupled to the at least one ground-engaging member.

According to one example ("Example 71"), the all-terrain vehicle of Examples 67-70, wherein wiring coupled to the wheel speed sensor is routed proximal to a portion of a brake line of the braking system.

According to one example ("Example 72"), the all-terrain vehicle of Examples 67-71, wherein wiring coupled to the wheel speed sensor is at least partially surrounded by a protective covering.

According to one example ("Example 73"), the all-terrain vehicle of Example 72, wherein the protective covering is plastic.

According to one example ("Example 74"), an all-terrain vehicle, comprising: a plurality of ground-engaging members; a frame supported by the plurality of ground-engaging members; a powertrain assembly supported by the frame and operably coupled to the plurality of ground-engaging members; a braking system operably coupled to the plurality of ground-engaging members; and a wheel speed sensor configured to measure a speed of at least one of the plurality of ground-engaging members, wherein the wheel speed sensor is mounted proximal to a portion of a halfshaft coupled to a wheel assembly of the ground-engaging member of the plurality of ground-engaging members.

According to one example ("Example 75"), the all-terrain vehicle of Example 74, wherein the wheel speed sensor is an encoder ring.

According to one example ("Example 76"), the all-terrain vehicle of Example 75, wherein the encoder ring is a magnetic encoder.

According to one example ("Example 77"), the all-terrain vehicle of Examples 75-76, wherein the encoder ring is formed from steel.

According to one example ("Example 78"), the all-terrain vehicle of Examples 74-77, wherein wiring coupled to the wheel speed sensor is routed into a chassis of the all-terrain vehicle.

According to one example ("Example 79"), the all-terrain vehicle of Examples 74-78, wherein wiring coupled to the wheel speed sensor is routed inside an a-arm tube coupled to the at least one ground-engaging member.

According to one example ("Example 80"), the all-terrain vehicle of Examples 74-79, wherein wiring coupled to the wheel speed sensor is routed proximal to a portion of a brake line of the braking system.

According to one example ("Example 81"), the all-terrain vehicle of Examples 74-80, wherein wiring coupled to the wheel speed sensor is at least partially surrounded by a protective covering.

According to one example ("Example 82"), the all-terrain vehicle of Examples 74-81, wherein the protective covering is plastic.

According to one example ("Example 83"), the all-terrain vehicle of Examples 74-82, wherein wheel speed sensor is proximal an inner portion of a brake caliper of the braking system.

According to one example ("Example 84"), an all-terrain vehicle, comprising: a plurality of ground-engaging members; a frame supported by the plurality of ground-engaging members; a powertrain assembly supported by the frame and operably coupled to the plurality of ground-engaging members; a braking system operably coupled to the plurality of ground-engaging members; and a hydraulic and electric controller unit (HECU) coupled to the braking system, the HECU being arranged proximal a longitudinal centerline of the all-terrain vehicle.

According to one example ("Example 85"), the all-terrain vehicle of Example 84, wherein the HECU is arranged beneath a seat of the all-terrain vehicle.

According to one example ("Example 86"), the all-terrain vehicle of Examples 84-85, wherein the HECU is arranged forward of an engine of the powertrain.

According to one example ("Example 87"), the all-terrain vehicle of Examples 84-86, wherein the HECU is arranged rearward of a steering column of the all-terrain vehicle.

According to one example ("Example 88"), the all-terrain vehicle of Examples 84-87, wherein the HECU is arranged proximal a center of mass of the all-terrain vehicle.

According to one example ("Example 89"), the all-terrain vehicle of Examples 84-88, wherein the HECU is arranged forward of a rear firewall of the all-terrain vehicle.

According to one example ("Example 90"), the all-terrain vehicle of Examples 84-89, wherein the HECU is arranged between an engine of the powertrain and a front firewall of the all-terrain vehicle.

According to one example ("Example 91"), the all-terrain vehicle of Examples 84-90, wherein the HECU is arranged between a plane extending through an engine of the powertrain and at least one of a steering well plane of the all-terrain vehicle or a foot pedal plane of the all-terrain vehicle.

According to one example ("Example 92"), the all-terrain vehicle of Examples 84-91, wherein the HECU is arranged between frame rails of the all-terrain vehicle.

According to one example ("Example 93"), an all-terrain vehicle, comprising: a plurality of ground-engaging members; a frame supported by the plurality of ground-engaging members; a powertrain assembly supported by the frame and operably coupled to the plurality of ground-engaging members; a user interface supported by the frame, the user interface configured to display a driveline configuration of the all-terrain vehicle.

According to one example ("Example 94"), the all-terrain vehicle of Example 93, wherein to display the driveline configuration, the user interface is configured to display the at least one of a front differential status or a rear differential status of the all-terrain vehicle.

According to one example ("Example 95"), the all-terrain vehicle of Example 94, wherein the at least one of the front differential status or the rear differential status is indicated by at least one of a color or an opacity corresponding to the at least one of the front differential status or the rear differential status.

According to one example ("Example 96"), the all-terrain vehicle of Example 95, wherein at least one of the color or the opacity changes in response to a change of the at least one of the front differential status or the rear differential status.

According to one example ("Example 97"), the all-terrain vehicle of Examples 94-96, wherein the at least one of the front differential status or the rear differential status is indicated by a lock symbol or an unlock symbol.

According to one example ("Example 98"), the all-terrain vehicle of Examples 94-97, wherein the at least one of the front differential status or the rear differential status of the all-terrain vehicle corresponds to a smart-locked configuration for the at least one of the front differential status or the rear differential.

According to one example ("Example 99"), the all-terrain vehicle of Examples 93-98, wherein to display the driveline configuration, the user interface is configured to display a transfer case status of the all-terrain vehicle.

According to one example ("Example 100"), the all-terrain vehicle of Example 99, wherein the transfer case status is indicated by at least one of a color or an opacity corresponding to the transfer case status.

According to one example ("Example 101"), the all-terrain vehicle of Example 100, wherein at least one of the color or the opacity changes in response to a change of the transfer case status.

According to one example ("Example 102"), the all-terrain vehicle of Examples 99-101, wherein the transfer case status is indicated by a line corresponding to the transfer case status.

According to one example ("Example 103"), the all-terrain vehicle of Example 102, wherein the line is a dotted line.

According to one example ("Example 104"), the all-terrain vehicle of Examples 102-103, wherein a weight of the line changes in response to a change in power or torque to at least one of the ground-engaging members.

According to one example ("Example 105"), the all-terrain vehicle of Examples 93-104, the user interface further configured to display a brake status of the all-terrain vehicle.

According to one example ("Example 106"), the all-terrain vehicle of Example 105, wherein the brake status is indicated by at least one of a color or an opacity corresponding to the brake status.

According to one example ("Example 107"), the all-terrain vehicle of Example 106, wherein at least one of the color or the opacity changes in response to a change of the brake status.

According to one example ("Example 108"), the all-terrain vehicle of Examples 93-107, the user interface further configured to display a force on at least one of the plurality of ground-engaging members.

According to one example ("Example 109"), the all-terrain vehicle of Example 108, wherein the force is indicated by an arrow displayed on an image of at least one of the plurality of ground-engaging members.

According to one example ("Example 110"), the all-terrain vehicle of Examples 108-109, wherein the force is indicated by at least one of a color or an opacity corresponding to the force.

According to one example ("Example 111"), the all-terrain vehicle of Example 111, wherein at least one of the color or the opacity changes in response to a change of the force.

According to one example ("Example 112"), the all-terrain vehicle of Examples 93-111, wherein the user interface comprises a line corresponding to a predicted trajectory of the all-terrain vehicle.

According to one example ("Example 113"), the all-terrain vehicle of Example 112, wherein a direction of the line changes in response to a change of the predicted trajectory of the all-terrain vehicle.

According to one example ("Example 114"), the all-terrain vehicle of Examples 112-113, wherein at least one of a color or weight of the line is based upon the driveline configuration.

According to one example ("Example 115"), the all-terrain vehicle of Examples 93-114, wherein the user interface comprises an icon corresponding to the driveline configuration of the all-terrain vehicle.

According to one example ("Example 116"), the all-terrain vehicle of Example 115, wherein the icon comprises an indicator within the icon corresponding to a status of the driveline configuration of the all-terrain vehicle.

According to one example ("Example 117"), the all-terrain vehicle of Example 116, wherein the indicator displays a time remaining the driveline configuration is available before the driveline configuration switches to another driveline configuration.

According to one example ("Example 118"), the all-terrain vehicle of Example 117, wherein the time remaining is displayed by a bar that changes in response to the time remaining.

According to one example ("Example 119"), the all-terrain vehicle of Examples 93-118, further comprising: a controller operatively coupled to the braking system, wherein the controller is configured to: receive an activation of the driveline configuration corresponding to a hill descent driveline configuration; sense a speed of the all-terrain vehicle; and actuate the braking system based upon the set speed.

According to one example ("Example 120"), the all-terrain vehicle of Example 119, wherein to actuate the braking system based upon the set speed comprises reducing the speed of the all-terrain vehicle to the set speed.

According to one example ("Example 121"), the all-terrain vehicle of Examples 119-120, wherein to actuate the braking system based upon the set speed comprises preventing the speed of the all-terrain vehicle to increase greater than the set speed.

According to one example ("Example 122"), the all-terrain vehicle of Examples 119-121, wherein the controller is further configured to: receive a change of the set speed to an updated set speed; and actuate the braking system based upon the updated set speed.

According to one example ("Example 123"), the all-terrain vehicle of Examples 119-122, wherein the icon configured to receive the set speed is a pop-up icon on the user interface in response to the activation of the driveline configuration corresponding to the hill descent driveline configuration.

According to one example ("Example 124"), the all-terrain vehicle of Examples 119-123, wherein the icon configured to receive the set speed is a slide out icon on the user interface in response to the activation of the driveline configuration corresponding to the hill descent driveline configuration.

According to one example ("Example 125"), the all-terrain vehicle of Examples 119-124, wherein the icon configured to receive the set speed is a pop-up icon on the user interface in response to the controller sensing the all-terrain vehicle is oriented downhill.

According to one example ("Example 126"), the all-terrain vehicle of Examples 119-125, wherein the icon configured to receive the set speed is a slide out icon on the user interface in response to the controller sensing the all-terrain vehicle is oriented downhill.

According to one example ("Example 127"), the all-terrain vehicle of Examples 125-126, wherein a front of the all-terrain vehicle is oriented downhill.

According to one example ("Example 128"), the all-terrain vehicle of Examples 125-127, wherein a rear of the all-terrain vehicle is oriented downhill.

According to one example ("Example 129"), the all-terrain vehicle of Examples 119-128, wherein the icon is displayed in at least one of a color or an opacity corresponding a status of the set speed.

According to one example ("Example 130"), the all-terrain vehicle of Examples 119-129, wherein the controller is further configured to: receive an acceleration signal; and disengage the set speed in response to the acceleration signal.

According to one example ("Example 131"), the all-terrain vehicle of Examples 119-130, wherein the controller is further configured to: receive a brake signal from the braking system; and enable the set speed in response to the brake signal.

According to one example ("Example 132"), the all-terrain vehicle of Examples 93-131, wherein to display the driveline configuration of the all-terrain vehicle, the display is a pop-up on the user interface.

According to one example ("Example 133"), the all-terrain vehicle of Examples 93-132, wherein to display the driveline configuration of the all-terrain vehicle, the display is a slide out on the user interface.

According to one example ("Example 134"), the all-terrain vehicle of Examples 93-133, wherein the user interface is a touch-screen user interface.

According to one example ("Example 135"), the all-terrain vehicle of Examples 93-134, wherein the user interface is a touch-screen user interface.

According to one example ("Example 136"), the all-terrain vehicle of Examples 93-135, wherein a background of the display is based upon the driveline configuration and changes in response to a change in the driveline configuration.

According to one example ("Example 137"), the all-terrain vehicle of Examples 93-136, wherein the display includes a plurality of icons, wherein each of the plurality of icons change in response to a change in the driveline configuration and a change in at least one of a front differential status or a rear differential status of the all-terrain vehicle.

Additional features and advantages of the present invention will become apparent to those skilled in the art upon consideration of the following detailed description of the illustrative embodiment exemplifying the best mode of carrying out the invention as presently perceived.

BRIEF DESCRIPTION OF THE DRAWINGS

The foregoing aspects and many of the intended advantages of this invention will become more readily appreciated as the same becomes better understood by reference to the following detailed description when taken in conjunction with the accompanying drawings.

Figure 1A:
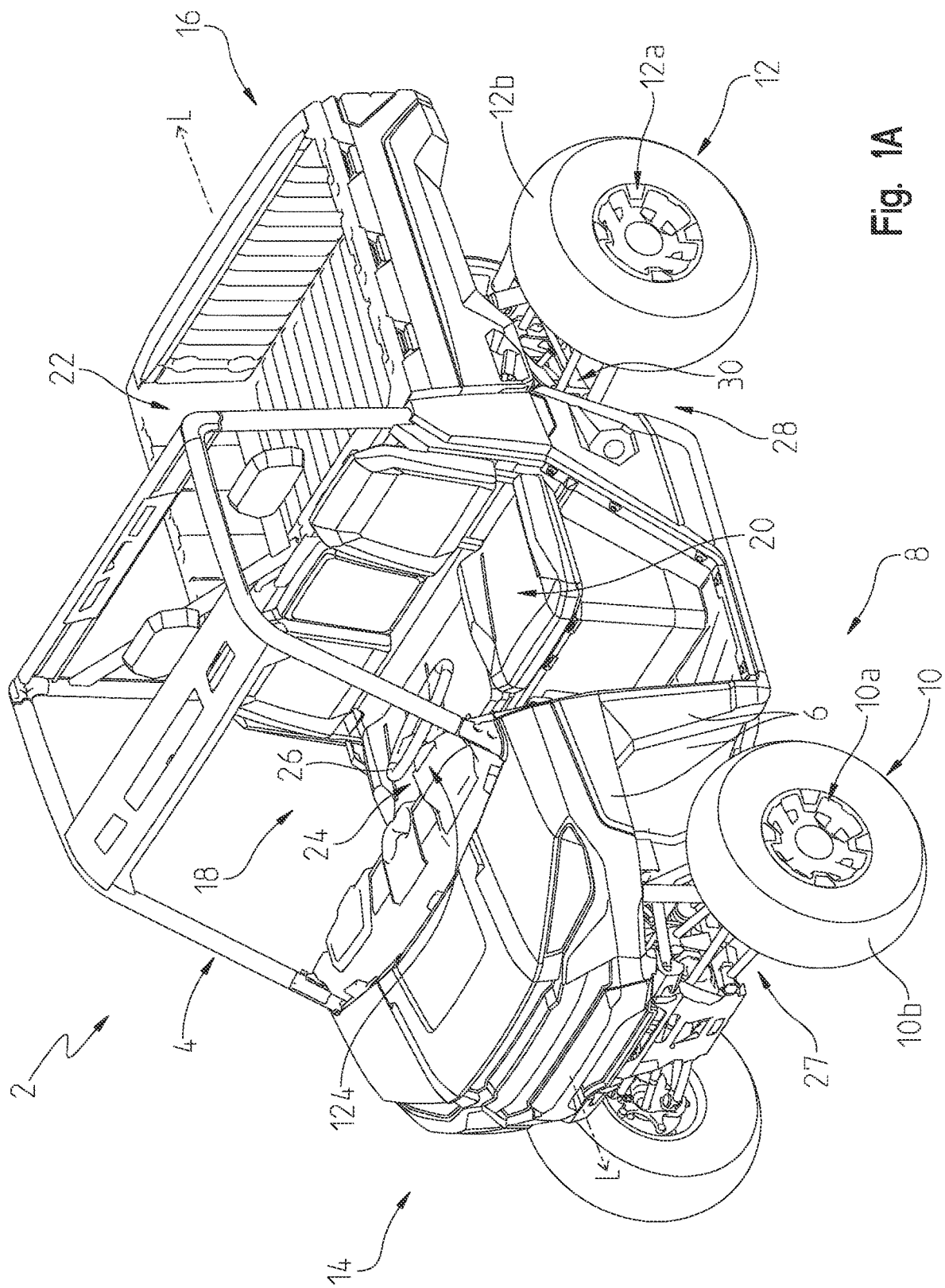
FIG. 1A illustrates a left front perspective view of an all-terrain vehicle of the present disclosure.

Corresponding reference characters indicate corresponding parts throughout the several views. Although the drawings represent embodiments of various features and components according to the present disclosure, the drawings are not necessarily to scale, and certain features may be exaggerated in order to better illustrate and explain the present disclosure. The exemplifications set out herein illustrate embodiments of the invention, and such exemplifications are not to be construed as limiting the scope of the invention in any manner.

DETAILED DESCRIPTION OF THE DRAWINGS

For the purposes of promoting an understanding of the principals of the invention, reference will now be made to the embodiments illustrated in the drawings, which are described below. The embodiments disclosed below are not intended to be exhaustive or limit the invention to the precise form disclosed in the following detailed description. Rather, the embodiments are chosen and described so that others skilled in the art may utilize their teachings. It will be understood that no limitation of the scope of the invention is thereby intended. The invention includes any alterations and further modifications in the illustrative devices and described methods and further applications of the principles of the invention which would normally occur to one skilled in the art to which the invention relates.

Figure 1B:
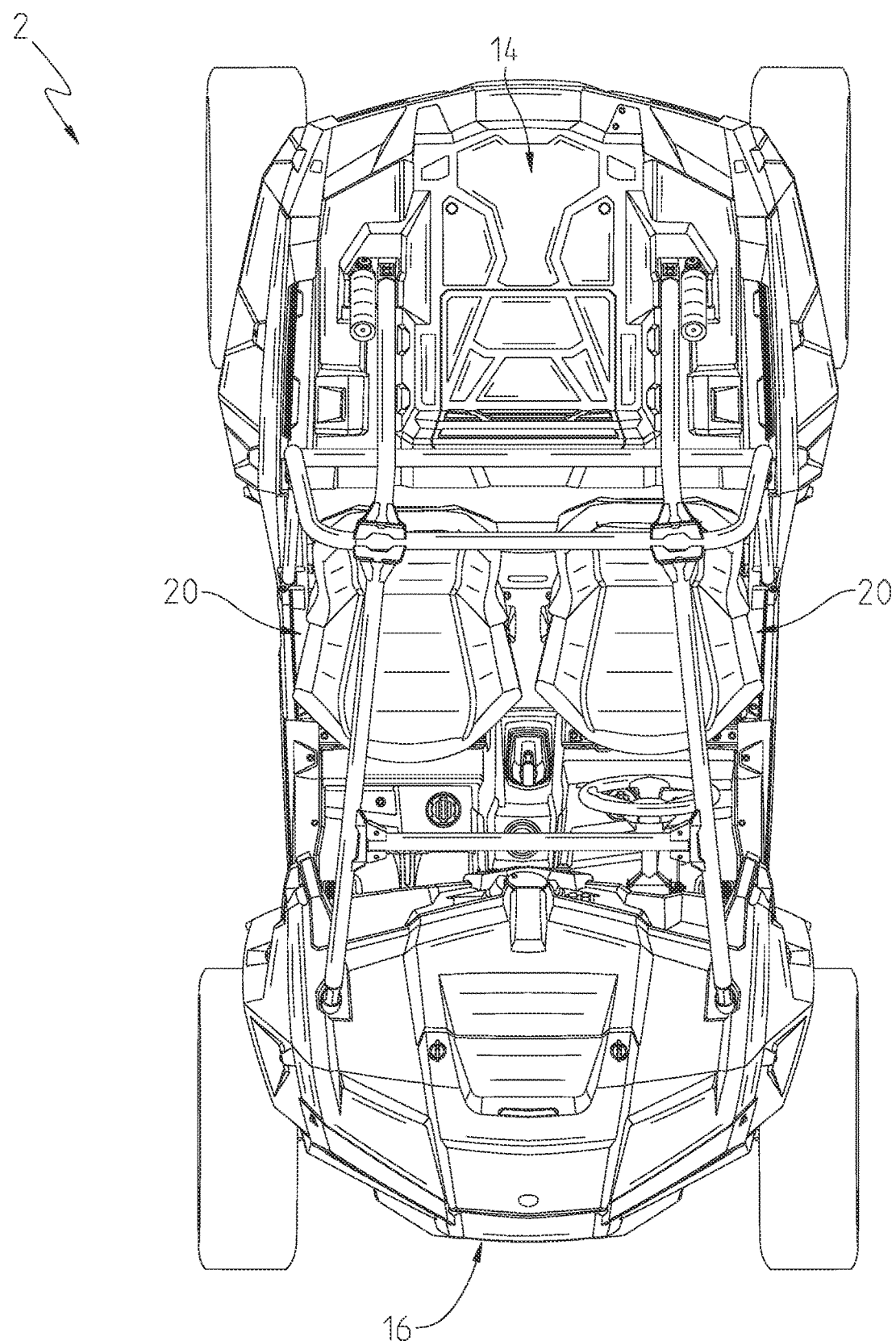
FIG. 1B illustrates a top view of another exemplary all-terrain vehicle for use with embodiments disclosed herein.

As shown in FIGS. 1A and 1B (collectively FIG. 1), an all-terrain vehicle 2 is disclosed and configured for off-road vehicle applications, such that all-terrain vehicle 2 is configured to traverse trails and other off-road terrain. Vehicle 2 may be referred to as a utility vehicle ("UTV"), an all-terrain vehicle ("ATV"), or a side-by-side vehicle ("SxS") and is configured for travel over various terrains or surfaces. More particularly, vehicle 2 may be configured for military, industrial, agricultural, or recreational applications.

Additional details regarding vehicle 2 are provided in U.S. patent application Ser. No. 14/051,700, filed Oct. 11, 2013, titled SIDE-BY-SIDE VEHICLE, the entire disclosure of which is expressly incorporated by reference herein. Additionally, the systems and methodologies described herein are applicable and, in embodiments, may be incorporated into various other all-terrain vehicles including the side-by-side all-terrain vehicle disclosed in U.S. patent application Ser. No. 14/051,700, filed Oct. 11, 2013, titled SIDE-BY-SIDE VEHICLE, the entire disclosure of which is expressly incorporated by reference herein. Further, the systems and methodologies described herein are applicable and, in embodiments, may be incorporated into the including the side-by-side all-terrain vehicle disclosed in U.S. patent application Ser. No. 15/790,691, filed Oct. 23, 2017, titled SIDE-BY-SIDE VEHICLE, the entire disclosure of which is expressly incorporated by reference herein.

Referring to FIG. 1, all-terrain vehicle 2 includes a frame assembly 4 which supports a plurality of body panels 6 and is supported on a ground surface by a plurality of ground-engaging members 8. Illustratively, ground-engaging members 8 include front ground-engaging members 10 and rear ground-engaging members 12. In one embodiment of vehicle 2, each of front ground-engaging members 10 may include a wheel assembly 10a and a tire 10b supported thereon. Similarly, each of rear ground-engaging members 12 may include a wheel assembly 12a and a tire 12b supported thereon. A front suspension assembly 27 may be operably coupled to front ground-engaging members 10 and a rear suspension assembly 28 may be operably coupled to rear ground-engaging members 12.

Referring still to FIG. 1, all-terrain vehicle 2 extends between a front-end portion 14 and a rear end portion 16 along a longitudinal axis L and supports an operator area 18 there between. Operator area 18 includes seating 20 for at least the operator and also may support one or more passengers. In one embodiment, seating 20 includes side-by-side bucket-type seats while, in another embodiment, seating 20 includes a bench-type seat. A cargo area 22 is positioned rearward of operator area 18 and is supported by frame assembly 4 at rear end portion 16.

Figure 2:
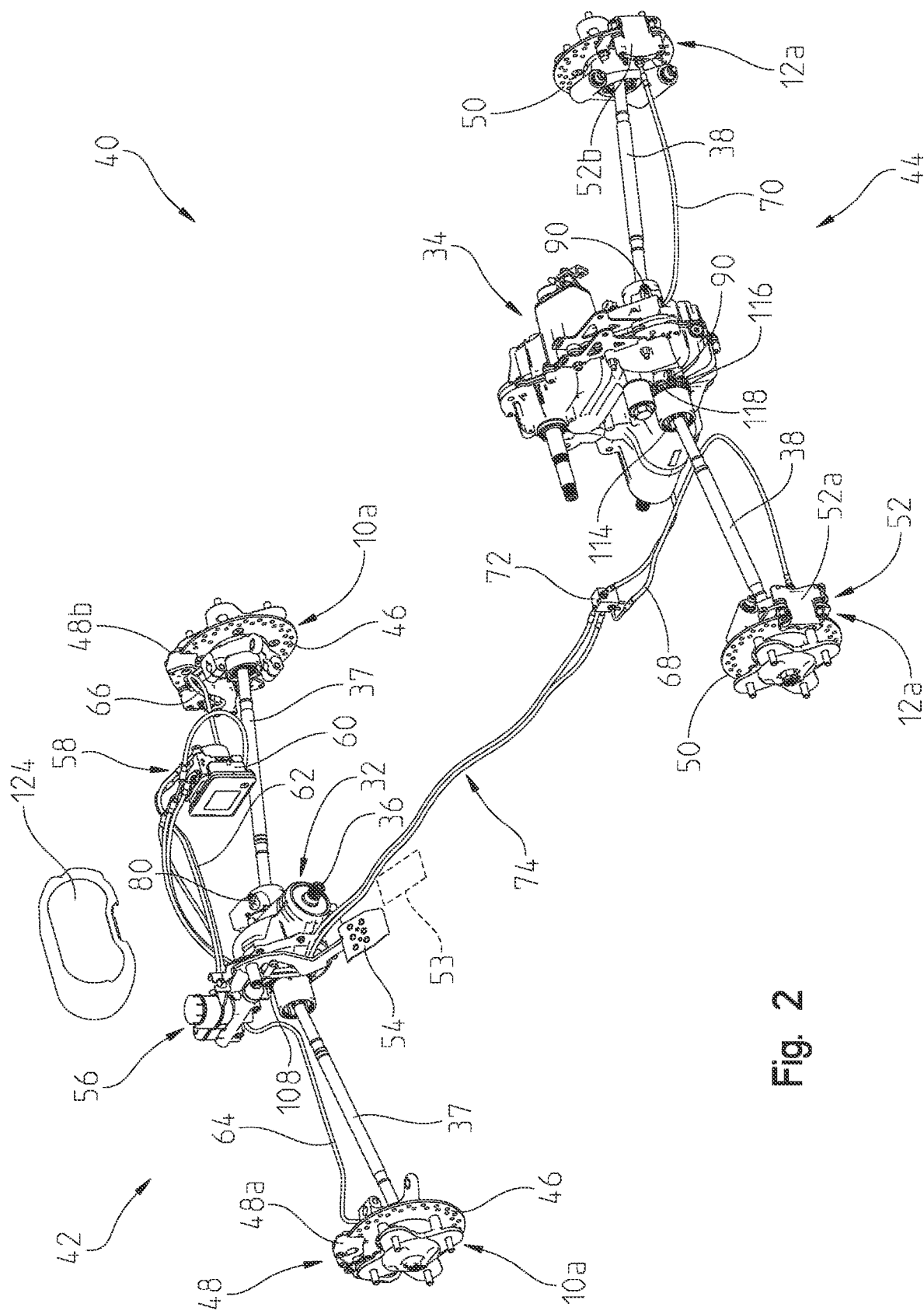
FIG. 2 illustrates a left rear perspective view of a braking assembly of the all-terrain vehicle of FIGS. 1A and 1B.

As shown in FIG. 1, operator area 18 includes operator controls 24, such as steering assembly 26, which may be operably coupled to one or more of ground-engaging members 8. Additional operator controls 24 may include other inputs for controlling operation of vehicle 2, as disclosed further herein, such as an accelerator member or pedal 53 and a brake member or pedal 54 (FIG. 2). More particularly, various operator controls 24 may affect operation of a powertrain assembly 30 of vehicle 2. Powertrain assembly 30 may be supported by rear end portion 16 of vehicle 2 and includes an engine (not shown), a transmission (e.g., transmission 217 illustrated in FIG. 11) operably coupled to the engine, a front final drive member 32 (FIG. 2) operably coupled to front ground-engaging members 10 through front half shafts or axles 37, and a rear final drive member 34 (FIG. 2) operably coupled to rear ground-engaging members 12 through rear half shafts or axles 38. Additionally, the transmission of powertrain assembly 30 may include a continuously variable transmission ("CVT") alone, a shiftable transmission alone, or a combination of a CVT and shiftable transmission. Exemplary powertrain assemblies are disclosed in U.S. patent application Ser. No. 14/051,700, filed Oct. 11, 2013, titled SIDE-BY-SIDE VEHICLE, and U.S. patent application Ser. No. 15/790,691, filed Oct. 23, 2017, titled SIDE-BY-SIDE VEHICLE, the entire disclosures of which are expressly incorporated by reference herein. A drive shaft (not shown) may be operably coupled to front final drive member 32 at an input 36 (FIG. 2) for supplying motive power from the engine and/or transmission to front ground-engaging members 10. Rear final drive member 34 is operably coupled the engine and/or transmission to supply power therefrom to rear ground-engaging members 12.

FIG. 1 illustrates one embodiment of an exemplary off-road vehicle. However, in some embodiments, the all-terrain vehicle 2 may be extended along the longitudinal axis L and/or retracted along the longitudinal axis L, allowing the all-terrain vehicle 2 to be larger and/or smaller than the exemplary off-road vehicle 2 shown in FIG. 1. For instance, the all-terrain vehicle 2 may include two or more rows of seating 20, which may extend the all-terrain vehicle 2 along the longitudinal axis L. Additionally, or alternatively, in some embodiments, the cargo area 22 may be larger—allowing a user to store more cargo in the all-terrain vehicle 2. Additionally, or alternatively, in some embodiments, the all-terrain vehicle 2 may be wider than the embodiment shown in FIG. 1. For example, the seating 20 might not be side-by-side bucket-type seats. Instead, the seating 20 may include three or more seats that are side-by-side. The present disclosure encompasses the exemplary embodiment shown in FIG. 1, along with all other exemplary embodiments of off-road vehicles, such as the example shown in FIG. 1A.

Figure 3:
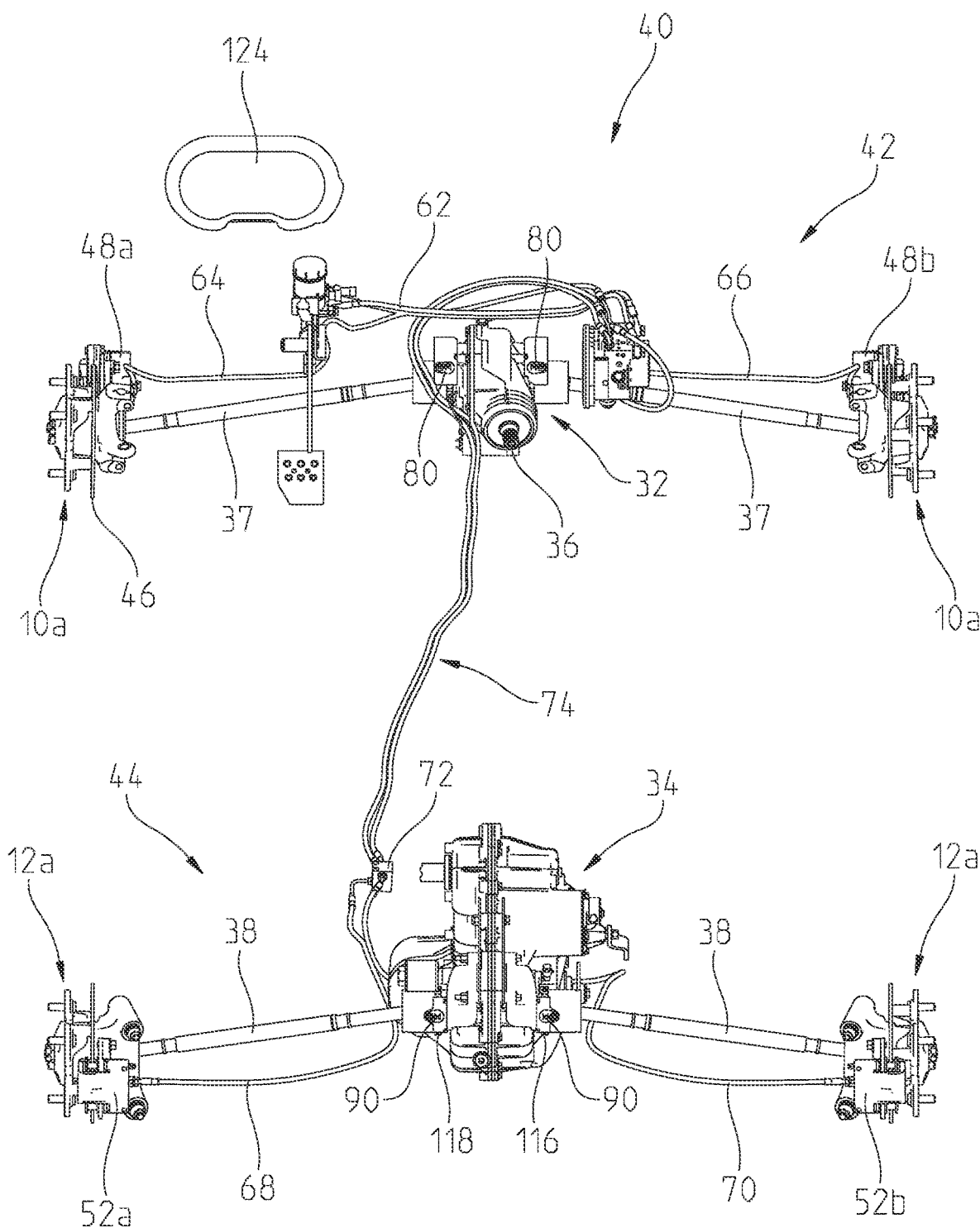
FIG. 3 illustrates a rear perspective view of the braking assembly of FIG. 2.
Figure 4:
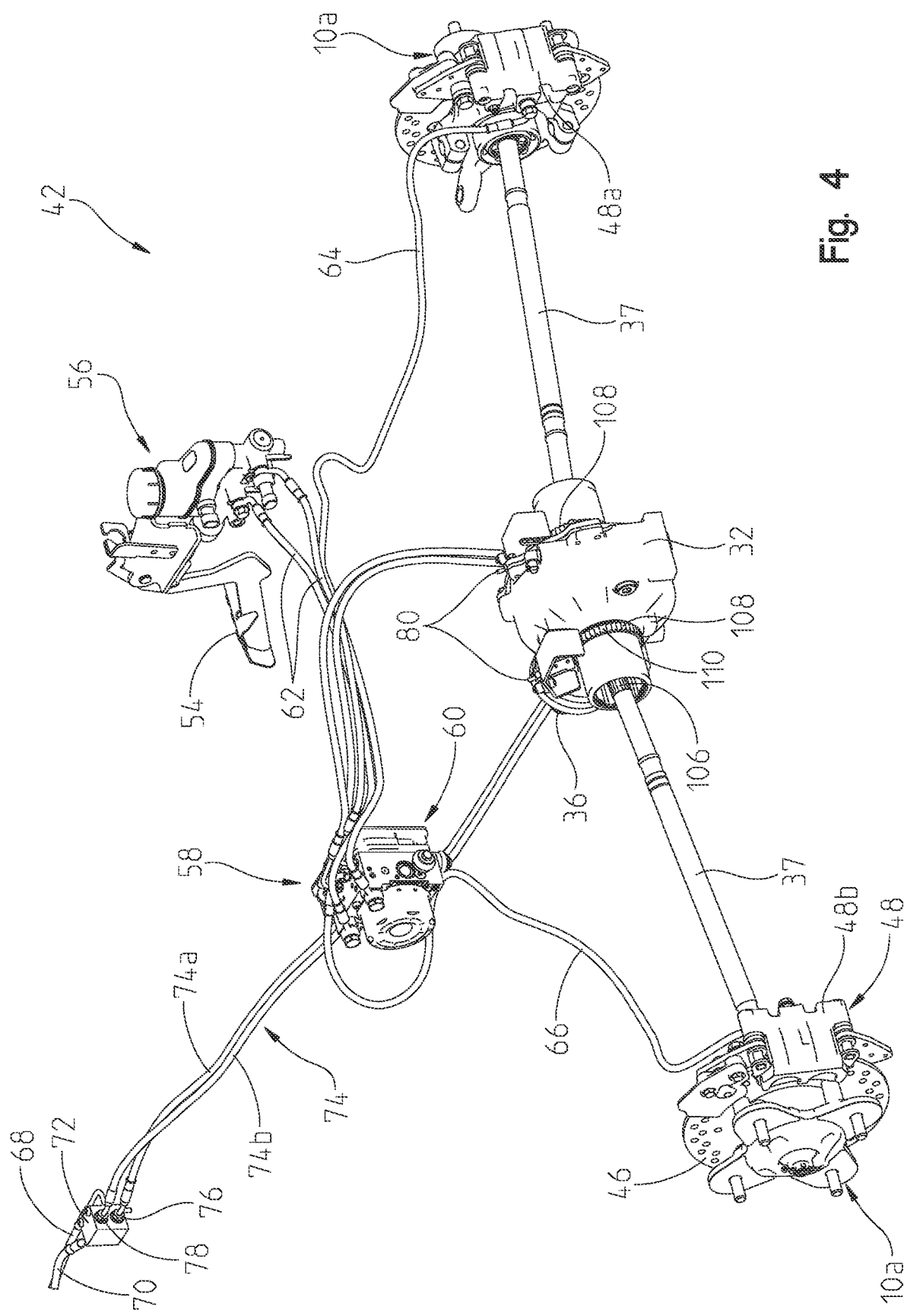
FIG. 4 illustrates a right front perspective view of a front portion of the braking assembly of FIG. 2.

Referring to FIGS. 2-4, vehicle 2 includes a braking assembly 40, illustratively an electronic stability control system ("ESC") which includes a front end braking portion 42 positioned generally at front end portion 14 of vehicle 2 and is operably coupled to front ground-engaging members 10 and a rear end braking portion 44 positioned generally at rear end portion 16 of vehicle 2 and is operably coupled to rear ground-engaging members 12. Front end braking portion 42 includes front brake discs 46 and front brake calipers 48 operably coupled to front wheel assemblies 10a. Rear end braking portion 44 includes rear brake discs 50 and rear brake calipers 52 operably coupled to rear wheel assemblies 12a.

As shown in FIGS. 2-4, braking assembly 40 also includes brake member 54, illustratively a brake pedal, positioned within operator area 18 and is defined as one of the operator controls 24 (FIG. 1). Brake member 54 is operably coupled to a brake master cylinder 56 such that braking input from the operator of vehicle 2 is applied to brake member 54 and is transmitted to brake master cylinder 56.

Referring still to FIGS. 2-4, brake master cylinder 56 is operably coupled to a braking control system 58 which includes a hydraulic and electric controller unit (HECU) 60. More particularly, brake master cylinder 56 is fluidly coupled to HECU 60 through conduit(s) or line(s) 62. Illustratively, HECU 60 may be hydraulically actuated such that pressurized hydraulic fluid is configured to assist with the operation of braking assembly 40.

Figure 10:
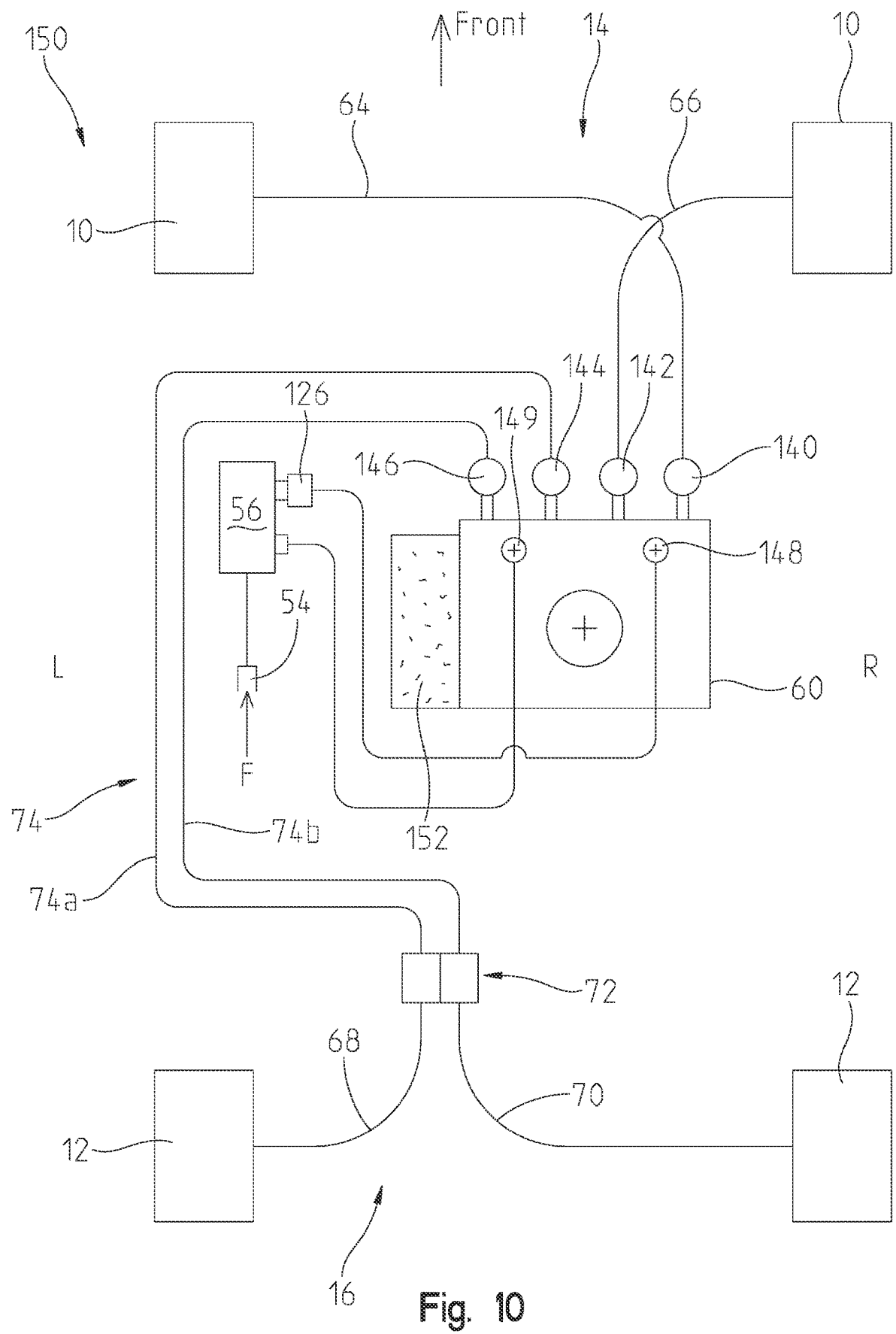
FIG. 10 illustrates a schematic view of a hydraulic circuit of the braking assembly of FIG. 2.

HECU 60 also is fluidly coupled with brake calipers 48, 52. Illustratively, as shown in FIGS. 2-4, braking assembly 40 further includes a front left conduit or line 64, a front right conduit or line 66, a rear left conduit or line 68, and a rear right conduit or line 70 which are all fluidly coupled to HECU 60 through four channels, namely a front left channel 140, a front right channel 142, a rear left channel 144, and a rear right channel 146, respectively (FIG. 10). In this way, front left conduit 64 fluidly couples front left brake caliper 48a with HECU 60, front right conduit 66 fluidly couples front right brake caliper 48b with HECU 60, rear left conduit 68 fluidly couples rear left brake caliper 52a with HECU 60, and rear right conduit 70 fluidly couples rear right brake caliper 52b with HECU 60. HECU 60 also may include a front master cylinder output 148 and a rear master cylinder output 149, both of which are operably coupled to brake master cylinder 56 (FIG. 10), as disclosed herein.

Referring to FIGS. 2-5, with respect to rear end braking portion 44, conduits 68, 70 are fluidly coupled to HECU 60 through a junction member or box 72. Illustratively, at least one junction conduit or line 74 (illustratively first and second junction conduits 74a, 74b) extends from HECU 60 to junction member 72 such that HECU 60 is fluidly coupled with rear brake calipers 52a, 52b through junction conduit 74, junction member 72, and respective rear left and right conduits 68, 70.

Figure 5:
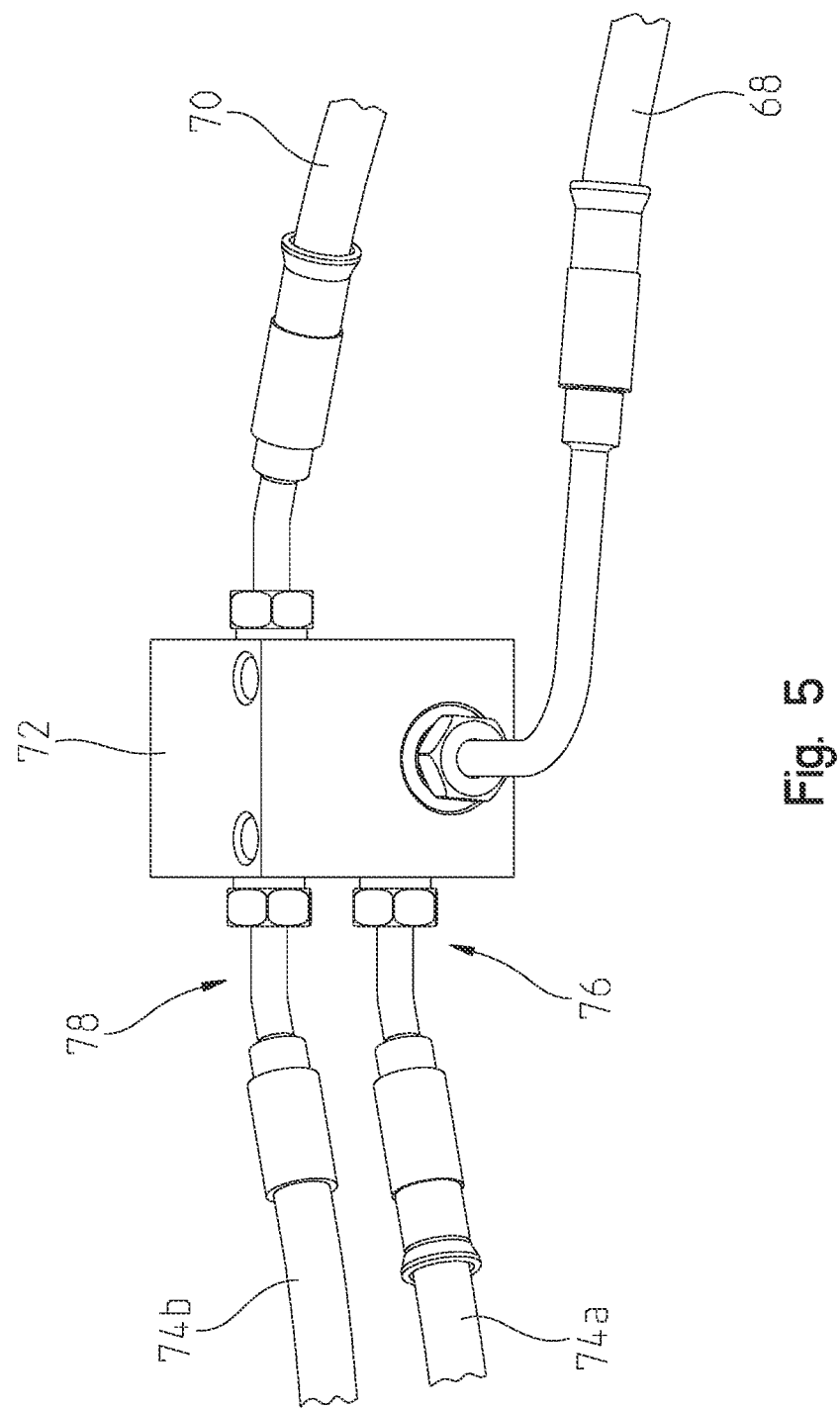
FIG. 5 illustrates a junction member of the braking assembly of FIG. 2.

As shown best in FIG. 5, junction member 72 includes a first input 76 fluidly coupled to rear left conduit 68 through first junction conduit 74a and a second input 78 fluidly coupled to rear right conduit 70 through second junction conduit 74b. Junction member 72 facilitates serviceability of braking assembly 40 because if a repair or replacement is needed to rear end braking portion 44, then the repair or replacement may be made at the location of junction member 72, rather than having to fully disassemble all of braking assembly 40 for a repair to only a portion thereof. Additionally, junction member 72 is provided to allow for different braking pressures to be transmitted to rear brake calipers 52a, 52b. For example, a first braking pressure may be provided to rear brake caliper 52a through first junction conduit 74a and rear left conduit 68 while a greater or lesser braking pressure may be provided rear brake caliper 52b through second junction conduit 74b and rear right conduit 70.

Figure 6:
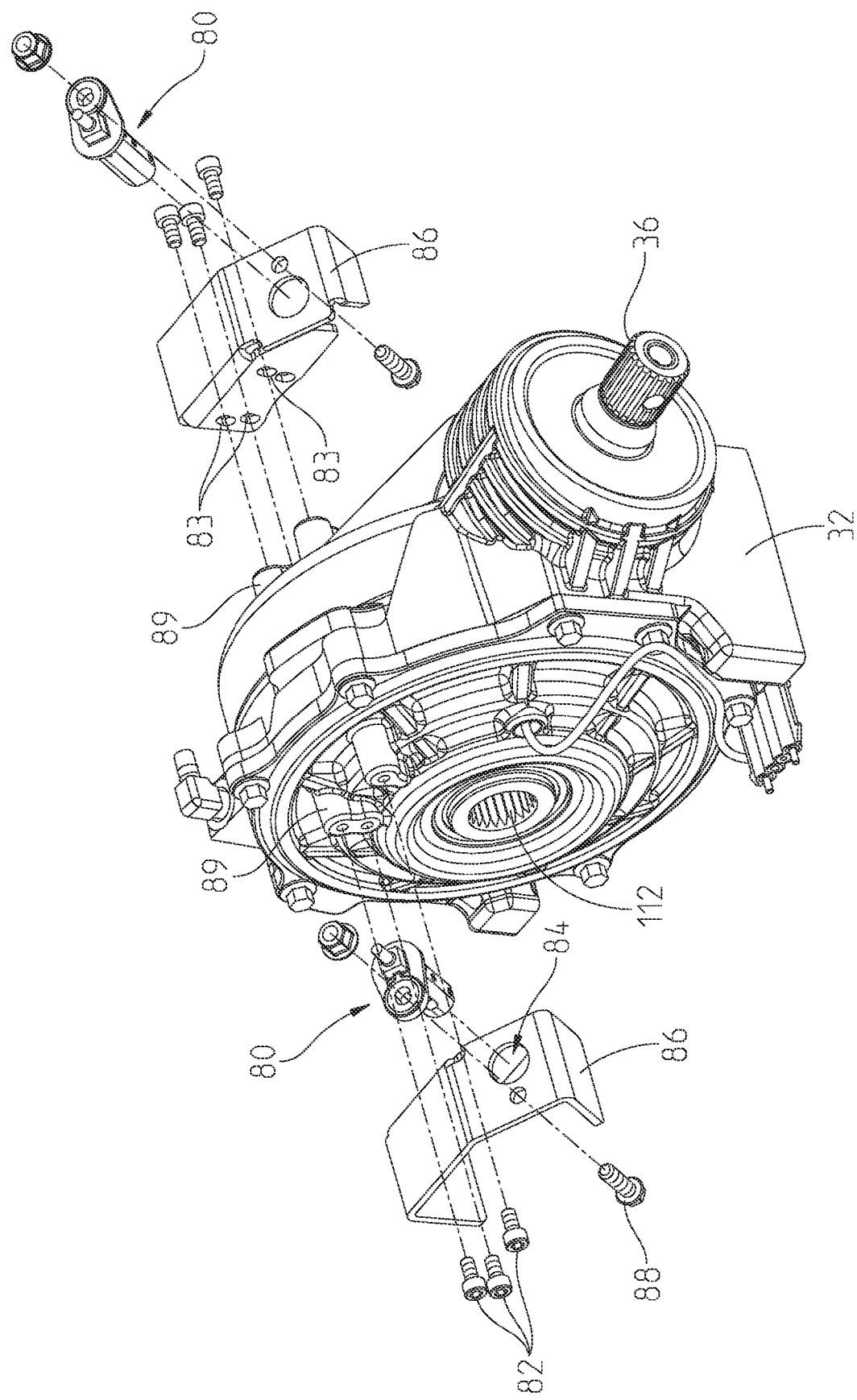
FIG. 6 illustrates a left rear perspective view of a front drive member of the all-terrain vehicle of FIGS. 1A and 1B.

Referring now to FIG. 6, braking control system 58 further includes front wheel speed sensors 80 configured to determine the rotational speed of front ground-engaging members 10 (FIG. 1). Illustratively, each of front ground-engaging members 10 includes an individual wheel speed sensor 80. In one embodiment, wheel speed sensor 80 is coupled to a portion of front final drive member 32 through fasteners 82. Additionally, or alternatively, according to certain embodiments, the wheel speed sensor(s) 80 is housed in a knuckle of a ground-engaging member 10, 12 and the encoder is on the CV bell or integrated into a bearing of the ground-engaging member 10, 12. As shown in FIG. 6, wheel speed sensor 80 is received through an aperture 84 of a mounting bracket 86. Mounting bracket 86 is coupled to a lateral portion of front final drive member 32 with fasteners 82 which are received within mounting bores 89 on the lateral portions of front final drive member 32. More particularly, fasteners 82 are received within openings 83 on bracket 86, which have an oval or oblong shape, thereby allowing the position of bracket 86 and sensor 80 to be adjustable relative to axle 37. Additional fasteners or couplers 88 are configured to removably couple sensor 80 on mounting bracket 86. It may be appreciated that sensor 80 is generally surrounded by mounting bracket 86 such that mounting bracket 86 conceals at least a portion of sensor 80 from debris and/or objects that may travel towards sensor 80 when vehicle 2 is moving, thereby minimizing damage to sensor 80 during operation of vehicle 2.

As shown best in FIG. 4, each of front half shafts 37 includes a drive coupling with a splined shaft 106. Splined shaft 106 may couple with an output 112 (FIG. 6) of front final drive member 32. Additionally, a gear ring 108 is positioned on the outer surface of each of the drive couplings and is held in position relative to half shafts 37. As such, gear ring 108 is configured to rotate with its corresponding half shaft 37. Each of gear rings 108 includes a plurality of teeth 110 which cooperate with sensor 80 to determine the speed of each half shaft 37. Sensors 80 are positioned in proximity to teeth 110 but do not contact teeth 110; rather sensors 80 count teeth 110 as teeth 110 pass sensor 80 over a specific time period to calculate an angular velocity. Sensors 80 may be speed sensors such as Hall Effect speed sensors.

Figure 7:
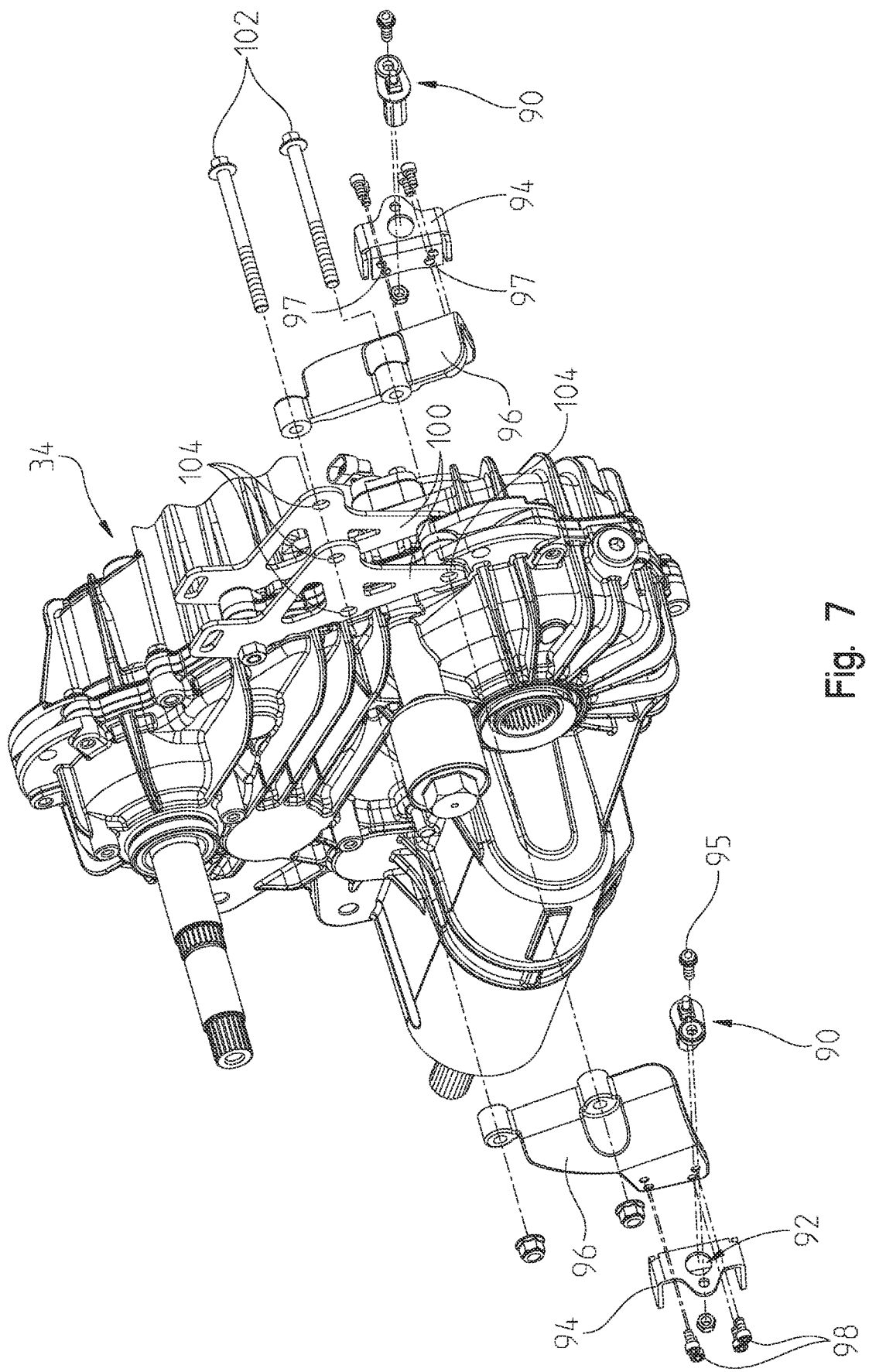
FIG. 7 illustrates a left rear perspective view of a rear drive member of the all-terrain vehicle of FIGS. 1A and 1B.

Referring to FIG. 7, braking control system 58 also includes rear wheel speed sensors 90 configured to determine the rotational speed of rear ground-engaging members 12 (FIG. 1). Illustratively, each of rear ground-engaging members 12 includes an individual wheel speed sensor 90. In one embodiment, wheel speed sensor 90 is coupled to a portion of rear final drive member 34. As shown in FIG. 7, wheel speed sensor 90 is received through an aperture 92 of a first mounting bracket 94 and is coupled to first mounting bracket 94 with fasteners 95. It may be appreciated that sensor 90 is generally surrounded by first mounting bracket 94 such that mounting bracket 94 conceals at least a portion of sensor 90 from debris and/or objects that may travel towards sensor 90 when vehicle 2 is moving, thereby minimizing damage to sensor 90 during operation of vehicle 2.

First mounting bracket 94 is coupled to a second mounting bracket 96 through fasteners 98. More particularly, fasteners 98 are received within openings 97 on first mounting bracket 94, which have an oval or oblong shape, thereby allowing the position of first mounting bracket 94 and sensor 90 to be adjustable relative to axle 38. And, second mounting bracket 96 is coupled to retainer members 100 on lateral portions of rear final drive member 34. Additional fasteners or couplers 102 are configured to removably couple second mounting bracket 96 to retainers 100 because fasteners 102 are received through apertures 104 of retainers 100. It may be appreciated that retainers 100 include a plurality of apertures 104 such that fasteners 102 can be received through any of apertures 104 to adjust the position of second mounting bracket 96 relative to axle 38, thereby also allowing for the position of sensor 90 to be adjustable relative to axle 38.

As shown best in FIGS. 2 and 3, each of rear half shafts 38 includes a drive coupling with a splined shaft 114 (FIG. 3). Splined shaft 114 couples with an output (not shown) of rear final drive member 34. Additionally, a gear ring 116 is positioned on the outer surface of each of the rear drive couplings and is held in position relative to its corresponding rear half shaft 38. As such, gear ring 116 is configured to rotate with its corresponding rear half shaft 38. Each of gear rings 116 includes a plurality of teeth 118 which cooperate with sensor 90 to determine the speed of each rear half shaft 38. Sensors 90 are positioned in proximity to teeth 118 but do not contact teeth 118; rather sensors 90 count teeth 118 as teeth 118 pass sensor 90 over a specific time period to calculate an angular velocity. Sensors 90 may be speed sensors such as Hall Effect speed sensors.

Figure 8:
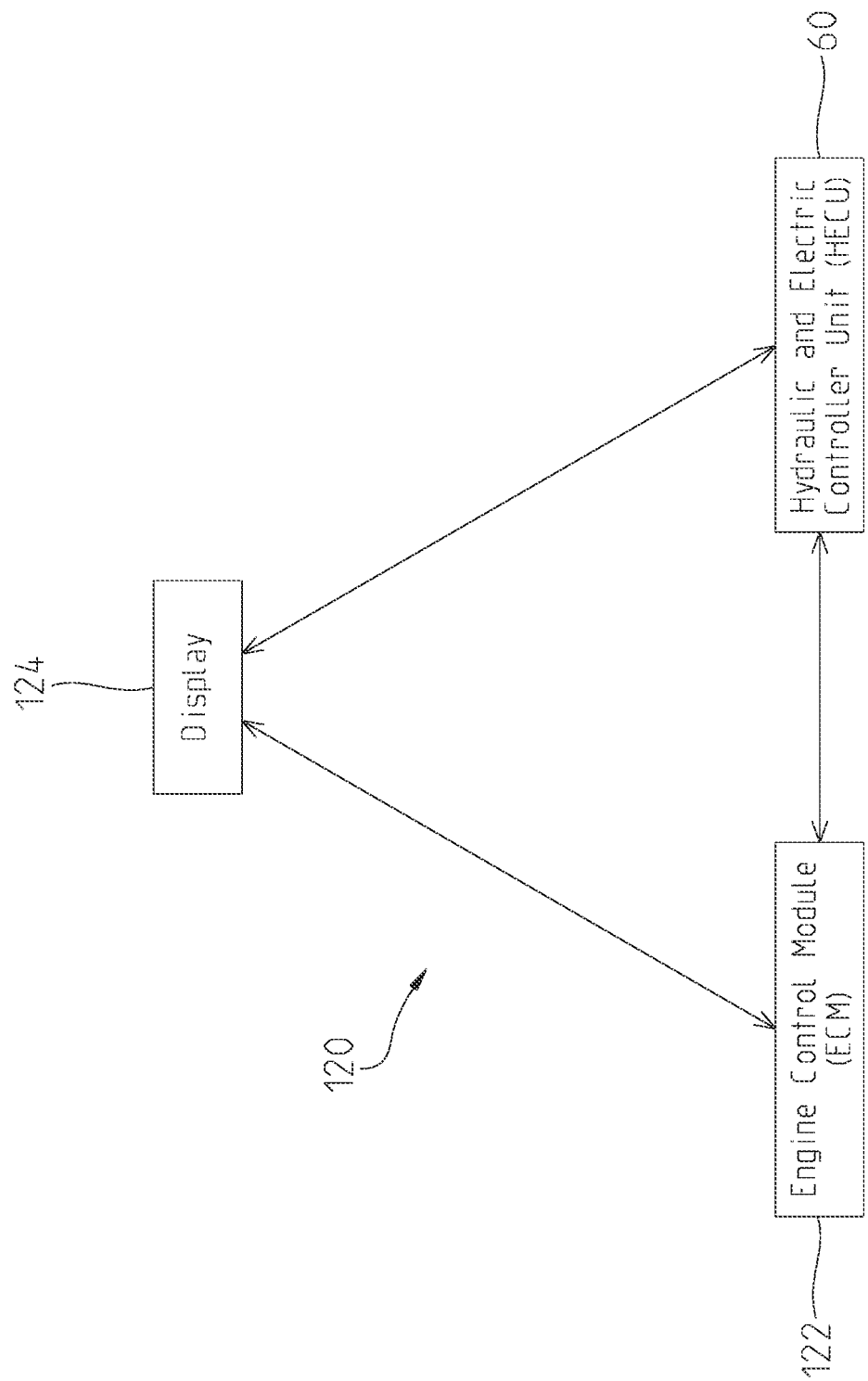
FIG. 8 illustrates a schematic view of a portion of an electrical system of the all-terrain vehicle of FIGS. 1A and 1B.

Referring to FIG. 8, the HECU 60 is electronically coupled or integrated with an overall electrical system 120 of vehicle 2. In some embodiments, the HECU 60 may provide electronic control of the various components of vehicle 2. Further, the HECU 60 is operatively coupled to a plurality of vehicle sensors and/or devices (described below in FIG. 11) that monitor various parameters of vehicle 2 or the environment surrounding vehicle 2. The HECU 60 performs certain operations to control one or more subsystems of other vehicle components, such as the operation of the braking assembly 40. For example, referring back to FIG. 2, the HECU 60 may be configured to hydraulically actuate the ESC system to assist with the operation of the braking assembly 40 (e.g., transfer and/or displace hydraulic fluid to one or more brake calipers, such as brake calipers 48a, 48b, 52a, and/or 52b, to cause the one or more ground-engaging members 10 or 12 to brake). The HECU 60 may be configured to control any type of braking system that permits the vehicle 2 to control the brake pressure on one or more ground-engaging members 10 or 12 as needed without a driver depressing/actuating a brake member, such as brake pedal 54. In other words, the HECU 60 may be configured to perform any of the processing sequences below, such as processing sequences 300-800 and 1400, for any type of braking system that permits the vehicle 2 to control (e.g., apply and/or remove) brake pressure to the ground-engaging members 10 and/or 12 independent of the driver input indicating a braking event (e.g., applying brake pressure without needing a driver to depress the brake pedal 54). The HECU 60 may determine the braking event based on actuation of the brake member 54 (e.g., a brake pedal). In some instances, the HECU 60 may be configured to operate in an HECU intervention mode (e.g., an anti-lock braking system (ABS) mode and/or an electronic stability control (ESC) mode). For example, in some variations, when operating in the ESC mode, the HECU 60 may be configured to reduce brake pressure to one or more of the ground-engaging members 10, 12. In other variations, when operating in the ESC mode, the HECU 60 may be configured to control (e.g., reduce, maintain, and/or increase) brake pressure to one or more of the ground-engaging members 10, 12.

According to certain embodiments, the HECU 60 may operate in an active descent mode, which may be enabled by a user and/or automatically activated by the HECU 60. In an active descent mode, the vehicle speed sensor 214 and/or the wheel speed sensors 80, 90 may measure an increase in speed without a corresponding input from the throttle pedal position 208 sensor. Based on the increase in speed without an input from the throttle pedal position 208 sensor, the HECU 60 may determine the vehicle 2 is on an incline and/or unintentionally speeding up. As such, the HECU 60 may apply brake pressure to one or more of the ground-engaging members 10, 12 in order to slow the vehicle 2 when the vehicle 2 speed is increasing without an input from the throttle pedal. The HECU 60, the processing sequences 300-1200, and the braking event are described in more detail below.

In some embodiments, the HECU 60 forms a portion of a processing subsystem including one or more computing devices having memory, processing, and communication hardware. The HECU 60 may be a single device (e.g., controller) or a distributed device, and the functions of the HECU 60 may be performed by hardware and/or as computer instructions on a non-transitory computer readable storage medium.

Electrical system 120 of vehicle 2 may include an engine control module ("ECM") 122 and at least one display, gauge, and/or user interface 124. Display 124 is supported within operator area 18 (FIG. 1) and is configured to provide information about vehicle 2 to the operator. In one embodiment, HECU 60 may communicate with the display 124 such that the operator may provide a user input or user selection through display 124. Illustrative display 124 may include toggle switches, buttons, a touchscreen, or any other type of surface or member configured to receive and transmit a selection made by the user. For instance, the user may activate and/or toggle a button on the display 124. The display 124 may transmit a signal to the HECU 60 indicating the button has been actuated. Based on the particular button, the HECU 60 may generate one or more commands for the braking assembly 40 (e.g., displacing hydraulic fluid to one or more brake calipers 48*a*, 48*b*, 52*a*, and/or 52*b*) based on the actuation of the user input and/or on the actuation of the user input and one or more monitored parameters, such as sensor values.

Additionally, or alternatively, HECU 60 is configured to transmit information about braking assembly 40 to display 124 to provide such information to the operator. For example, the HECU 60 may be configured to transmit a fault signal to display 124 to indicate to the operator that a fault has occurred within a portion of braking assembly 40, such as a fault of the ESC feature of braking assembly 40. The fault indicator provided on display 124 may be a light, an alphanumeric code or message, or any other indication configured to alert the user of the fault.

Additionally, or alternatively, ECM 122 is in electronic communication with the display 124 and/or the HECU 60 to provide information to the operator and/or controller about the engine (not shown) or other components of powertrain assembly 30. Illustratively, ECM 122 transmits various signals to provide information such as engine speed (RPM), engine torque, engine temperature, oil pressure, the driving gear or mode, and/or any other information about powertrain assembly 30. Additionally, as shown in FIG. 8, display 124 is configured to provide inputs and other information to ECM 122. For example, if illustrative vehicle 2 is configured with an adjustable speed limiting device and feature, the user may input speed limits to display 124 which are transmitted to ECM 122 from display 124 to control the speed of vehicle 2, as disclosed further herein.

Figure 9:
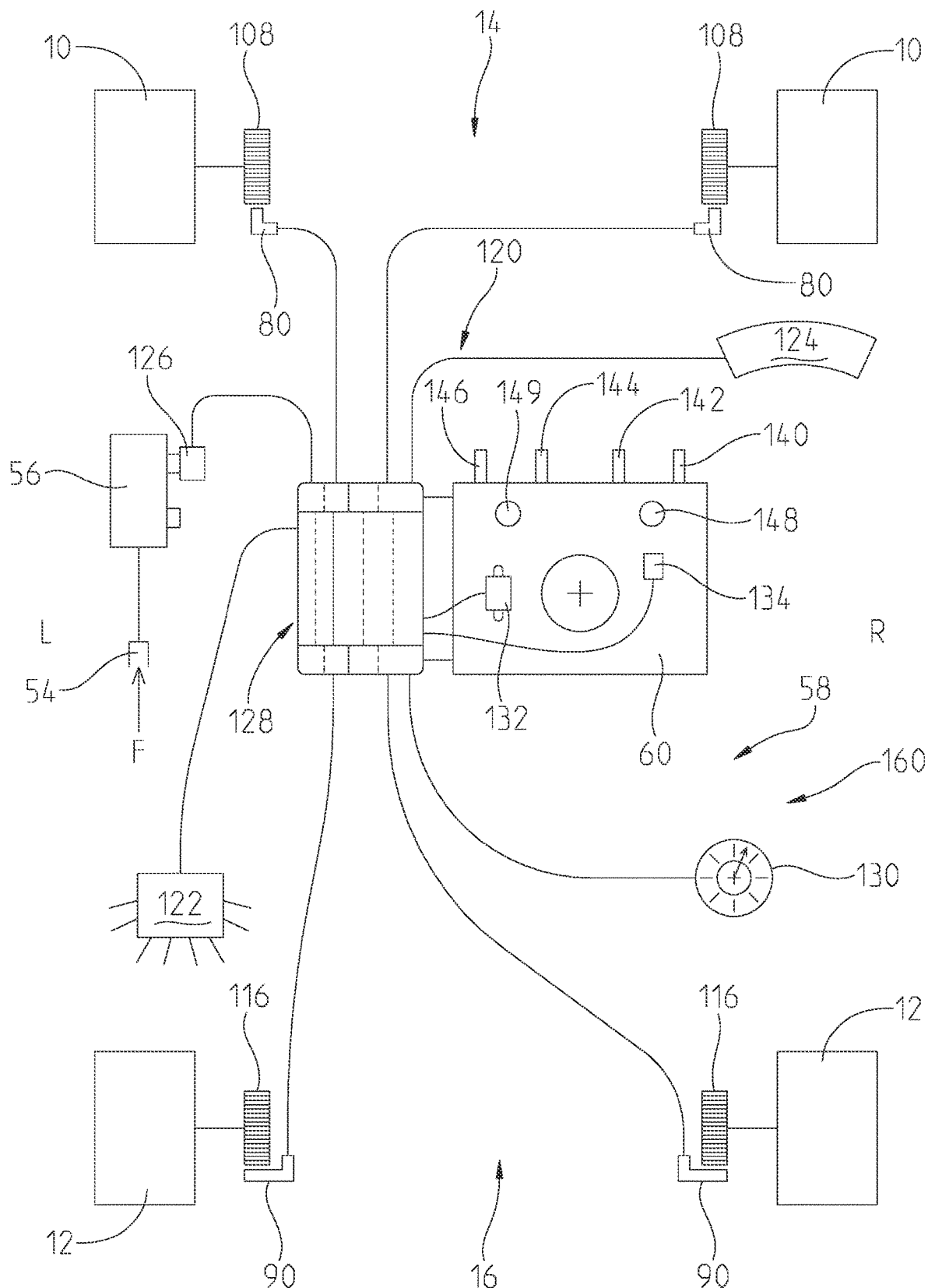
FIG. 9 illustrates a schematic view of an electronic braking circuit of the electrical system of FIG. 8.

Referring to FIG. 9, a schematic view of braking control system 58 and at least a portion of electrical system 120 is disclosed with respect to operation of braking assembly 40. As denoted, front end portion 14 and rear end portion 16 are shown and the left side of vehicle 2 is denoted with "L" and the right side of vehicle 2 is denoted with "R." As shown in FIG. 9, when the operator depresses brake member 54 with a force F, force F is transmitted to brake master cylinder 56, which may be a tandem master cylinder in one embodiment. Brake master cylinder 56 is configured to transmit braking input information to a brake pressure switch 126. Brake pressure switch 126 is then configured to transmit a signal indicative of braking pressure information to a multi-pin connector 128. Multi-pin connector 128 also may be configured to transmit and/or receive information to and from ECM 122, a steering angle sensor 130 of electrical system 120, the display 124, and/or the HECU 60.

HECU 60 may include a multi-axis G sensor 132 and a pressure sensor 134, one or both of which may be internal or external sensors and are configured for communication with multi-pin connector 128. Additionally, multi-pin connector 128 is electrically coupled with front wheel speed sensors 80 and rear wheel speed sensors 90.

Referring now to FIG. 10, a schematic view of a hydraulic system 150 of vehicle 2 is disclosed with respect to operation of braking assembly 40. Hydraulic system 150 includes a hydraulic reservoir 152 fluidly coupled to HECU 60 and also fluidly coupled to junction member 72, and ground-engaging members 10, 12 through any of conduits 64, 66, 68, 70, 74. In operation, as force F is applied to brake member 54 by the operator, brake master cylinder 56 transmits force F to HECU 60 through at least brake pressure switch 126. More particularly, brake master cylinder 56 is in communication with front and rear master cylinder outputs 148, 149 which allows hydraulic fluid from hydraulic fluid reservoir 152 to flow to front and rear ground-engaging members 10, 12 through channels 140, 142, 144, 146.

Illustratively, and still referring to FIG. 10, as force F is applied to brake member 54, brake master cylinder 56 provides an input to front master cylinder output 148 through brake pressure switch 126 to initiate a flow of hydraulic fluid through front left channel 140 and front left conduit 64 to front left ground-engaging member 10. Additionally, the input provided to front master cylinder output 148 through brake pressure switch 126 also initiates a flow of hydraulic fluid through front right channel 142 and front right conduit 66 to front right ground-engaging member 10. With respect to rear ground-engaging members 12, as force F is applied to brake member 54, brake master cylinder 56 provides an input to rear master cylinder output 149 to initiate a flow of hydraulic fluid through rear left channel 144, first junction conduit 74*a*, junction member 72, and rear left conduit 68 to rear left ground-engaging member 12. Additionally, the input provided to rear master cylinder output 149 from brake master cylinder 56 also initiates a flow of hydraulic fluid through rear right channel 146, second junction conduit 74*b*, junction member 72, and rear right conduit 70 to rear right ground-engaging member 12. In this way, a single actuation of braking assembly 40 when the operator depresses brake member 54 allows for braking of all ground-engaging members 10, 12 through the four channels 140, 142, 144, 146 of HECU 60. It may be appreciated that, in certain modes, the HECU 60 may control the flow of hydraulic fluid to any of the brake calipers 48 or 52. For example, as described below, the HECU 60 may initiate a flow to one or more brake calipers of the vehicle 2. For instance, to allow for better and/or smaller turning radiuses, the HECU 60 may slow down the inner rear ground-engaging member 12*a* (e.g., initiate flow of hydraulic fluid to only 52*a*) while maintaining the speed of the outer rear ground-engaging member 12*b*. Additionally, or alternatively, the HECU 60 may slow down the inner front ground-engaging member 10*a* (e.g., initiate flow of hydraulic fluid to only 52*a*) while maintaining the speed of the outer front ground-engaging member 10*b*. By slowing down the inner rear ground-engaging member 12*a* and/or the inner front ground-engaging member 10*a*, the HECU 60 may cause the vehicle 2 to achieve better and/or smaller turning radiuses. In certain instances, this mode may be referred to herein as "cutter brake mode".

Figure 11:
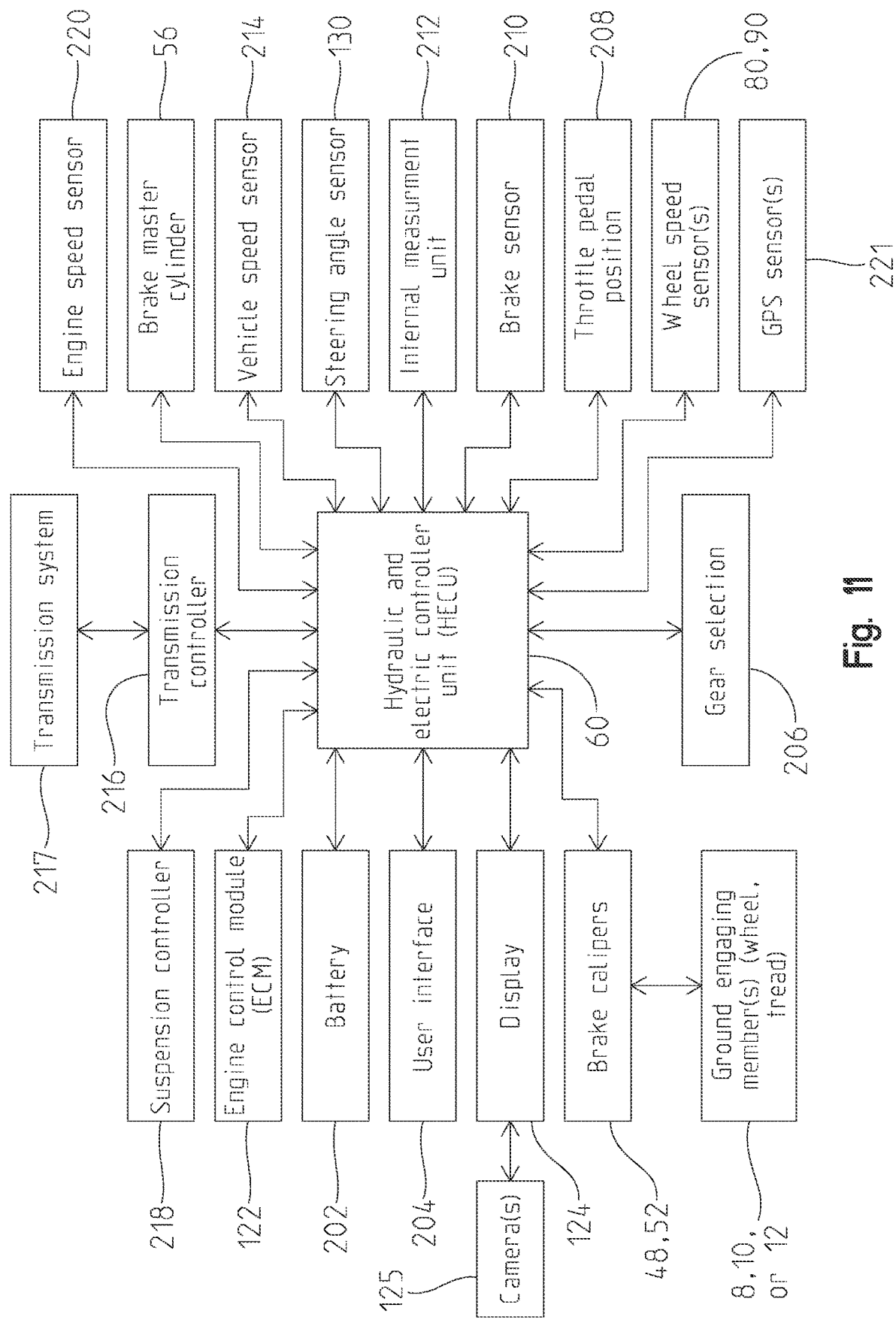
FIG. 11 illustrates a representative view of components of a vehicle of the present disclosure having an ESC system with a plurality of sensors, devices, and/or sub-systems integrated with a control unit of the vehicle.

Referring now to FIG. 11, the HECU 60 may be connected to a plurality of devices, sensors, and/or sub-systems of vehicle 2. In an illustrated embodiment of the present disclosure, the HECU 60 is connected and/or in communication with a plurality of devices, sensors, and/or sub-systems such as the ECM 122, the battery 202, the user interface 204, the display 124, the brake calipers 48, 52, the gear selection 206, the wheel speed sensor(s) 80, 90, the throttle pedal position 208, the brake sensor 210, the inertial measurement unit (IMU) 212, the steering angle sensor 130, the vehicle speed sensor 214, the brake master cylinder 56, the engine speed sensor 220, the suspension controller 218, the transmission controller 216, and/or the global positioning system (GPS) sensor(s) 221. For example, the HECU 60 may be in electrical communication (e.g., transmits and/or receives information) with the devices, sensors, and/or sub-systems of vehicle 2. The HECU 60 may communicate with the sensors, devices, and/or sub-systems via a bus (e.g., a data bus) and/or wirelessly. Additionally, or alternatively, the HECU 60 may be hydraulically connected to the devices, sensors, and/or sub-systems of vehicle 2. For example, the HECU 60 may be hydraulically and/or electrically connected to the brake master cylinder 56 and/or the brake calipers 48, 52. As mentioned previously, the brake calipers 48 or 52 may be connected to the front ground-engaging member(s) 10 and/or the rear ground-engaging members 12. In embodiments, each of left front, right front, left rear, and right rear ground-engaging members have an associated brake caliper controlled by HECU 60. In some instances, the ECM 122 may include one or more controllers and/or units, such as the transmission controller 216, the suspension controller 218, and/or the HECU 60. In other instances, the ECM 122, the transmission controller 216, the suspension controller 218, and/or the HECU 60 may be a collection of controllers. Additionally, or alternatively, these controllers/units 60, 218, 216, 122 and/or additional controllers and units may work together to implement and/or perform the logic or blocks described below.

Referring now to the devices, sensors, and/or sub-systems of vehicle 2, a user interface 204 is provided in a location easily accessible to the driver operating the vehicle 2. In some embodiments, the display 124 described above may be integrated with the user interface 204. User interface 204 (e.g., display 124) includes user input devices to allow the driver or a passenger to manually adjust HECU intervention modes described below during and/or before the operation of the vehicle 2.

Exemplary input devices for user interfaces 204 include levers, buttons, switches, soft keys, and other suitable input devices. User interface 204 may also include output devices to communicate information to the operator. Exemplary output devices include lights, displays, audio devices, tactile devices, and other suitable output devices. In another illustrated embodiment, the user input and/or output devices of the user interface 204 may be on a steering wheel, handlebar, and/or other steering control of the vehicle 2.

In some embodiments, the display 124 may be coupled to one or more cameras 125. The camera(s) 125 may be integrated into the all-terrain vehicle 2 in order to image and/or record the surroundings of the vehicle 2. The images and/or recordings produced by the camera(s) 125 may be used by the user operating the vehicle 2 to view any blind spots of the user of the vehicle 102 and/or make it easier for the user to view the user's surroundings. According to some embodiments, the camera(s) 125 may include one or more front-facing cameras, one or more side-facing cameras, and/or one or more rear-facing cameras. The rear-facing camera(s) may be used to view what is behind the vehicle 2 when the vehicle 2 is intentionally (e.g., when the transmission system 217 is in reverse gear) or unintentionally moving backwards (e.g., when the transmission system 217 is not a reverse gear), as explained in more detail below.

According to some embodiments, the display 124 and the user interface 204 may be separate (e.g., the user interface 204 is mounted adjacent the driver's seat on the dashboard of the vehicle 2 and next to the display 124 shown in FIG. 1). The display 124 may display information related to the HECU intervention modes, and the user interface 204 may include input and output devices as described above.

According to certain embodiments, the transmission controller 216 may control the transmission system 217 of vehicle 2. For example, the transmission controller 216 may transmit information to the HECU 60 such as gear position of the transmission system 217 (e.g., drive, neutral, reverse, and/or park), differential status (e.g., locked, unlocked, smart locking (i.e., controlled slip)), and/or wheel torque. The HECU 60, in response to the transmitted information, may generate one or more signals and may transmit them back to the transmission controller 216.

According to certain embodiments, the GPS sensor(s) 221 may determine coordinates of the all-terrain vehicle 2 and may facilitate determining whether the vehicle 2 is stationary or moving. Whether the vehicle 2 is moving or stationary may be used in one or more of the embodiments described below. While the GPS sensor(s) 221 are illustrated as being coupled to the HECU 60, the GPS sensor(s) 221 may additionally or alternatively be communicatively coupled to one or more other controllers and/or units of the vehicle 2.

According to certain embodiments, the IMU 212 may include a plurality of IMUs 212 such that each IMU is arranged on the vehicle 2 to sense inertial magnitudes in the x-direction, y-direction, and/or z-direction, respectively. As such, the IMUs 212 may be used to determine a pitch angle and/or roll angle of the all-terrain vehicle 2. Exemplary IMUs 212 include accelerometers, gyroscopes, and other suitable sensors. Exemplary sensors and monitoring systems are disclosed in U.S. patent application Ser. No. 15/816,368, filed Nov. 17, 2017, titled VEHICLE HAVING ADJUSTABLE SUSPENSION, the entire disclosure of which is expressly incorporated herein by reference.

Figure 12:
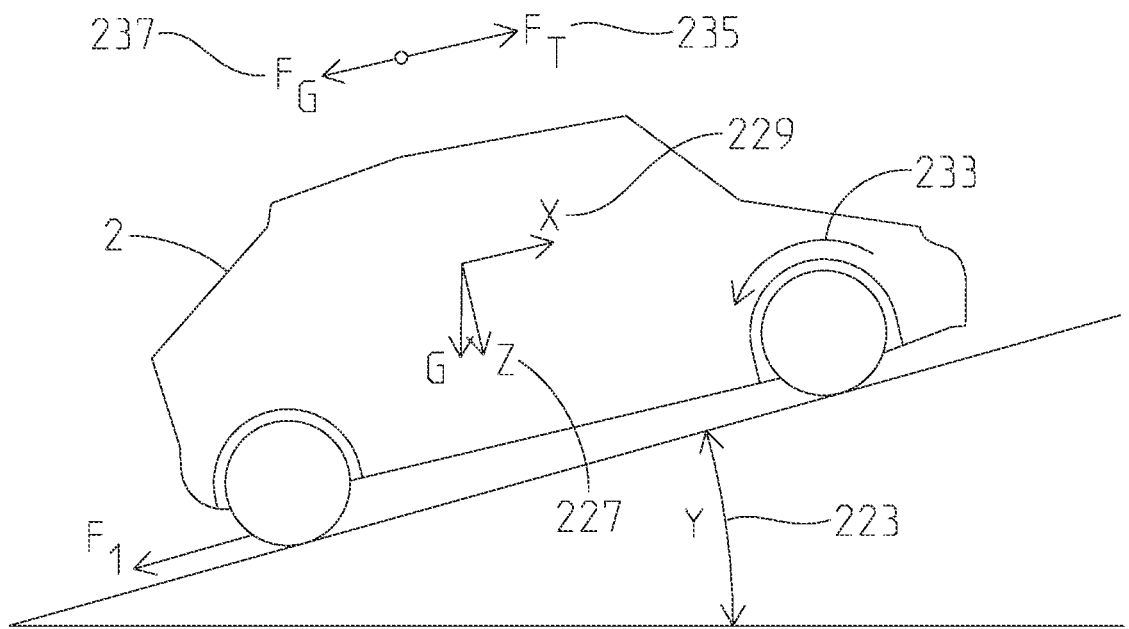
FIG. 12 illustrates a side view of an all-terrain vehicle on an incline having a pitch angle γ.
Figure 13:
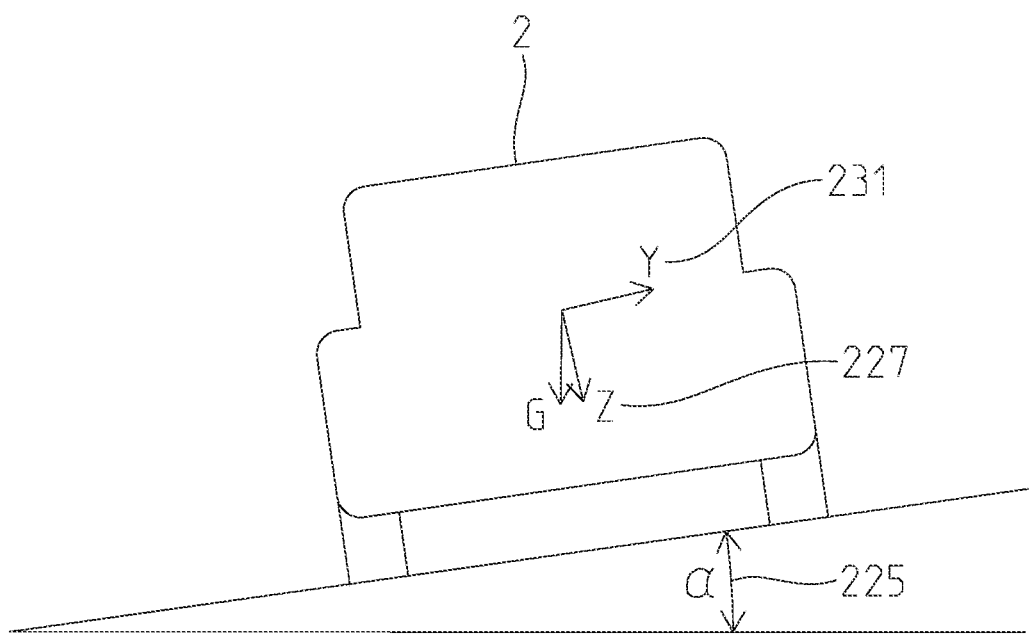
FIG. 13 illustrates a rear view of an all-terrain vehicle on an incline having a roll angle α.

For example, referring to FIGS. 12 and 13, the all-terrain vehicle 2 may be on an incline having a pitch angle γ 223 and/or an incline having a roll angle α 225. According to embodiments, the vehicle 2 may have an inertial magnitude equal to 1.000 in the z-direction 227 when the vehicle 2 is on flat ground (not shown). Additionally, if the vehicle 2 were on an incline having a pitch angle γ 223 equal to 90 degrees, the vehicle 2 would have an inertial magnitude equal to 1.000 in the x-direction 229, assuming the vehicle 2 is facing in the direction shown in FIG. 12. Conversely, if the vehicle 2 were facing in the opposite direction shown in FIG. 12 and the pitch angle γ 223 was equal to 90 degrees, then the vehicle 2 would have an inertial magnitude of −1.000 in the x-direction 229. Moreover, if the vehicle 2 were on an incline having a roll angle α 225 equal to 90 degrees, the vehicle 2 would have an inertial magnitude equal to 1.000 in the y-direction 231, assuming the vehicle 2 is facing in the direction shown in FIG. 13. Conversely, if the vehicle 2 were facing in the opposite direction shown in FIG. 13 and the roll angle α 225 was equal to 90 degrees, then the vehicle 2 would have an inertial magnitude of −1.000 in the y-direction 231.

Therefore, in the event the vehicle 2 is on an incline having a pitch angle γ 223 between zero degrees and ninety degrees, the IMUs 212 will sense: (i) an inertial magnitude in the x-direction 229 that is between 0.000 and 1.000 and (ii) an inertial magnitude between 0.000 and 1.000 in the z-direction. Furthermore, in the event the vehicle 2 is on an incline having a pitch angle γ 223 between zero degrees and negative ninety degrees, the IMUs 212 will sense: (i) an inertial magnitude in the x-direction 229 that is between −1.000 and 0.000 and (ii) an inertial magnitude between 0.000 and 1.000 in the z-direction.

Similarly, in the event the vehicle 2 is on an incline having a roll angle α 225 between zero degrees and ninety degrees, the IMUs 212 will sense: (i) an inertial magnitude in the y-direction 231 that is between 0.000 and 1.000 and (ii) an inertial magnitude between 0.000 and 1.000 in the z-direction. Furthermore, in the event the vehicle 2 is on an incline having a roll angle α 225 between zero degrees and negative ninety degrees, the IMUs 212 will sense: (i) an inertial magnitude in the y-direction 231 that is between −1.000 and 0.000 and (ii) an inertial magnitude between 0.000 and 1.000 in the z-direction.

Exemplary inertial magnitudes are illustrated in Table 1 below. According to certain embodiments, these inertial magnitudes may be used to determine whether a vehicle 2 is moving backward, as explained in more detail below.

TABLE 1

| Slope γ/α (degrees | Inertial Magnitude x/y-directions | Inertial magnitude z-direction |
|---|---|---|
| 0 | 0.000 | 1.000 |
| 5 | 0.087 | 0.996 |
| 10 | 0.174 | 0.985 |
| 15 | 0.259 | 0.966 |
| 20 | 0.342 | 0.940 |
| 25 | 0.423 | 0.906 |
| 30 | 0.500 | 0.866 |

TABLE 1-continued

| Slope γ/α (degrees | Inertial Magnitude x/y-directions | Inertial magnitude z-direction |
|---|---|---|
| 35 | 0.574 | 0.819 |
| 40 | 0.643 | 0.766 |
| 45 | 0.707 | 0.707 |
| 50 | 0.766 | 0.643 |
| 55 | 0.819 | 0.574 |
| 60 | 0.866 | 0.500 |

Any-Gear Backup Camera and Backup ESC (and/or ABS) Braking

Figure 14:
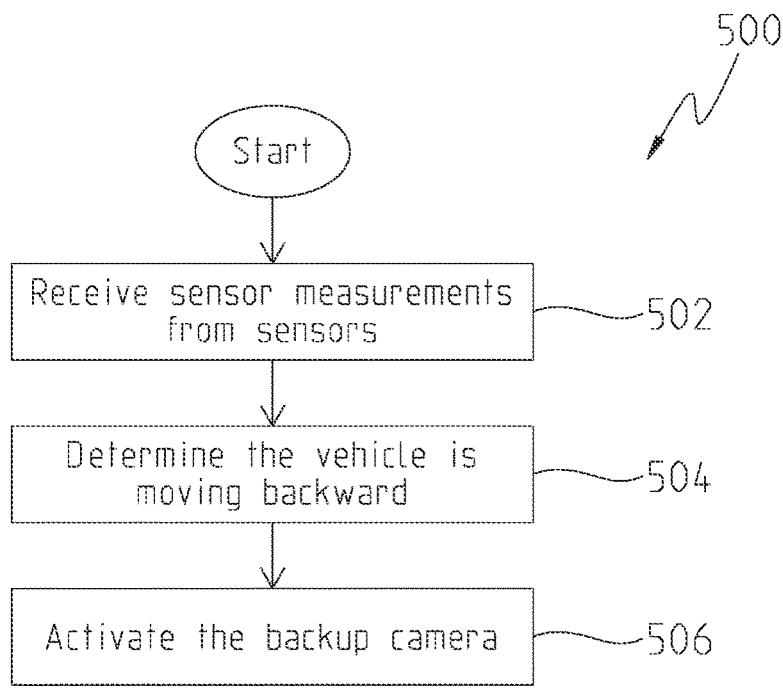
FIG. 14 illustrates a flow diagram of a method for an any-gear backup camera for an all-terrain vehicle.

FIG. 14 illustrates a flow diagram of a method 500 of an any-gear backup camera for an all-terrain vehicle 2. As stated above, during operation in rough terrain, all-terrain vehicles 2 may intentionally or unintentionally roll backwards. In some instances, the all-terrain vehicle 2 may roll backwards when the transmission system 217 is not in a reverse gear. In these embodiments, the user may be unable to see what is behind the all-terrain vehicle 2, which may result in the all-terrain vehicle 2 unintentionally colliding with one or more objects. The embodiments disclosed herein provide a solution to this problem by determining when the all-terrain vehicle 2 is moving backward and automatically displaying images received from the back-up camera on the display 124. Furthermore, oftentimes when a vehicle 2 is rolling backwards, the front wheels 10 may lock up due to the brake force biased to the front axle 37. As such, the method 500 may determine when the vehicle 2 is moving backward and automatically activate ESC (and/or ABS) braking to reduce the likelihood the front wheels 10 lock up.

In operation, as represented by block 502, the HECU 60 receives information (e.g., inputs) from sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11. For example, the HECU 60 may receive information from the GPS sensor(s) 221, the IMUs 212, the wheel speed sensors 80, 90, the engine speed sensor 220, the ECM 122, and/or the throttle pedal position 208 sensor.

Then, the process moves to block 504. As represented by block 504, the HECU 60 determines the information received from the sensors, devices, and/or subsystems whether the vehicle 2 is moving backwards. According to certain embodiments, the wheel speed sensors 80, 90 and/or other sensors included in the vehicle 2 may sense which direction the ground-engaging members 10, 12 and/or axles 37, 38 are rotating. If they are rotating in a reverse direction 233 (shown in FIG. 12), the method 500 can determine the vehicle 2 is moving backward and automatically activate the backup camera 125 (block 506) so that images from the backup camera 125 can be viewed on the display 125. However, in embodiments where the wheel speed sensors 80, 90 and/or other sensors included in the vehicle 2 do not indicate which direction the ground-engaging members 10, 12 and/or axles 37, 38 are rotating, the method 600 may be used to determine the vehicle 2 is moving backward.

Figure 15:
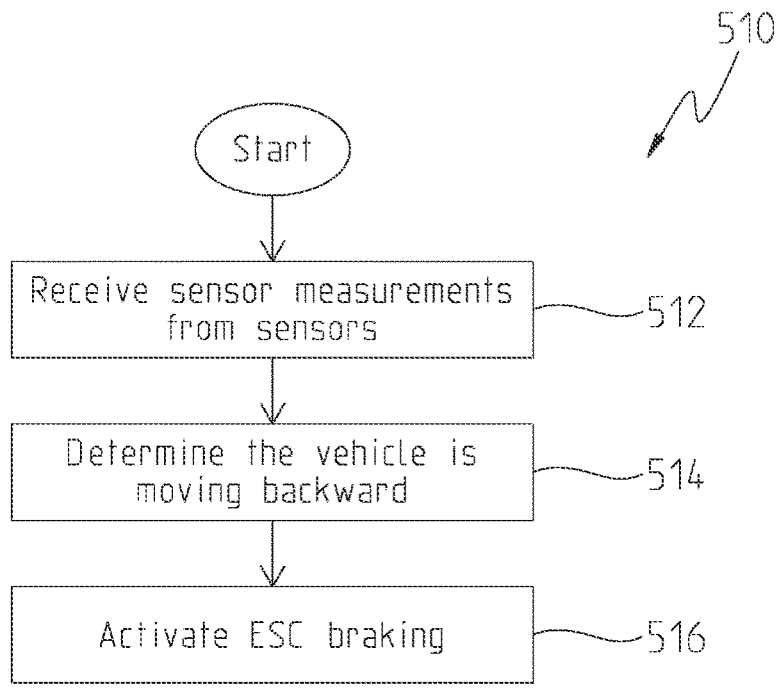
FIG. 15 illustrates a flow diagram of a method for an any-gear backup electronic stability control (ESC) and/or anti-lock braking system (ABS) mode for an all-terrain vehicle.

FIG. 15 illustrates a flow diagram of a method 510 of an any-gear backup electronic stability control (ESC) braking mode for an all-terrain vehicle 2. Activating the ESC (and/or ABS) braking mode when the vehicle 2 is rolling in reverse can increase the braking ability of the vehicle 2, thereby making the vehicle 2 more controllable.

As represented by block 512, the HECU 60 receives information (e.g., inputs) from sensors, devices, and/or subsystems. As described above, FIG. 11 shows a plurality of sensors, devices, and/or subsystems that may be connected (e.g., electrically or hydraulically) with the HECU 60. The HECU 60 may receive (e.g., retrieve and/or obtain) information (e.g., data packets and/or signals indicating sensor readings) from the one or more sensors, devices, and/or subsystems in FIG. 11. For example, the HECU 60 may receive information from the GPS sensor(s) 221, the IMUs 212, the wheel speed sensors 80, 90, the engine speed sensor 220, the ECM 122, and/or the throttle pedal position 208 sensor.

Then, the process moves to block 514. As represented by block 514, the HECU 60 determines the information received from the sensors, devices, and/or subsystems whether the vehicle 2 is moving backwards. According to certain embodiments, the wheel speed sensors 80, 90 and/or other sensors included in the vehicle 2 may sense which direction the ground-engaging members 10, 12 and/or axles 37, 38 are rotating. If they are rotating in a reverse direction 233 (shown in FIG. 12), the method 510 can determine the vehicle 2 is moving backward and automatically activate the ESC (and/or ABS) braking mode (block 516). However, in embodiments where the wheel speed sensors 80, 90 and/or other sensors included in the vehicle 2 do not indicate which direction the ground-engaging members 10, 12 and/or axles 37, 38 are rotating, the method 600 may be used to determine the vehicle 2 is moving backward.

Figure 16:
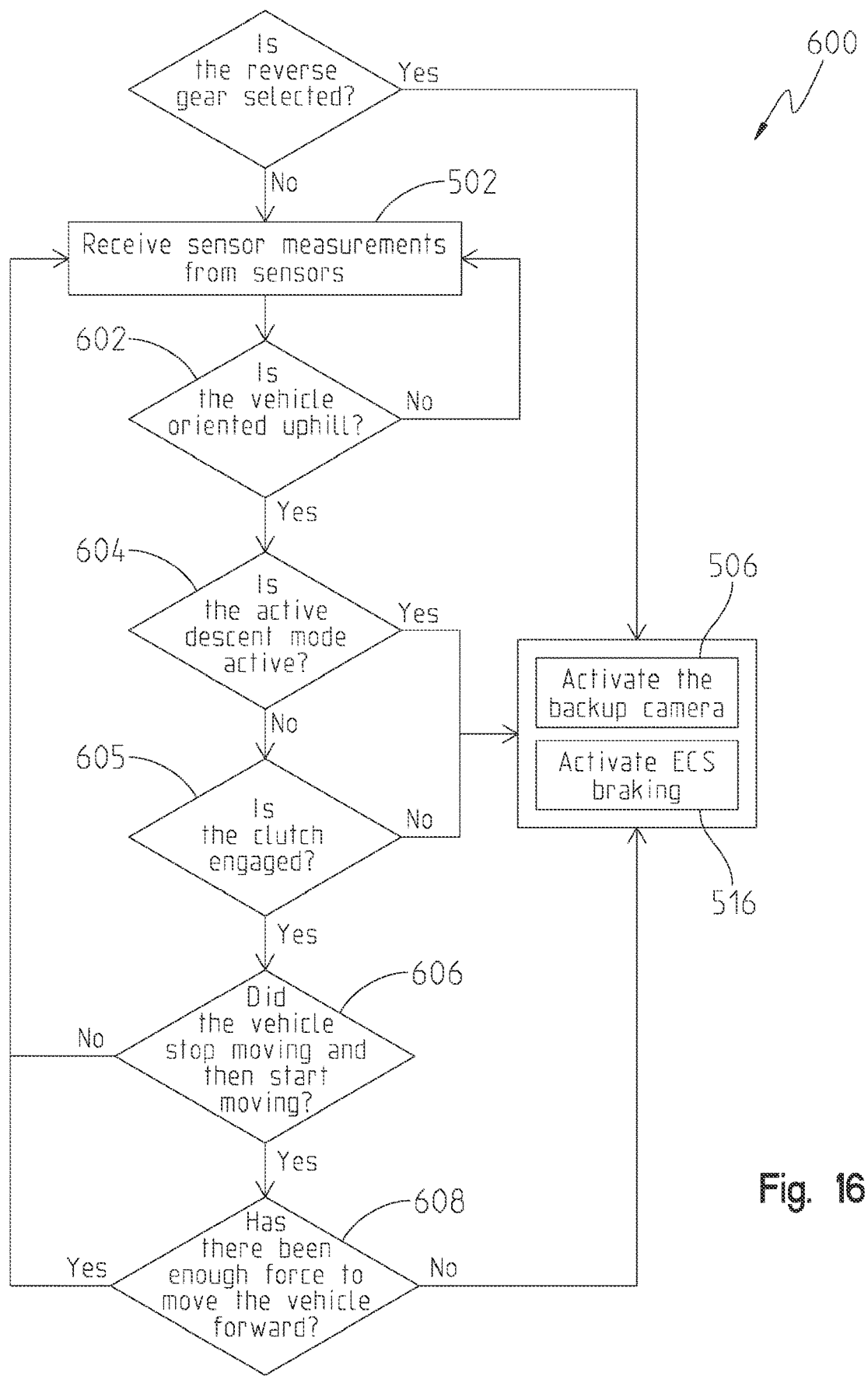
FIG. 16 illustrates a flow diagram of a method for determining whether an all-terrain vehicle is oriented uphill.

Referring to FIG. 16, the method 600 may include determining the vehicle 2 is oriented uphill (block 602). For example, when the sensors measurements of the IMUs 212 sense an inertial magnitude between 0.000 and 1.000 in the x-direction 229 (FIG. 12), the method 600 may determine the vehicle 2 is oriented uphill. If the vehicle 2 is oriented uphill, the method 600 may proceed to block 604. Conversely, when the sensors measurements of the IMUs 212 sense an inertial magnitude that is 0.000 or between −1.000 and 0.000 in the x-direction 229, the method 600 may determine the vehicle 2 is not oriented uphill. If the vehicle 2 is not oriented uphill, the method 600 may proceed back to block 502 to receive sensor measurements from sensors.

At block 604, the method 600 may determine whether the HECU 60 has activated the active descent mode, as described above in relation to FIG. 8. In embodiments where the vehicle 2 is oriented uphill and the active descent mode is active, the method 600 may determine the vehicle 2 is moving backward and activate the backup camera (block 506) and/or active ESC (and/or ABS) braking (block 516).

However, in certain embodiments, the vehicle 2 may not include an active descent mode and/or the active descent mode may not be active. In these circumstances, the vehicle 2 may still be moving backward. As such, the method 600 may proceed to block 605 where the method 600 determines whether the clutch is engaged or disengaged. If the vehicle is oriented uphill, the engine speed is non-zero, and the clutch is disengaged, the method 600 may determine the vehicle is moving backward and activate the backup camera (block 506) and/or activate ESC (and/or ABS) braking (block 516).

Additionally, or alternatively, the method 600 may determine whether the vehicle 2 has stopped moving and then started moving. According to certain embodiments, the method 600 may receive sensor measurements from the vehicle speed sensor 214, the wheel speed sensor 80, 90, and/or the GPS sensor 221 that indicate the vehicle 2 has stopped moving. For example, to determine the vehicle 2 has stopped moving, the vehicle speed sensor 214 may sense a vehicle speed of zero, the wheel speed sensor 80, 90 may sense the ground-engaging members 10, 12 are not rotating, and/or the GPS sensor 221 may indicate the coordinates of the vehicle 2 are not changing.

After which, the method 600 may determine whether the vehicle 2 has started moving again (block 606). For example, the method 600 may sense non-zero measurements from the vehicle speed sensor 214, non-zero measurements from the wheel speed sensor 80, 90, and/or measurements from the GPS sensor 221 indicating the coordinates of the vehicle 2 are changing. If the vehicle 2 has not started moving again, the method 600 may proceed to block 302 to receive more sensor measurements from the sensors. However, if the vehicle 2 has started moving again, the method 600 may proceed to block 608 where the method 600 determines whether there is enough force to move the vehicle forward. To determine whether there is enough force, the method 600 may receive signals corresponding to the engine torque, the engine speed, the engine load, and/or the throttle input.

According to certain embodiments, the method 600 may determine the amount of force generated in response to an engine torque, an engine speed, an engine load, and/or a throttle input, referred to herein as the $F_T$ 235 as shown in FIG. 12, and calculate whether $F_T$ 235 is enough to overcome the force due to gravity, referred to herein as $F_G$ 237 as shown in FIG. 12. If $F_T$ 235 is greater than $F_G$ 237, then the method 600 may determine the engine torque, the engine speed, the engine load, and/or the throttle input is enough to move the vehicle forward and return to block 502 to receive more sensor measurements. If, however, the $F_T$ 235 is less than $F_G$ 237, then the method 600 may determine the engine torque, the engine speed, the engine load, and/or the throttle input is not enough to move the vehicle forward so the vehicle 2 will be moving backward and proceed to block 506 where the camera is activated and/or block 516 where ECS is activated.

Airborne Driveline Protection

Figure 17:
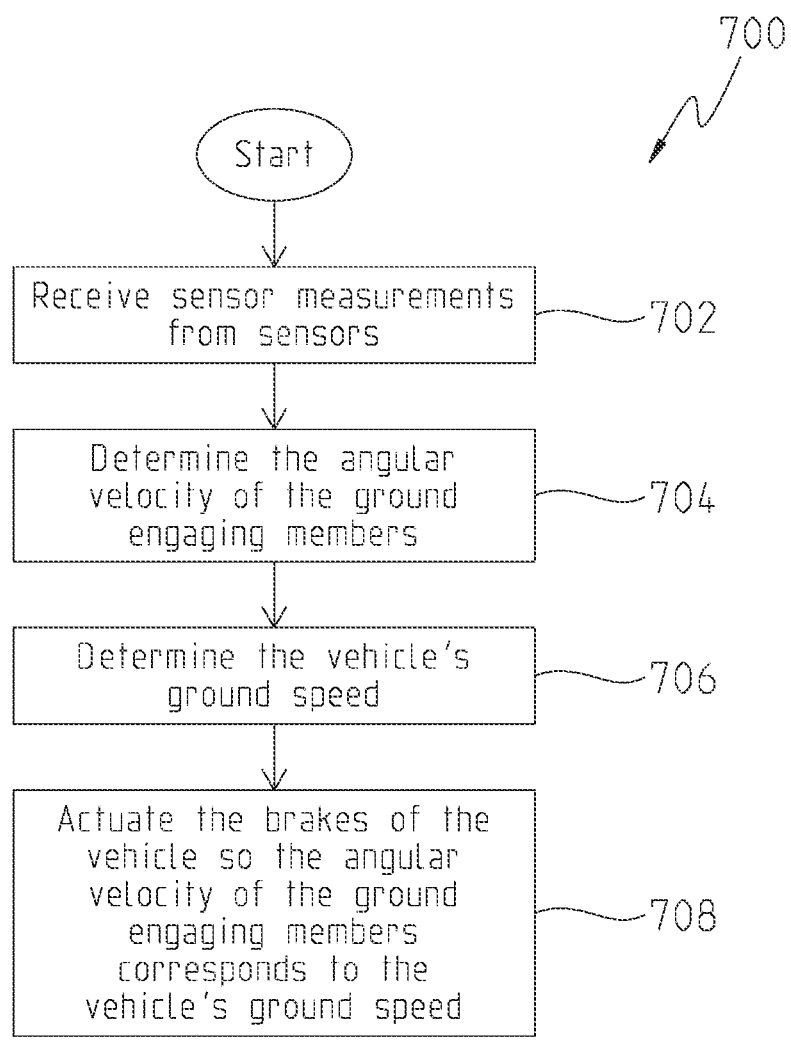
FIG. 17 illustrates a flow diagram of a method for protecting the driveline of a vehicle after being airborne.

Referring to FIG. 17, a flow diagram of a method 700 for protecting the driveline of a vehicle after being airborne is illustrated. As set forth above, all-terrain vehicles 2 oftentimes traverse rough terrain. When doing so, the vehicle 2 may intentionally or unintentionally become airborne. Oftentimes when a vehicle 2 becomes airborne, the ground-engaging members 10, 12 speed, the axle 37, 38 speed, the differential speed, the engine speed and/or the transmission speed (collectively referred to herein as driveline) may not decrease and/or increase due to, for example, the throttle continuing to be actuated. Then, once the vehicle 2 lands on the ground, the increased speed of the driveline may be too high for the speed at which the vehicle 2 is traversing the ground; and, damage may be caused to the driveline of the vehicle 2. Embodiments provided herein reduce the likelihood of damage to the driveline of the vehicle 2. For example, according to certain embodiments, the HECU 60 may slow the angular velocity of the ground-engaging members 10, 12 so that when the vehicle 2 lands, the velocity of the ground-engaging members 10, 12 matches the speed at which the vehicle 2 is traversing the land.

According to certain embodiments, the method 700 includes the HECU 60 receiving (e.g., retrieve and/or obtain) information (e.g., data packets and/or signals indicating sensor readings) from the one or more sensors, devices, and/or subsystems in FIG. 11 (block 702). For example, the HECU 60 may receive information from the GPS sensor(s) 221, the IMUs 212, the wheel speed sensors 80, 90, the engine speed sensor 220, the ECM 122, and/or the throttle pedal position 208 sensor.

According to certain embodiments, the HECU 60 determines the angular velocity of the ground-engaging members 10, 12 based on the received sensor measurements (block 704). To determine the angular velocity of the ground-engaging members 10, 12, the HECU 60 may receive signals from the wheel speed sensors 80, 90 that correspond to the angular velocity of the ground-engaging members 10, 12. For example, as set forth above, each of front half shafts 37 (FIG. 4) includes a drive coupling with a splined shaft 106 (FIG. 4). Splined shaft 106 may couple with an output 112 (FIG. 6) of front final drive member 32. Additionally, a gear ring 108 (FIG. 4) is positioned on the outer surface of each of the drive couplings and is held in position relative to half shafts 37. As such, gear ring 108 is configured to rotate with its corresponding half shaft 37. Each of gear rings 108 includes a plurality of teeth 110 (FIG. 4) which cooperate with sensor 80 to determine the speed of each half shaft 37. Sensors 80 are positioned in proximity to teeth 110 but do not contact teeth 110; rather sensors 80 count teeth 110 as teeth 110 pass sensor 80 over a specific time period to calculate an angular velocity. Sensors 80 may be speed sensors such as Hall Effect speed sensors.

According to certain embodiments, the HECU 60 also determines the vehicle's ground speed (block 706). To determine the vehicle's ground speed, the HECU 60 may receive measurements from the GPS sensors 221 and determine a change in position as a function of time using the measurements, which will correspond to the ground speed of the vehicle 2.

Additionally, or alternatively, the HECU 60 may receive one or more measurements from one or more of the IMUs 212 that the vehicle 2 is in freefall. For example, one or more of the IMUs 212 may sense an approximately zero acceleration measurement in the z-direction, indicating the vehicle 2 is in freefall and, therefore, the vehicle 2 is airborne.

Additionally, or alternatively, the speed of the ground-engaging members 10, 12, as sensed by the wheel speed sensors 80, 90, may increase by more than a threshold amount. The speed of the ground-engaging members 10, 12 increasing by more than a threshold amount may indicate the vehicle 2 is airborne due to the lack of opposing force supplied to the ground-engaging members 10, 12 by the ground, which limits how quickly the speed of the ground-engaging member 10, 12 can increase.

In embodiments where the vehicle 2 is airborne, the HECU 60 may determine a ground speed of the vehicle prior to becoming airborne. And, the HECU 60 may determine the ground speed of the vehicle 2 is constant once the vehicle 2 becomes airborne. As such, the HECU 60 may use the calculated ground speed of the vehicle 2 prior to becoming airborne is the current ground speed of the vehicle 2. Alternatively, the HECU 60 may determine the ground speed of the vehicle 2 is decreasing by an amount due to the aerodynamic drag on the vehicle 2. As such, the HECU 60 may apply a limiting factor (e.g., a decay factor) to the previously calculated ground speed to determine the current ground speed of the vehicle as a result of the aerodynamic drag on the vehicle 2 slowing the ground speed of the vehicle 2 while the vehicle is vehicle 2 is airborne. According to embodiments, the HECU 60 may calculate the decay factor (i.e., the decrease in ground speed) while the vehicle 2 is airborne to be approximately $0.3*9.8$ m/s² or $0.3*$ acceleration of gravity. Additionally, or alternatively, the limiting factor may be based upon the aerodynamic drag of the vehicle 2 as a function of the vehicle's 2 speed. Additionally, or alternatively, the limiting factor may be based upon the deceleration measured by an accelerometer oriented along an x-axis.

The method 700 may then continue by having the HECU 60 actuate one or more of the brake calipers 48, 52 (FIG. 4) to (i) slow down the angular velocity of the ground-engaging members 10, 12 or (ii) prevent the angular velocity of the ground-engaging members 10, 12 from increasing when the vehicle 2 becomes airborne so that the angular velocity of the ground-engaging members 10, 12 is the appropriate angular velocity for the ground speed of the vehicle 2 (block 708). As such, when the vehicle 2 is no longer airborne, damage is not caused to the vehicle's 2 driveline.

Flat Tow Braking

Figure 18:
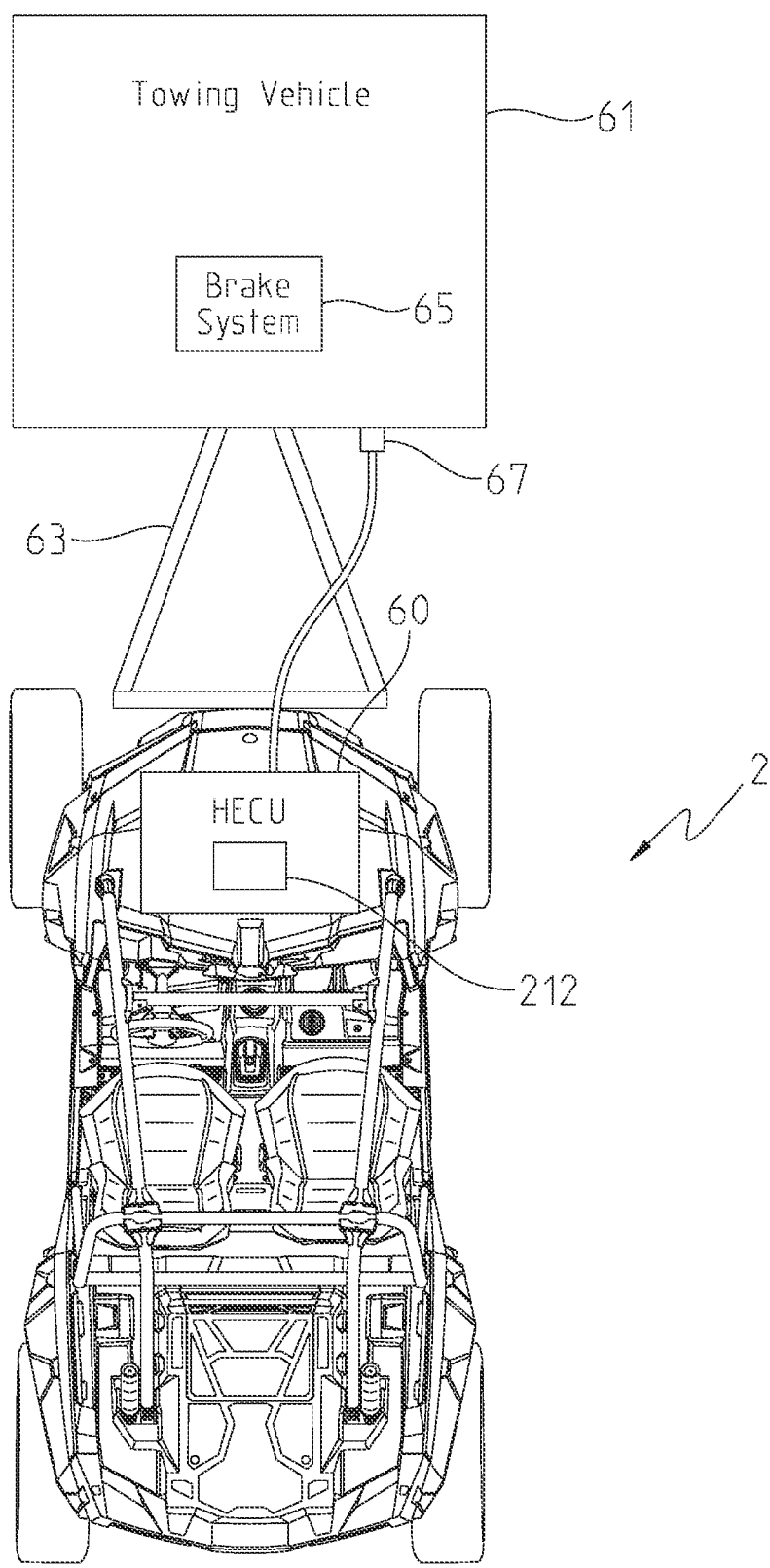
FIG. 18 illustrates a top view of an all-terrain vehicle being flat towed by a towing vehicle.

Referring to FIG. 18, a top view of an all-terrain vehicle 2 being flat towed by a towing vehicle 61 is illustrated. Because the all-terrain vehicle 2 is being flat-towed, all the ground-engaging members 10, 12 may be on the ground. Further, the all-terrain vehicle 2 may be coupled to the towing vehicle 61 by one or more tow bars coupled either directly or indirectly from the chassis of the towing vehicle 61 to the chassis of the all-terrain vehicle 2.

When a vehicle (e.g., the all-terrain vehicle 2) is being flat towed, brake activation on the towed vehicle 2 is required in most states. To satisfy this requirement, most consumers buy and install a stand-alone auxiliary kit that will depress the brake pedal 54 (FIG. 10) of the towed vehicle 2 when the brake pedal of the towing vehicle 61 is depressed. However, these stand-alone auxiliary kits can be expensive and oftentimes require special expertise to install. The embodiments described herein provide benefits over the stand-alone auxiliary kits.

As illustrated, the HECU 60 of the towed vehicle 2 may be electrically coupled to a braking system 65 of the towing vehicle 61 via a trailer connector 67. According to certain embodiments, the HECU 60 may actuate the brake calipers 48a, 48b, 52a, 52b (FIG. 3) of the all-terrain vehicle 2 in response to the braking system 65 being actuated, as explained in more detail below. In some examples, the HECU 60 operates in an HECU intervention mode (e.g., an electronic stability mode (ESC) mode) when the all-terrain vehicle 2 is being towed and the HECU 60 actuates the brake calipers 48a, 48b, 52a, 52b in response to the braking system 65 being actuated.

According to certain embodiments, the trailer connector 67 is a 4-way connector and includes connections for running lights, the left turn signal and brake lights, the right turn signal and brake lights, and a ground. As such, signals from the towing vehicle 61 corresponding to the running lights, the left turn signal, the right turn signal, and the brake lights can be transmitted to the towed vehicle 2 so that vehicles following the towing vehicle 61 and the towed vehicle 2 can see the towing vehicle 61 and towed vehicle 2 via the running lights and determine when the towing vehicle 61 and towed vehicle 2 are turning left, turning right, and/or stopping via the left turn signal, the right turn signal, and the brake lights, respectively.

According to other embodiments, the trailer connector 67 is a 7-way connector and includes connections for running lights, the left turn signal and brake lights, the right turn signal and brake lights, a ground, a 12V circuit, a trailer brake control, and backup lights. As such, signals from the towing vehicle 61 corresponding to the running lights, the left turn signal, the right turn signal, the brake lights, and backup lights can be transmitted to the towed vehicle 2 so that vehicles following the towing vehicle 61 and the towed vehicle 2 can see the towing vehicle 61 and towed vehicle 2 via the running lights and determine when the towing vehicle 61 and towed vehicle are turning left, turning right, stopping, and/or reversing via the left turn signal, the right turn signal, the brake lights, and the backup lights, respectively.

According to embodiments for which the trailer connector 67 is a 4-way connector, the HECU 60 may receive a brake signal from the brake system 65 via the brake light connection of the trailer connector 67. In response to receiving the brake signal via the brake light connection of the trailer connector 67, HECU 60 may actuate one or more of the calipers 48a, 48b, 52a, 52b (FIG. 3) via the fluid conduits 64, 66, 68, 70, respectively, which in turn brakes the towed vehicle 2. And, when the brake signal is no longer being received via the brake light connection of the trailer connection 67, HECU 60 may no longer actuate one or more of the calipers 48a, 48b, 52a, 52b.

According to certain embodiments, the HECU 60 includes and/or is coupled to an IMU (e.g., IMU 212). The IMU 212 may generate an acceleration signal (e.g., a longitudinal acceleration signal) corresponding to the rate at which the towing vehicle 61 and the towed vehicle 2 are slowing in response to actuation of the braking system 65. The HECU 60 may receive the acceleration signal, and proportionally actuate one or more of the calipers 48a, 48b, 52a, 52b (FIG. 3) in response to the acceleration signal. For example, the faster the towing vehicle 61 and the towed vehicle 2 are slowing, as indicated by the acceleration signal, the more force may be applied to the calipers 48a, 48b, 52a, 52b by the HECU 60; and, the slower the towing vehicle 61 and the towed vehicle 2 are slowing, as indicated by the acceleration signal, the less force may be applied to the calipers 48a, 48b, 52a, 52b by the HECU 60

According to certain embodiments, the acceleration signal may be normalized to a scale of 0 to 1 where 0 indicates the towing vehicle 61 and the towed vehicle 2 are not slowing down and 1 indicates the towing vehicle 61 and the towed vehicle 2 are slowing down at the fastest rate at which the towing vehicle 61 and the towed vehicle 2 can slow down. Then, the HECU may use the normalized acceleration signal to proportionally actuate one or more of the calipers 48a, 48b, 52a, 52b.

According to embodiments for which the trailer connector 67 is a 7-way connector, the HECU 60 may receive a brake signal from the brake system 65 via the trailer brake control connection of the trailer connector 67. In response to receiving the brake signal from the brake system 65, HECU 60 may actuate one or more of the calipers 48a, 48b, 52a, 52b (FIG. 3) via the fluid conduits 64, 66, 68, 70, respectively, which in turn brakes the towed vehicle 2. Further, the brake signal from the trailer brake control connection of the trailer connector 67 may indicate the amount of pressure being applied to the brakes of the towing vehicle 61. In response to the amount of pressure being applied to the brakes of the towing vehicle 61, the HECU 60 may supply a proportional amount of actuation to the calipers 48a, 48b, 52a, 52b.

As a result of these embodiments, an expensive auxiliary system does not need to be installed in order to comply with some states' requirements that the brakes of the towed vehicle 2 are depressed in response to the brakes of the towing vehicle 61 being depressed.

Driveline Configuration and Active Agility Control Mode Selection

Figure 19:
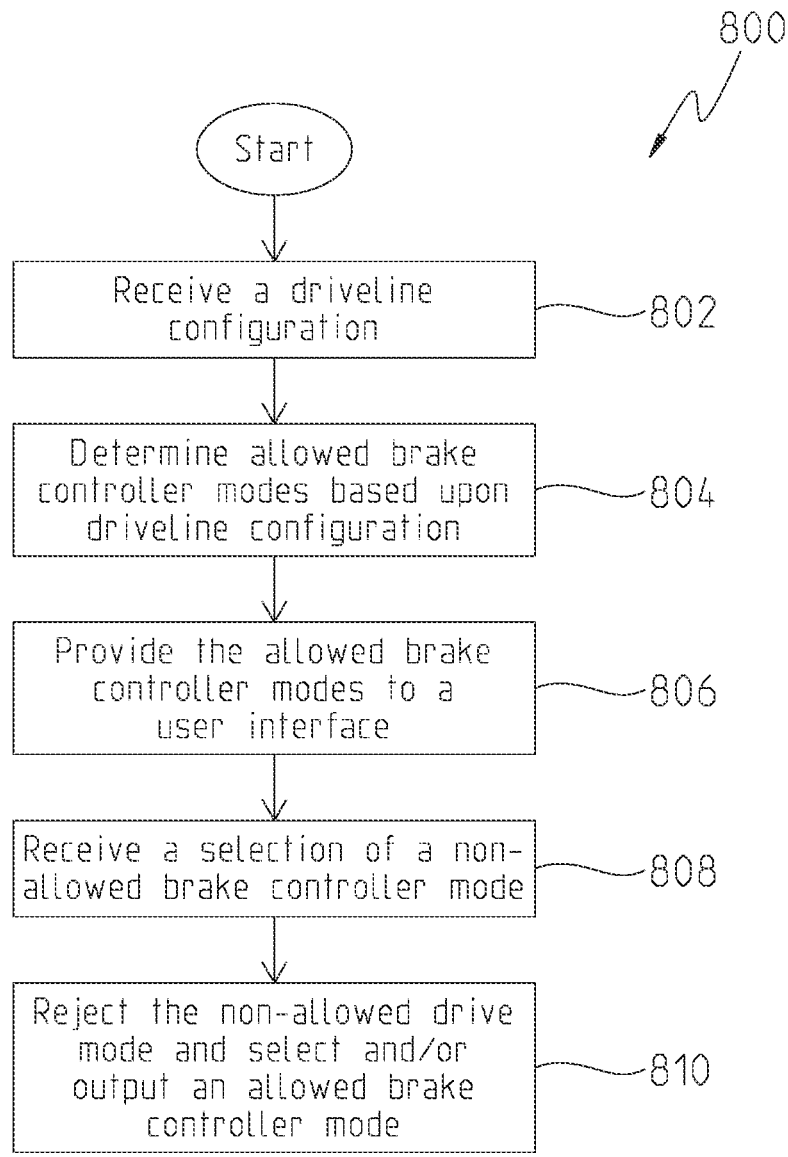
FIG. 19 illustrates a flow diagram of a method for determining a brake configuration mode based upon a driveline configuration.

Referring to FIG. 19, a flow diagram of a method 800 for determining a brake configuration mode based upon a driveline configuration. As illustrated, the method 800 includes receiving a driveline configuration (block 802). The driveline configuration may include the number of driven wheels (e.g., 2WD or 4WD), the state of the differential (e.g., open, locked, or smart locking (i.e., controlled slip)), and/or the selected transmission gear ratio.

Figure 20:
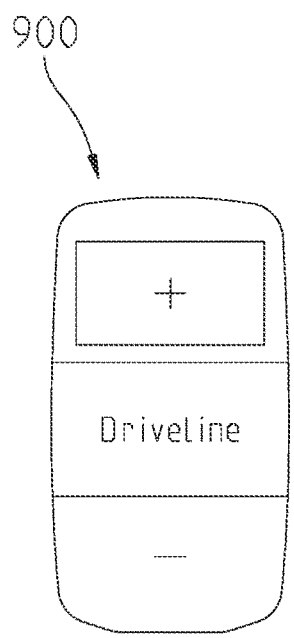
FIGS. 20-24 are exemplary user interface controls for an all-terrain vehicle.
Figure 21:
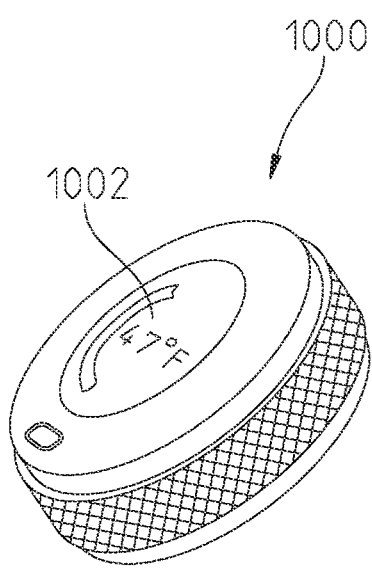
Figure 22:
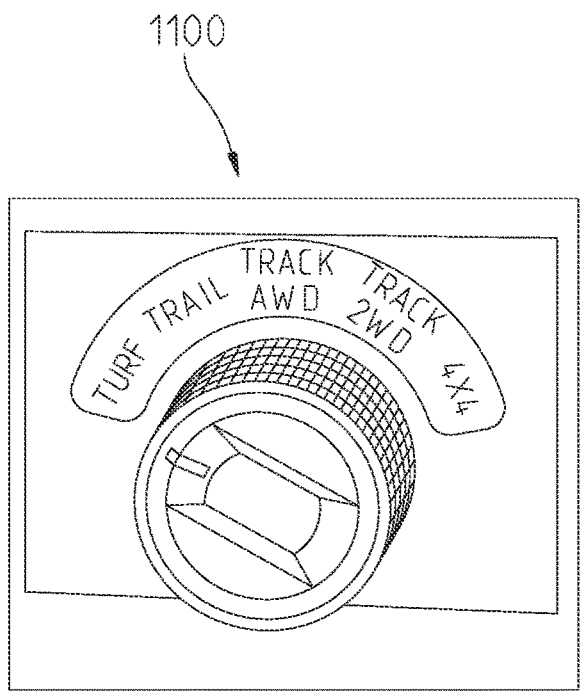
Figure 24:
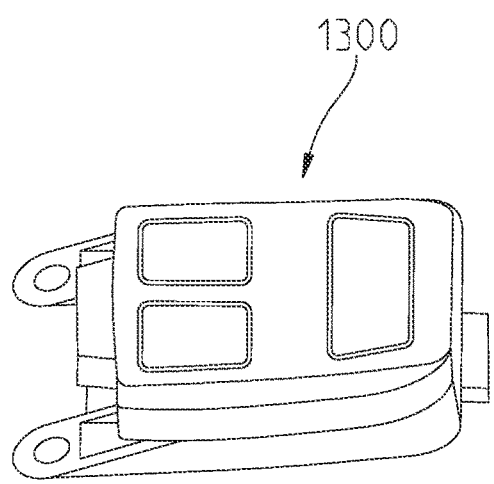
Figure 23:

According to certain embodiments, the driveline configuration may be received via the user interface 204. The user interface 204 may be and/or include a variety of forms, as illustrated in FIGS. 20-24. According to certain embodiments, the user interface 204 may include more than one of the examples provided in FIGS. 20-24, one for selecting the driveline configuration and another for selecting the brake configuration modes. For example, the user interface 204 may include a rocker switch where a user selects the driveline configuration by actuating the switch either up or down, as shown in FIG. 20. Additionally, or alternatively, the user interface 204 may include knob 1000 that includes a readout of the driveline in which the vehicle 2 is operating, as shown in FIG. 21. To select the different drivelines, a user may rotate the knob 1000 clockwise and/or counterclockwise. According to certain embodiments, rotating the knob 1000 in a first direction may toggle through the different driveline configurations. Then, at the final driveline configuration, the driveline configurations may loop to the initial driveline configuration by continuing to rotate the knob 1000 in the first direction. Additionally, or alternatively, in certain embodiments, the knob 1000 is used to for electronic shifting, adjusting a hill descent speed (as discussed in more detail below), and/or navigating on the display. Additionally, or alternatively, the user interface 204 may include a knob 1100 that can be rotated to discreet positions such that each discreet position corresponds to a different driveline configuration, as shown in FIG. 22. In certain embodiments, the knob 1100 uses a voltage dividers to output discreet voltages based on the position of the knob 1100 such that each discreet voltage corresponds to a different driveline configuration. Additionally, or alternatively, the user interface 204 may include a touchscreen 1200 for selecting the different driveline configurations, as shown in FIG. 23. According to certain embodiments, the switch 900, knob 1000, knob 1100, and/or user interface 1200 may include a hand-held remote switch 1300 for selecting the different driveline configurations remotely, as shown in FIG. 24.

Once a driveline configuration is selected, the method 800 may include determining which brake configuration modes are allowed (block 804). Table 2 below illustrates which brake configuration modes are allowed based on the selected driveline configuration, according to certain embodiments.

TABLE 2

| Driveline Configuration | Inactive | Brake Configuration #1 | Brake Configuration #2 | Brake Configuration #3 |
|---|---|---|---|---|
| | | Brake Configuration Modes | | |
| 2WD - Diff Open | Allowed | Allowed | Not allowed, move left | Not allowed, move left |
| 2WD - Diff Locked | Allowed | Allowed | Allowed | Allowed |
| 4WD - Diff's Locked | Allowed | Not allowed, move left | Not allowed, move left | Not allowed, move left |
| AWD - Rear Open, Front Open | Allowed | Allowed | Allowed | Allowed |
| AWD - Rear Closed, Front Open | Allowed | Allowed | Allowed | Allowed |

As shown, the driveline configurations include 2-wheel drive (2WD) with the differential open, 2WD with the different locked (or closed), 4-wheel drive (4WD) with the differential's locked, all-wheel drive (AWD) with the front and rear differentials opens, and AWD with the rear differential locked (or closed) and the front different open. According to embodiments, the ground-engaging members 10 are allowed to rotate independently when the differential for the ground-engaging members 10 is open and the ground-engaging members 10 rotate together when the differential for the ground-engaging members 10 is locked (or closed). Further, the ground-engaging members 12 are allowed to rotate independently when the differential for the ground-engaging members 12 is open and the ground-engaging members 12 rotate together when the differential for the ground-engaging members 12 is locked (or closed).

Furthermore, as illustrated, the different brake configuration modes for which the vehicle 2 can operate include an inactive mode (e.g., no brake interactions), brake configuration #1, brake configuration #2, and brake configuration #3. Brake configurations #1, #2, and #3 may detect an over-reaction situation and apply the brakes to help mitigate an unstable vehicle condition. According to certain embodiments, brake configuration #1 may be more sensitive than brake configuration #2, and brake configuration #2 may be more sensitive than brake configuration #3, as explained in more detail below.

For example, brake configurations #1, #2, and #3 may include a brake interaction in order to reduce vehicle yaw error. To reduce vehicle yaw error, the target yaw rate may be determined by the HECU 60 based upon the driver requested torque/pedal position, the vehicle speed, the steering angle, the lateral acceleration, and the longitudinal acceleration. The target yaw rate may then be compared against the IMU measured yaw rate to determine how the target yaw rate differs from the IMU measured yaw rate. Based upon the comparison, the HECU 60 may determine whether the vehicle is oversteering or understeering. If the vehicle is oversteering, then the HECU 60 may engage one the brake calipers 52 for the front ground-engaging members 10 to reduce the yaw rate magnitude. According to certain embodiments, the HECU 60 may primarily engage the brake caliper 52 associated with the outside front ground-engaging member 10. The application of the brake caliper 52 to the outer ground-engaging member 10 saturates the corresponding ground-engaging member 10 with a longitudinal force which reduces the lateral acceleration able to be generated by the front axle and generates a stabilizing yaw moment.

If the vehicle is understeering, then the HECU 60 may engage one the brake calipers 48 for the rear ground-engaging members 12 to increase the yaw rate magnitude. According to certain embodiments, the HECU 60 may primarily engage the brake caliper 48 associated with the inside rear ground-engaging member 12.

As set forth above, brake configuration #1 may be more sensitive than brake configuration #2, and brake configuration #2 may be more sensitive than brake configuration #3, as explained in more detail below. For example, brake configuration #3 may allow for a greater difference between a target yaw rate and an IMU measured yaw rate than brake configuration #2 and brake configuration #2 may allow for a greater difference between a target yaw rate and an IMU measured yaw rate than brake configuration #1.

According to certain embodiments, brake configuration #1 may be referred to herein as stability mode with evasive maneuver stabilization. Brake configuration #2 may be referred to herein as stability mode without anti-rollover protection. And brake configuration #3 may be referred to herein as agility mode. Additional details regarding stability mode, anti-rollover protection, and agility mode are disclosed in U.S. Pat. No. 10,363,941, issued Jul. 30, 2019, titled "System and Method for Controlling a Vehicle;" US Pat. Appln. No. 16,401,933, filed May 2, 2019, published as US Pat. Pub. No. 2019/0337497, titled "Operating Modes Using a Braking System for an All-Terrain Vehicle;" U.S. Pat. No. 10,118,447, issued Nov. 6, 2018, titled "Hybrid Utility Vehicle;" U.S. patent application Ser. No. 15/816,368, filed Nov. 17, 2017, published as US Pat. Pub. No. 2018/0141543, titled "Vehicle Having Adjustable Suspension,"; U.S. Pat. No. 9,358,882, issued Jun. 7, 2016, titled "Default Open Differential Control Switch;" U.S. Pat. No. 10,086,698, issued Oct. 2, 2018, titled "Electronic Throttle Control," the entire disclosures of which are expressly incorporated herein by reference for all purposes.

According to certain embodiments, the method 800 may include providing only the allowed brake configuration modes via the user interface 204 (block 806). For example, the user interface 204 may provide (e.g., display) all modes as being available when the vehicle's 2 driveline is in AWD, regardless of whether the rear differential is open or closed. Similarly, the user interface 204 may provide all modes as being available when the vehicle's 2 driveline is in 2WD with the differential locked. However, according to some embodiments, if the vehicle's 2 driveline is in 2WD with the differential open, then the vehicle 2 can only be operated in an inactive mode or brake configuration #1 and the vehicle cannot be operated in brake configuration #2 or brake configuration #3. As such, the user interface 204 may provide only the inactive mode or brake configuration #1 to the user when the vehicle's 2 driveline is in 2WD with the differential open. In addition, according to some embodiments, if the vehicle's 2 driveline mode is in 4WD with the differentials locked, then the vehicle 2 can only be operated in the inactive (e.g., no brake interactions) mode. As such, the user interface 204 may provide only the inactive mode to the user when the vehicle's 2 driveline is in 4WD with the differentials locked.

According to certain embodiments, if the vehicle's 2 driveline is changed from a first driveline configuration that does not allow one or more brake configuration modes to a second driveline configuration that allows more brake configuration modes and the vehicle was previously operating in a brake configuration mode that was not allowed in the first driveline configuration but is allowed in the second driveline configuration, then the HECU 60 may automatically switch back to the brake configuration mode that is allowed in the second driveline configuration when the vehicle 2 switches from the first driveline configuration to the second driveline configuration. For example, if a vehicle 2 is operating in brake configuration #1 while the driveline configuration of the vehicle 2 is in AWD, and the vehicle 2 is switched to 4WD with the differentials locked, the vehicle 2 may automatically switch to inactive (e.g., no brake interactions) mode. However, if the vehicle 2 is switched back to AWD, then the vehicle 2 may return to operating in brake configuration #1.

Additionally, or alternatively, a user may still try to select one of the modes that are not available based upon the driveline configuration of the vehicle 2. As such, the method 800 may include receiving a selection of a non-allowed brake configuration mode (block 808), reject the non-allowed brake configuration mode and select and/or output an allowed brake configuration mode (block 810). For example, if the vehicle's 2 driveline is 2WD with the differential open and a user tries to select brake configuration #2 or brake configuration #3, the HECU 60 (or another control system of the vehicle 2) may configure the vehicle 2 to operate in the first available mode to the left of the unavailable mode provided in Table 2 above. For example, if the user tries to select either the brake configuration #2 or brake configuration #3 while the driveline configuration is in 2WD with the differential open, then the HECU 60 will instead select and/or output brake configuration #1. As another example, if the user tries to select either the brake configuration #1, brake configuration #2, or brake configuration #3 while the driveline configuration is in 4WD with the differentials closed/connected, then the HECU 60 will instead select then inactive operating mode.

Figure 25:
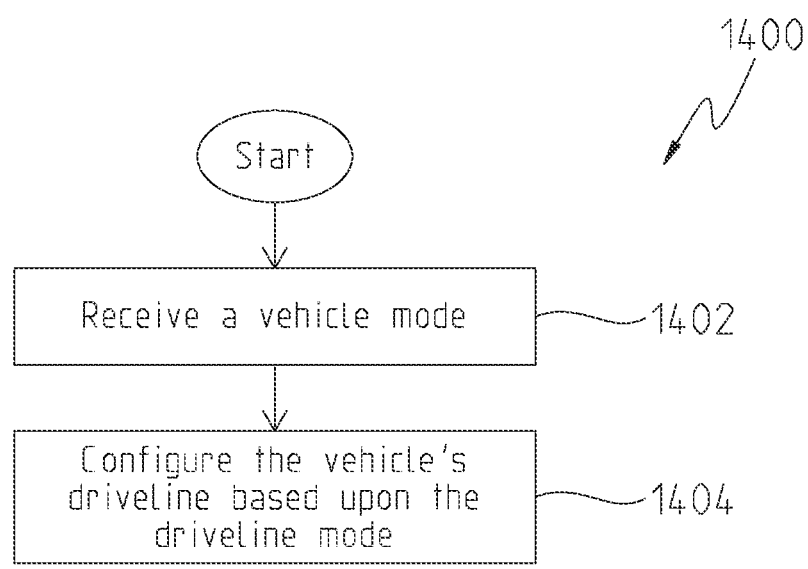
FIG. 25 illustrates a flow diagram of a method for configuring the vehicle's driveline based upon a selected vehicle mode.
Figure 27:
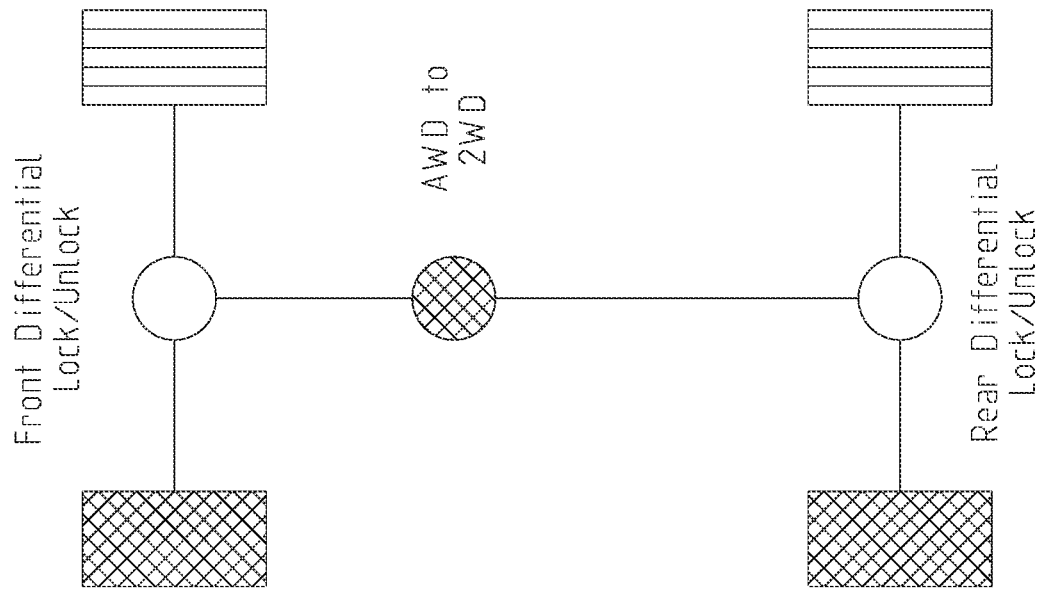
FIGS. 26-30 illustrate different examples of different driveline configurations.
Figure 26:
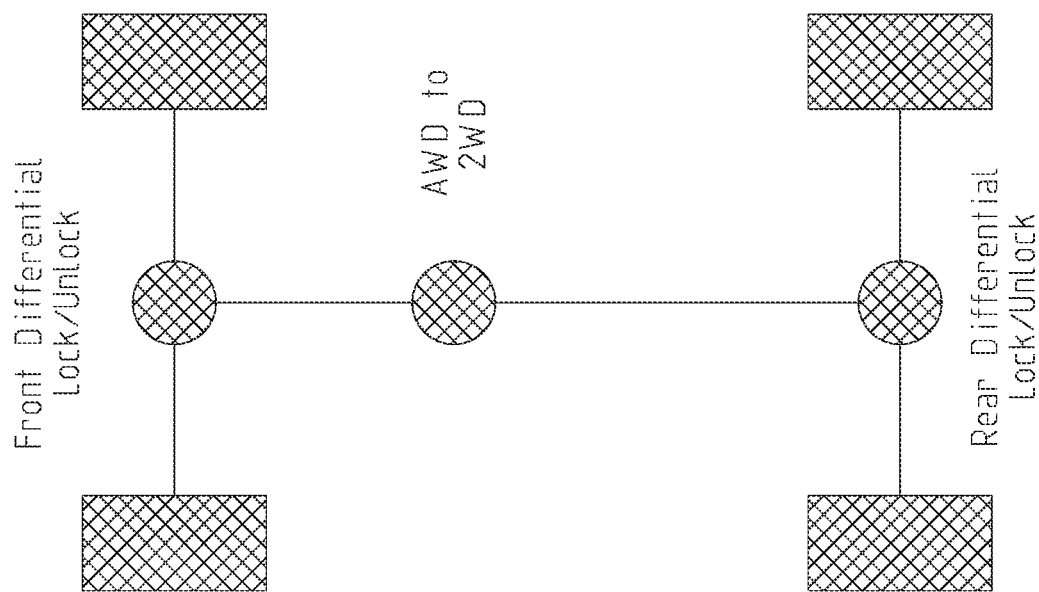
Figure 29:
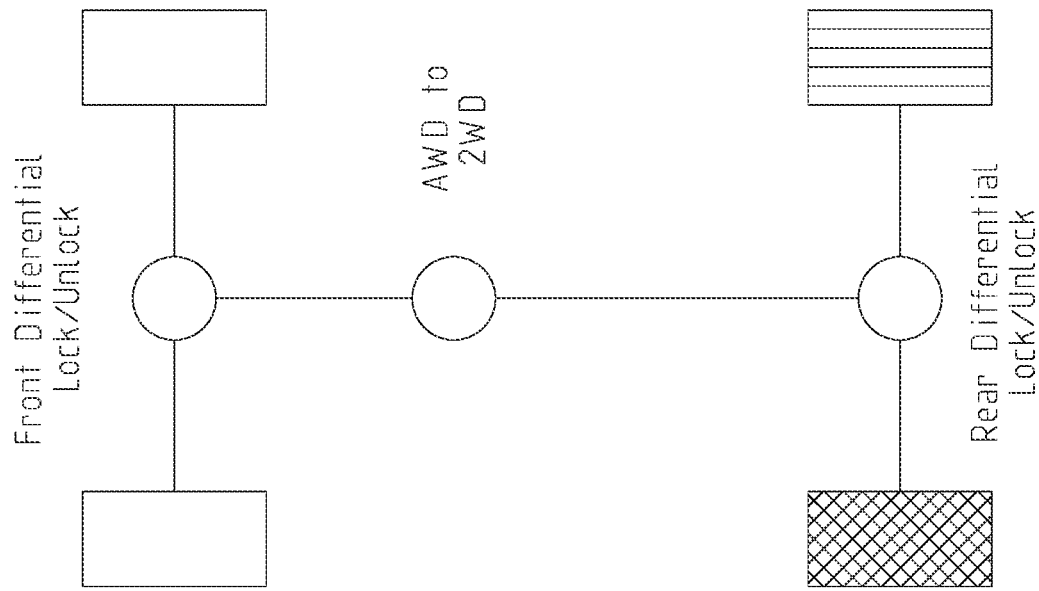
Figure 28:
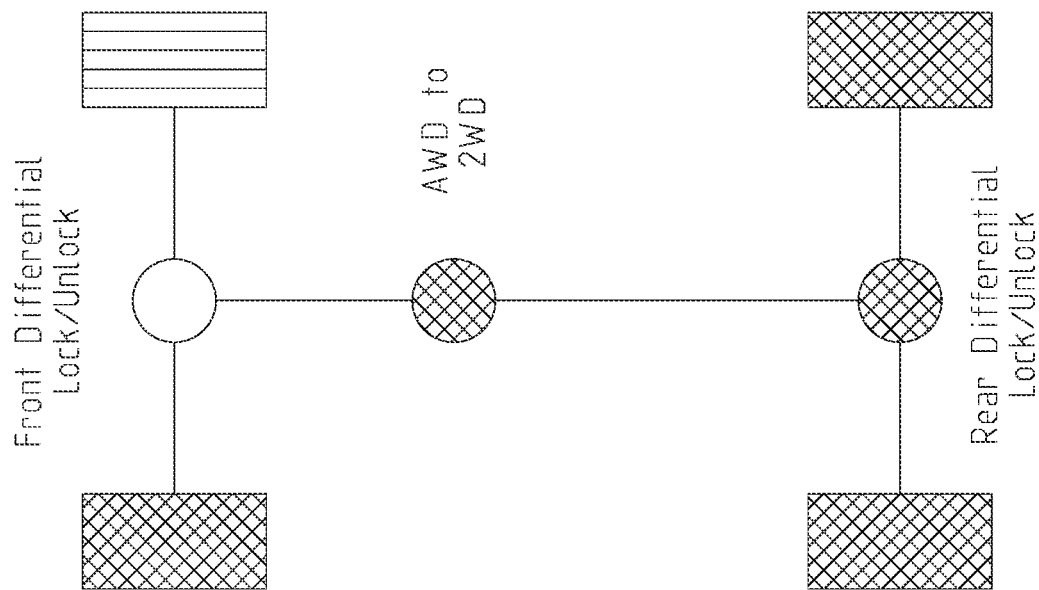
Figure 30:
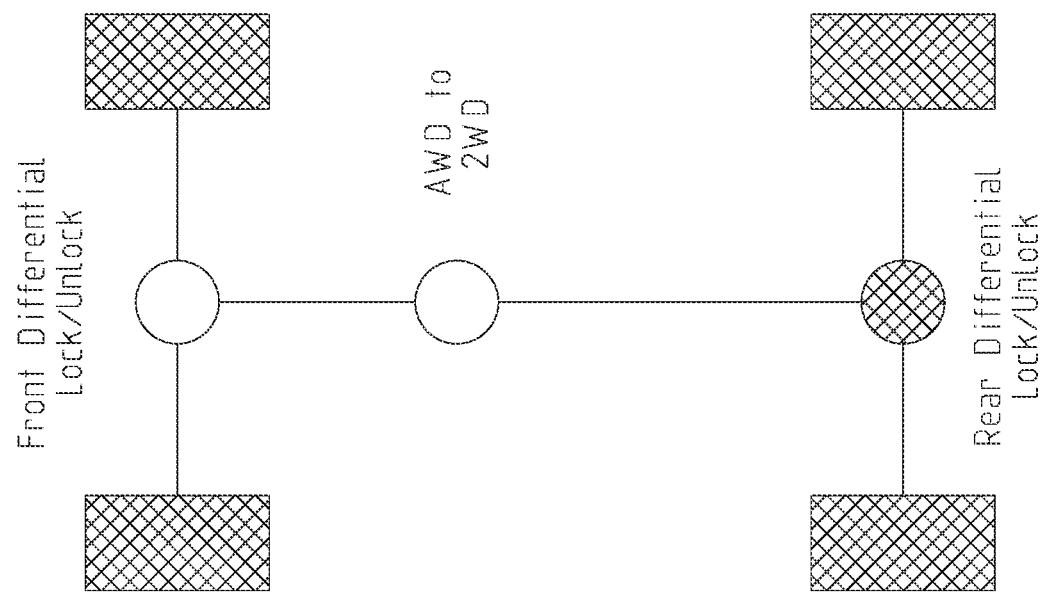

Referring to FIG. 25, a flow diagram of a method 1400 for configuring the vehicle's driveline based upon a selected vehicle mode. As illustrated the method 1400 includes receiving a vehicle mode (block 1402). According to certain embodiments, the vehicle mode may be received via the user interface 204. The user interface 204 may be and/or include a variety of forms, as illustrated in FIGS. 20-24. However, according to certain embodiments, the user interface 204 may only include one of the examples provided in FIGS. 20-24, which corresponds to a user interface 204 for selecting the driveline mode, because the vehicle's driveline is automatically configured based upon the received driveline mode, as explained below.

In at least some examples, once a vehicle mode is selected, the method 1400 includes automatically configuring the vehicle's driveline (block 804). Table 3 below illustrates an example of how the vehicle's driveline is configured based upon the selected vehicle mode. Inactive mode and brake configurations #1, #2, and #3 may have the same meaning as these modes have in Table 2 above. The vehicle's driveline configuration is shown in FIGS. 26-30 where a solid circle for a differential corresponds to a locked differential and an open circle corresponds to an unlocked differential. Similarly, a solid circle for a driveline corresponds to the vehicle operating in AWD mode and an open circle corresponds to the vehicle operating in 2WD mode. In certain instances, the driveline configuration shown in FIGS. 26-30 and/or information included therein may be displayed on a user interface 204, as described in more detail below.

TABLE 3

| Vehicle Mode | Driveline Configuration | Brake Configuration Mode |
| --- | --- | --- |
| First vehicle mode (e.g., Turf mode) (shown in FIG. 29) | 2WD - Rear Diff Open | Brake Configuration #1 |
| Second vehicle mode (e.g., Trail mode) (shown in FIG. 27) | AWD - Rear and Front Diff Open | Brake Configuration #2 |
| Third vehicle mode (e.g., Track/Drive - AWD mode) (shown in FIG. 28) | AWD - Rear Diff Locked, Front Diff Open | Brake Configuration #3 |
| Fourth vehicle mode (e.g., Track/Drive - 2WD mode) (shown in FIG. 30) | 2WD - Rear Diff Locked | Brake Configuration #4 |
| Fifth vehicle mode (e.g., 4 × 4 Rock Crawl - Diff's Locked mode) (shown in FIG. 26) | AWD - Front Diff Locked, Rear Diff Locked | Inactive (e.g., no brake interactions) |

According to certain embodiments, the vehicle mode is defined by the driveline configuration and the brake configuration mode. For example, when the user selects a first drive mode, also referred to herein as turf mode, a vehicle controller (e.g., an engine controller and/or a stand-alone controller such as a vehicle control module or transmission control module) configures the driveline configuration to 2WD with the rear differential open and the brake configuration mode to brake configuration #1. In another example, when the user selects a second drive mode, also referred to herein as trail mode, a vehicle controller configures the driveline configuration to AWD with the rear and front differentials open and the brake configuration mode to brake configuration #2. In even another example, when the user selects a third drive mode, also referred to herein as track/drive AWD mode, a controller configures the driveline configuration to AWD with the rear differential locked, the front differential open, and the brake configuration mode to brake configuration #3. In yet another example, when the user selects a fourth drive mode, also referred to herein as track/drive 2WD mode, a vehicle controller configures the driveline configuration to 2WD with the rear differential locked and the brake configuration mode to brake configuration #4. In some embodiments, brake configuration #4 may be similar to brake configuration #3, but tuned slightly differently in order to handle the changes in driveline configuration between the third drive mode and the fourth drive mode. In a further example, when the user selects a fifth drive mode, also referred to herein as 4×4 rock crawl mode, a vehicle controller configures the driveline configuration to AWD with the front and rear differentials locked and the mode to inactive (e.g., no brake interactions) mode. However, these are only examples, and not meant to be limiting. As a result of the ability of the user being able to select a vehicle mode and have the driveline and the brake configuration mode automatically configured, the operation of the vehicle 2 in different modes may be simplified. Additionally, or alternatively, in certain embodiments, the driveline configuration can be operated independently of the brake configuration mode. For example, the brake configuration mode can be manually turned off in some of these instances so the driveline configuration operates independently of the brake configuration mode.

Figure 31:
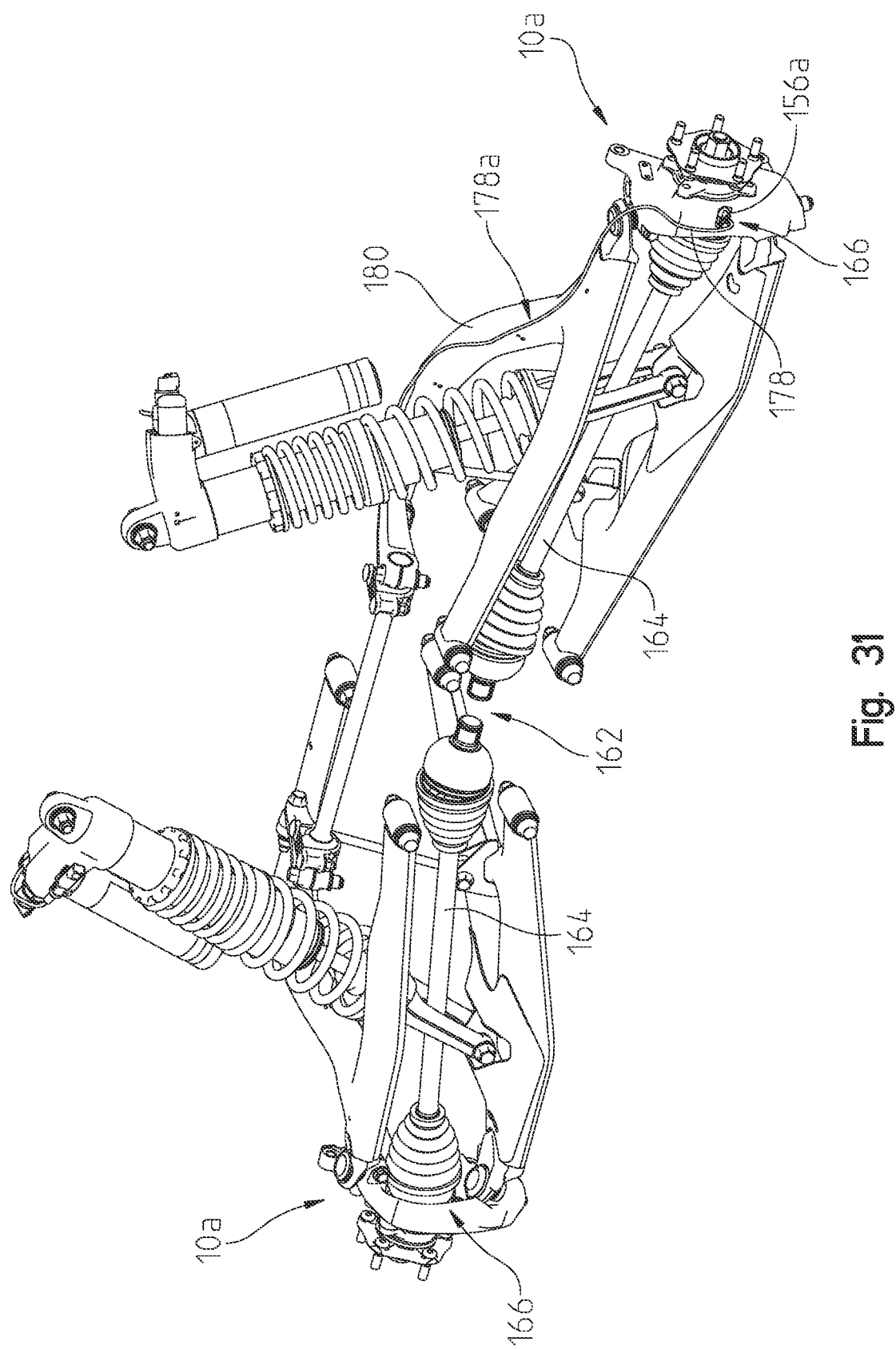
FIG. 31 illustrates a perspective view of an example front suspension including a wheel assembly having a wheel speed sensor and FIGS. 32 and 33 illustrate perspective views of the wheel assembly including the wheel speed sensor.
Figure 33:
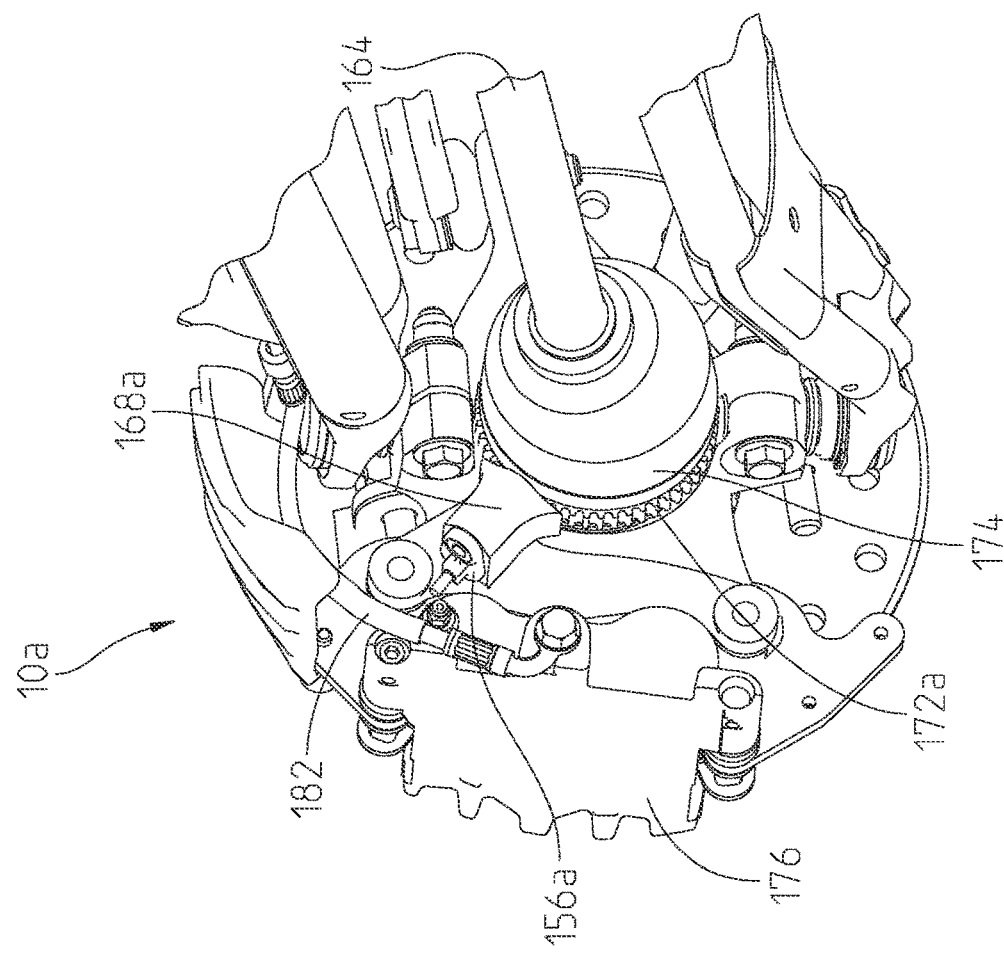
Figure 32:
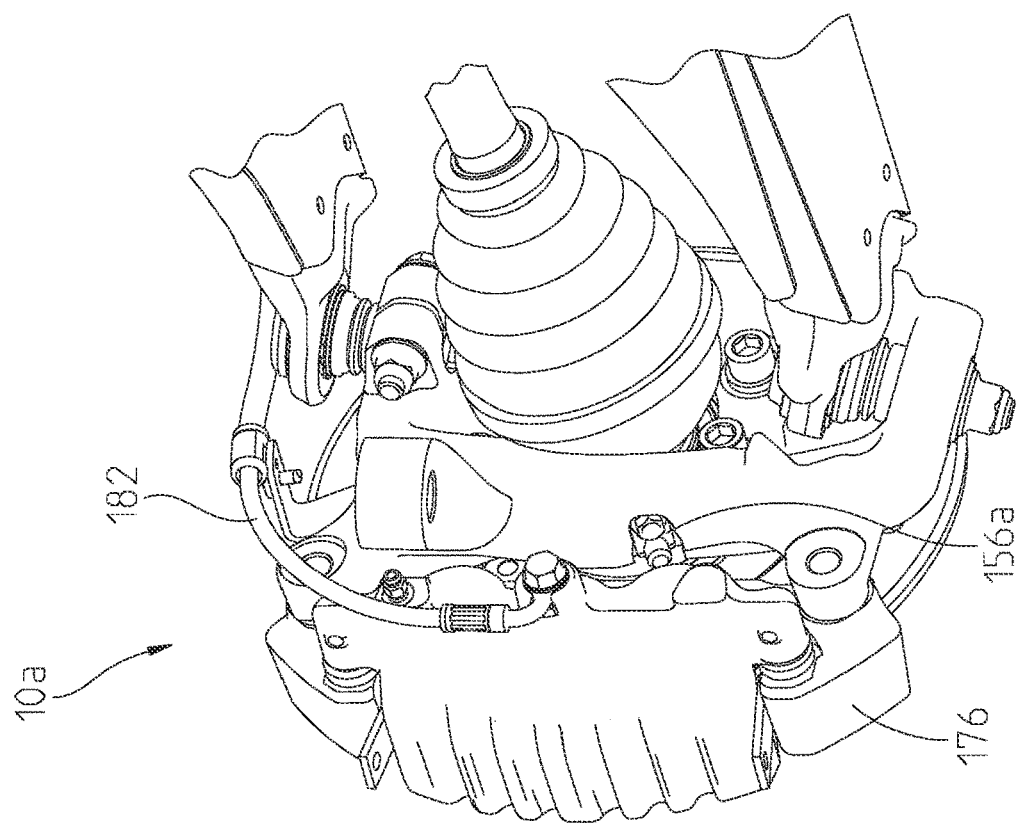
Figure 34:
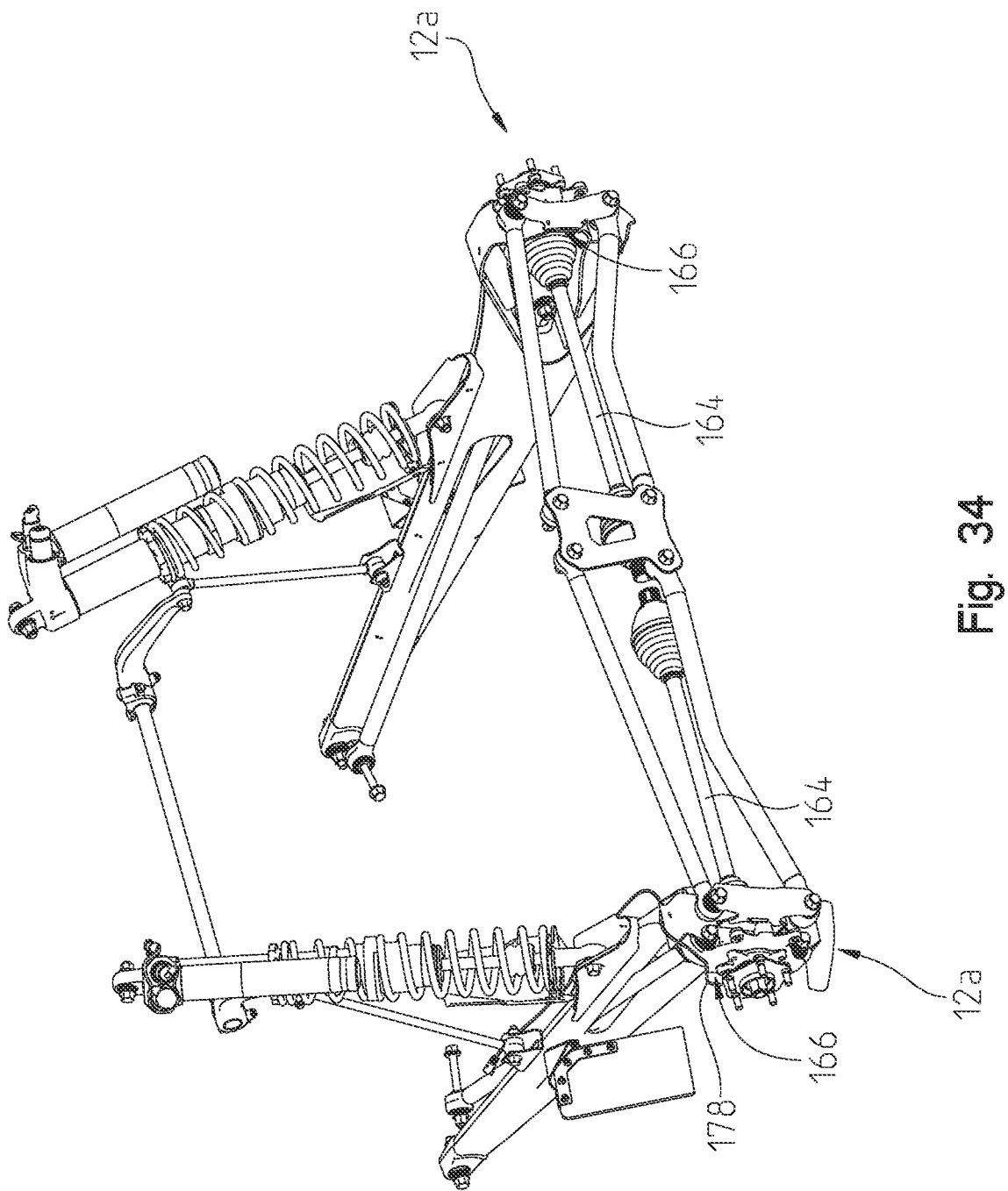
FIG. 34 illustrates a perspective view of an example rear suspension including a wheel assembly having a wheel speed sensor and FIGS. 35 and 36 illustrate perspective views of the wheel assembly including the wheel speed sensor.
Figure 36:
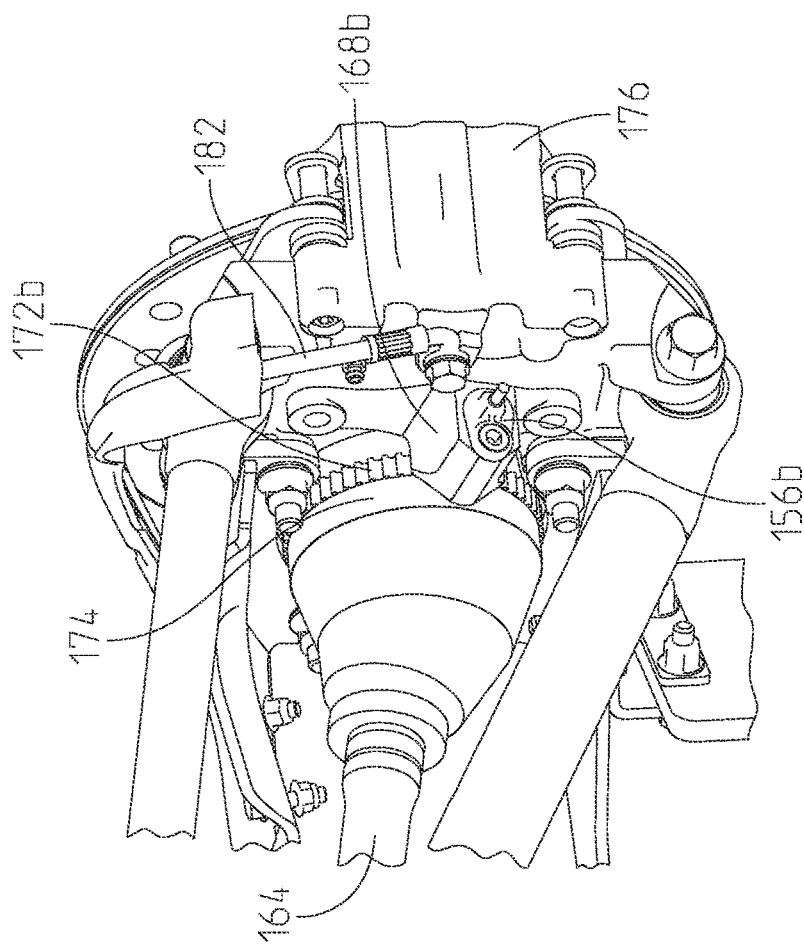
Figure 35:
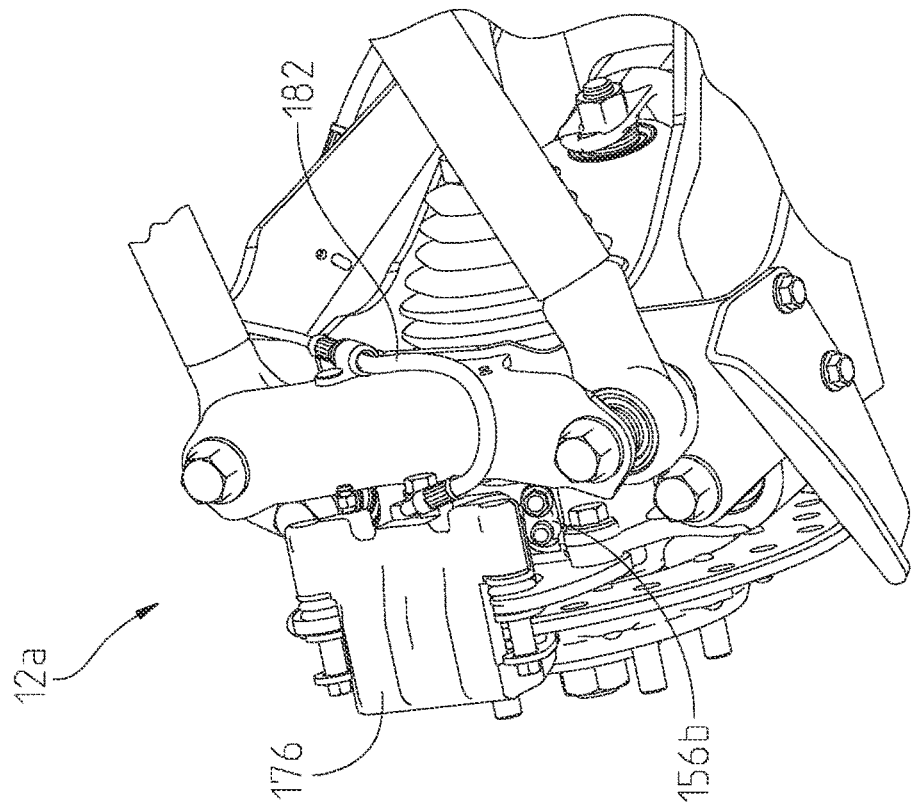
Figure 38:
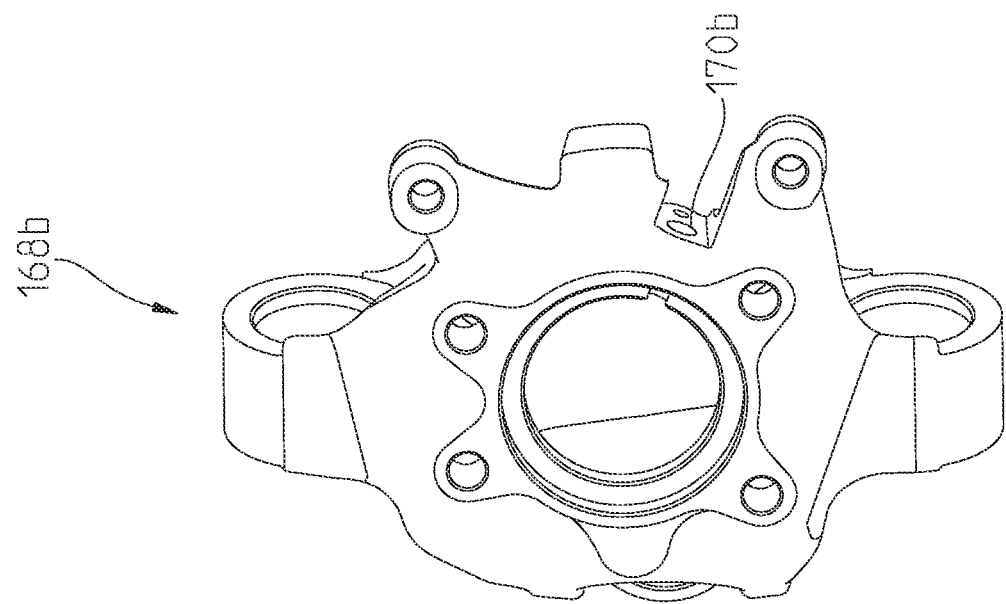
FIG. 37 illustrates a side perspective view of an example front knuckle for a wheel assembly and FIG. 38 illustrates a side perspective view of an example rear knuckle for the wheel assembly.
Figure 37:
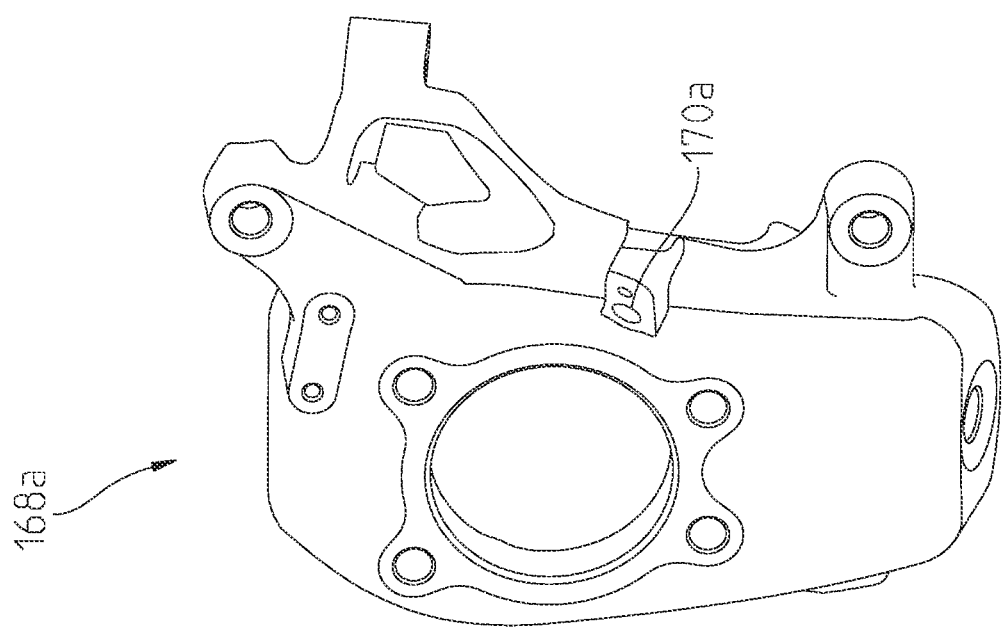

FIG. 31 illustrates a perspective view of a front suspension including a wheel assembly 10a having a wheel speed sensor 156a and FIGS. 32 and 33 illustrate perspective views of the wheel assembly 10a including the wheel speed sensor 156a. FIG. 34 illustrates a perspective view of a rear suspension including a wheel assembly 12a having a wheel speed sensor 156b and FIGS. 35 and 36 illustrate perspective views of the wheel assembly 12a including the wheel speed sensor 156b. FIG. 37 illustrates a side perspective view of a front knuckle 158 for the wheel assembly 10a. And, FIG. 38 illustrates a side perspective view of a rear knuckle 160 for the wheel assembly 12a. According to certain embodiments, the wheel speed sensor 156a senses the rotational speed of the front ground-engaging member 10 of the wheel assembly 10a and the wheel speed sensor 156b senses the rotational speed of the rear ground-engaging member 12 of the wheel assembly 12a.

In at least some embodiments, the positioning of the speed sensor 156 as illustrated and as explained in more detail below provides advantages over conventional embodiments. For example, in certain conventional embodiments the wheel speed sensor 156 is placed at the interface 162 between the halfshaft 164 and the transmission/front drive. However, the interface 162 between the halfshaft 164 and the transmission/front drive is loose, allowing the halfshaft 164 to move in an unconstrained manner changing the airgap of the wheel speed sensor 156. This movement can lead to errors in the wheel speed sensor readings.

In comparison, the interface 166, which is proximal a portion of the halfshaft 164 that is proximate the wheel assembly 10a, 12a, is tight (i.e., for example, does not move in the same unconstrained manner as does the interface 162) and runs concentrically so that wheel sensor readings determined by the wheel speed sensors 156 are more accurate since the gap remains constant. As such, according to certain embodiments, the wheel speed sensors 156 are placed at the interface 166 to allow for more accurate wheel speed readings. In some examples, the interface 166 is located within 0-6 inches of the wheel assembly 10a, 12a. As another example, the interface 166 can be located within 0-6 inches of the brake caliper 174. As another example, the interface 166 is located within 0-6 inches of the knuckle 168.

To arrange the wheel speed sensors 156 at the interface 166, the knuckles 168a, 168b can include conduits 170a, 170b within which the speed sensor 156 can be arranged. In certain examples, the speed sensor 156 can sense the rotational speed of the ground-engaging members 10, 12 using a magnetic encoder 174 mounted on a side of a bearing seal 172 of the wheel assemblies 10a, 12a. As another example, an encoder ring 174 is mounted onto a halfshaft 164 at the wheel end. In certain embodiments, the encoder ring 174 is made of steel. In other examples, the encoder ring 174 is made out of another ferrous material that, for example, has a lower profile than steel.

In certain embodiments, the wheel speed sensor 156 can be arranged relative to the brake caliper 176 so that the brake caliper 176 at least partially protects the wheel speed sensor 156 from debris, etc. For example, in certain embodiments, the wheel speed sensor 156 can be arranged between the brake caliper 176 and the knuckle 168. Additionally, or alternatively, in some aspects, the wheel speed sensor 156 is arranged closer to the interface 166 than the brake caliper 176. Additionally, or alternatively, the wheel speed sensor 156 can be arranged in the same radial plane as at least a portion of the brake caliper 176. Additionally, or alternatively, the wheel speed sensor 156 can be arranged radially closer to the bearing seal 172 and/or the halfshaft 164 than the brake caliper 176. As such, if debris approaches the wheel assembly 10a, 12a, the brake caliper 176 can block the debris from coming into contact with the wheel speed sensor 156.

According to certain embodiments, because of the location of the wheel speed sensor 156 and where the wheel speed sensor 156 interfaces with the main vehicle harness such that it is inboard the chassis 184 (see FIG. 39) of the all-terrain vehicle 2, if the wheel speed sensor 156 is damaged (e.g., torn off), the main harness does not need to be repaired, only the wheel speed sensor 156 needs to be replaced.

In certain aspects, because the wheel speed sensor 156 is arranged proximal the interface 168 as opposed to proximal the interface 162, it may be beneficial to reduce the likelihood of unwanted damage to the wiring 178 connected to the wheel speed sensor 156. As such, in certain embodiments, at least a portion of the wiring 178 is routed along, proximal, and/or into a chassis 184 (see FIG. 39) of the all-terrain vehicle 2. In certain embodiments, by routing the wiring 178 along, proximal, and/or into a chassis 184 of the all-terrain vehicle 2, the wiring 178 can be easily accessed and/or replaced. Additionally, or alternatively, in certain aspects, at least a portion of the wiring 178 (e.g., a proximal portion 178a of the wiring 178) for the wheel speed sensor 156a can be routed along, proximal, and/or into an a-arm 180 that is coupled to the wheel assembly 10a. Additionally, or alternatively, in certain aspects, at least a portion of the wiring 178 (e.g., a proximal portion 178a of the wiring 178) for the wheel speed sensor 156a can be routed along and/or proximal to a brake line 182 for the caliper 174. Additionally, or alternatively, a protective covering can be arranged around at least a portion of the wiring 178. In some embodiments, the protective covering can be plastic, metal, and/or another material suitable for providing a protective sheathing around the wiring 178.

Figure 39:
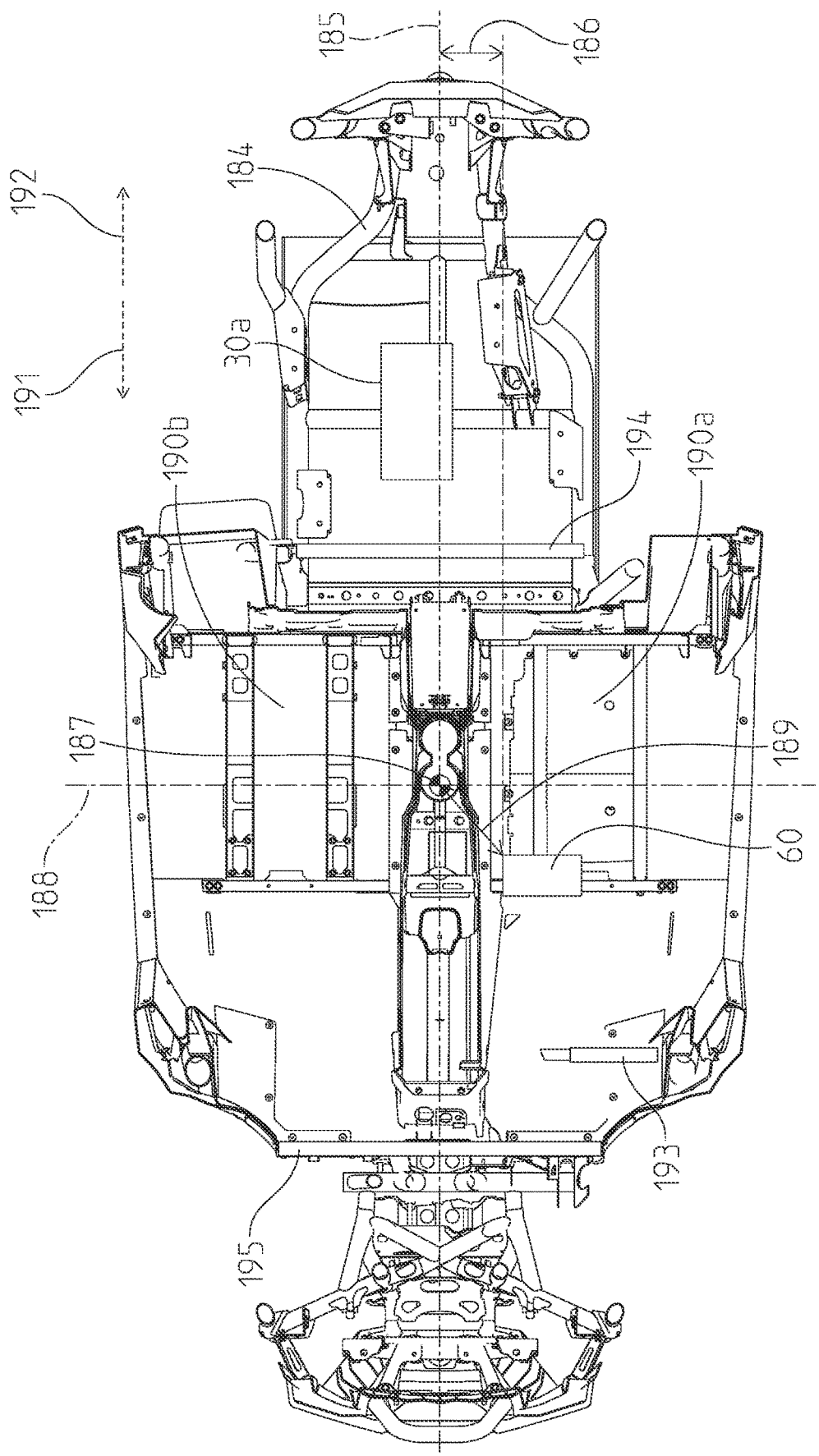
FIGS. 39-41 illustrate top views of a portion of an all-terrain vehicle including example arrangements of a HECU coupled to the braking system of the all-terrain vehicle.
Figure 40:
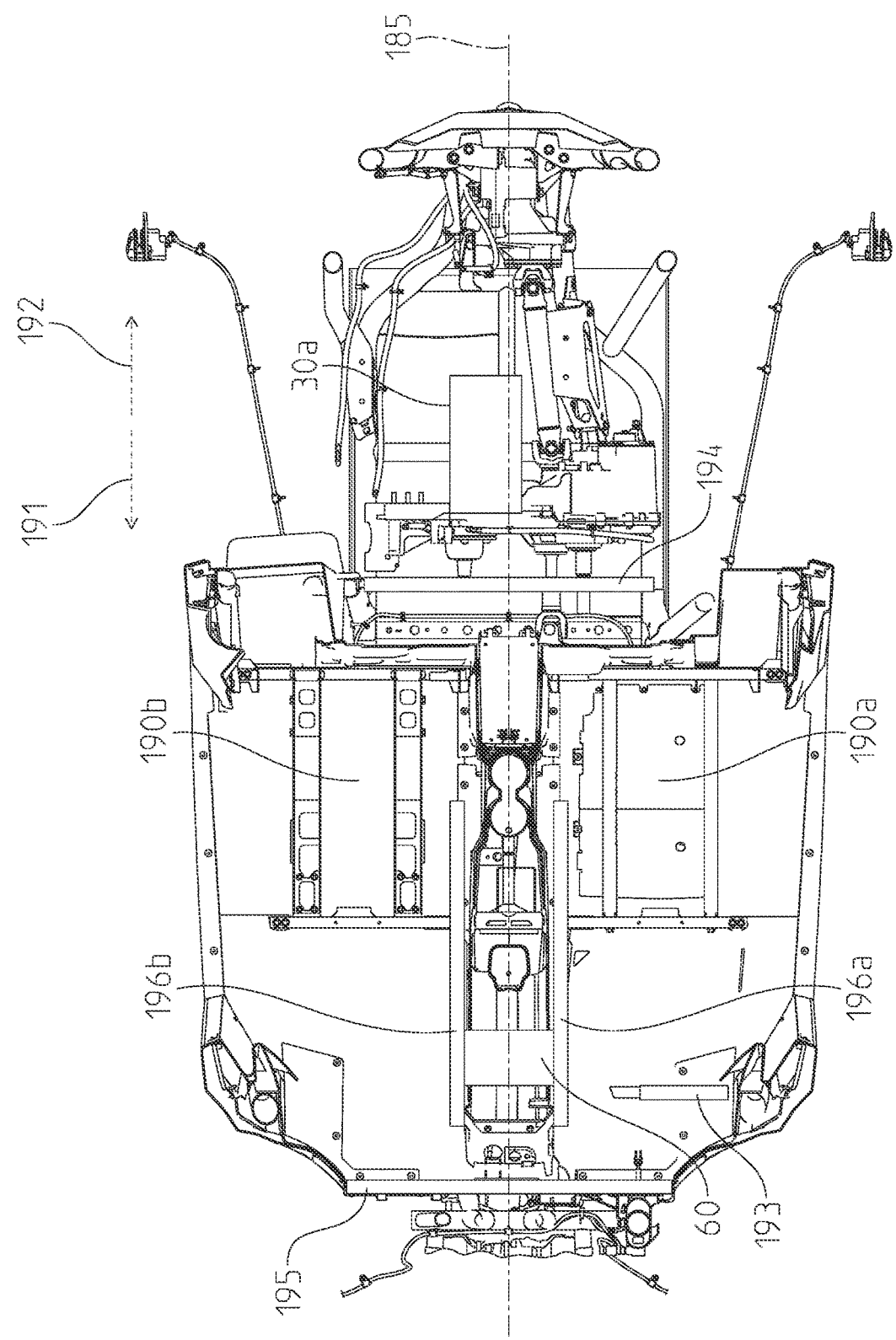
Figure 41:
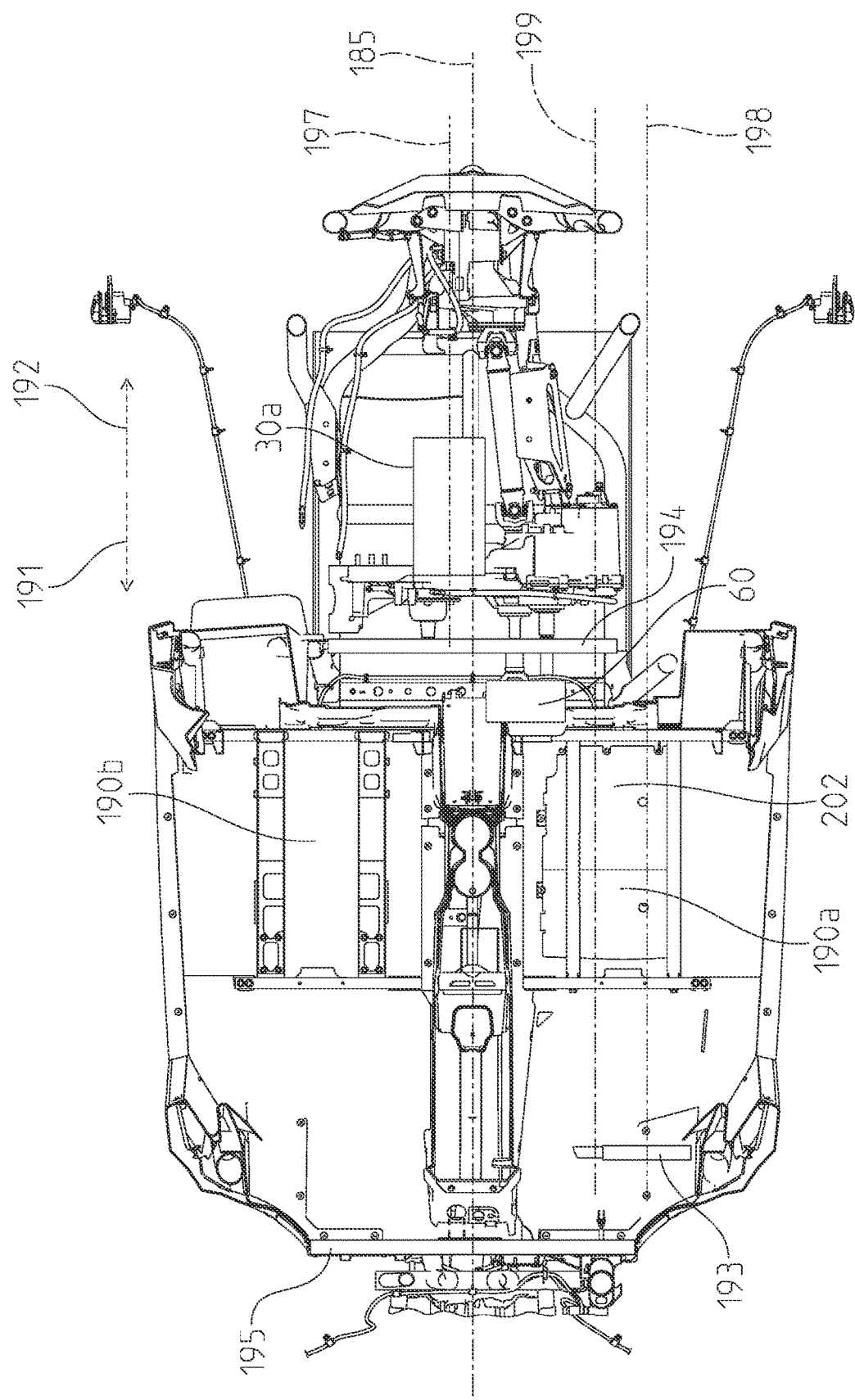

FIGS. 39-41 illustrate top views of a portion of an all-terrain vehicle 2 including a HECU 60 coupled to the braking system of the all-terrain vehicle 2, according to different embodiments of the present disclosure. In certain aspects, the positioning of the HECU 60 is important to mitigate vibrations of the HECU 60 and enable easier calibration of the HECU 60. Embodiments disclosed herein provide these advantages.

In certain aspects, the HECU 60 is arranged proximal a longitudinal centerline 185 of the all-terrain vehicle 2 as shown in FIGS. 39 and 41 or along a longitudinal centerline 185 of the all-terrain vehicle 2, as shown in FIG. 40. In certain aspects, a distance 186 between the longitudinal centerline 185 and the HECU 60 can be less than or equal to 12 inches. In some examples, the distance 186 is measured from a portion of the HECU 60 that is closest to: (i) the longitudinal centerline 185, (ii) a center of the HECU 60, or (iii) a portion of the HECU 60 that is farthest away from the longitudinal centerline 185. In some of these instances, the HECU 60 can be mounted to the chassis 184. Additionally, or alternatively, this central location of the HECU 60 provides access to the routing track containing both the brake lines 182 and/or the electrical harness.

In certain aspects, the HECU 60 can be arranged proximal a seat 190 of the all-terrain vehicle 2, as shown in FIG. 39. In some instances, the HECU 60 is arranged proximal a driver's seat 190a or a passenger seat 190b of the all-terrain vehicle 2. In some examples, the HECU 60 is arranged beneath a seat 190 or in a position that is in a forward direction 191 relative to the seat 190.

Additionally, or alternatively, the HECU 60 can be arranged (i) in a forward direction 191 relative to an engine 30a of the powertrain assembly 30 of the all-terrain vehicle 2 and/or (ii) in a rearward direction 192 relative to a steering column 193 and/or (iii) in a forward direction 191 relative to a rear firewall 194 and/or (iv) in a rearward direction 192 relative to a front firewall 195 and/or (v) between frame rails 196 of the all-terrain vehicle 2 and/or (vi) between a plane 197 extending through the engine 30a and a plane 198 extending through the steering column 193 and/or (vii) between a plane 197 extending through the engine 30a and a plane 199 extending through a foot pedal of the all-terrain vehicle 2, as shown in FIG. 41 and/or (vii) behind the battery 202 of the all-terrain vehicle, as shown in FIG. 41.

Additionally, or alternatively, the HECU 60 can be arranged proximal a center of mass 187 of the all-terrain vehicle 2, as shown in FIG. 39. Additionally, or alternatively, the HECU 60 can be arranged proximal an axis 188 that laterally extends through the center of mass 187. For example, in certain aspects, a distance 189 between the center of mass 187 and/or axis 188 and the HECU 60 can be less than or equal to 12 inches. In some examples, the distance 189 is measured from (i) a portion of the HECU 60 that is closest to the center of mass 187 and/or axis 188, (ii) a center of the HECU 60, or (iii) a portion of the HECU 60 that is farthest away from the center of mass 187 and/or axis 188.

All of the embodiments described above reduce the likelihood of vibrations of the HECU 60 and enable easier calibration of the HECU 60.

FIGS. 42-45 illustrate examples user interfaces 204 displaying driveline configurations, in accordance with at least some embodiments of the present disclosure. According to certain embodiments, the user interfaces 204 are configured to display a driveline configuration of the all-terrain vehicle 2. The driveline configuration and/or an indication of the driveline configuration may be displayed in a variety of ways on the user interface 204. According to certain embodiments, while the driveline configurations below primarily refer to the differentials being open or closed, the embodiments described herein may also include other types of differential statuses, such as smart locking (i.e., controlled slip), etc. for the front and/or the rear differentials.

In at least one embodiment, an indication of the driveline configuration may be displayed via one or more icons 1502, 1503 that change in response to a change in the driveline configuration of the all-terrain vehicle 2. For example, in the illustrated embodiments of FIGS. 42-44, the driveline configuration is in the second vehicle mode of Table 3 above (i.e., the trail mode). In response the all-terrain vehicle 2 being in the second vehicle mode, the one or more icons 1502*a*, 1503*a* display an image corresponding to and/or associated with the second vehicle mode, in this example the trail mode. In comparison, in the illustrated embodiment of FIG. 45, the driveline configuration is in the fourth vehicle mode of Table 3 above (i.e., the track/drive 2WD mode). In response the all-terrain vehicle 2 being in the fourth vehicle mode, the one or more icons 1502*b*, 1503*b* display an image corresponding to and/or associated with the fourth vehicle mode, in this example the track/drive mode. Further, the one or more icons 1502, 1503 can include other images corresponding to the other types of driveline modes in Table 3. For example, the one or more icons 1502, 1503 can include a distinct image for each of the following driveline modes: the first vehicle mode (i.e., turf mode), the third vehicle mode (i.e., track/drive AWD mode), and the fifth vehicle mode (i.e., rock crawl mode).

In certain embodiments, the one or more icons 1502, 1503 can be displayed in a variety of locations on the user interface 204. For example, the one or more icons 1502 can be displayed in a corner of the user interface 204 and/or the one or more icons 1503 can be displayed away from a corner of the user interface 204, as illustrated in FIGS. 42-45.

As another example of an indication of the driveline configuration being displayed on the user interface 204, the user interface 204 can include a background 1504 corresponding to driveline configuration of the all-terrain vehicle 2 that changes in response to a change in the driveline configuration. For example, as shown in the illustrated embodiments of FIGS. 42-44, in response to the all-terrain vehicle 2 being in the second vehicle mode, the background 1504*a* displays an image corresponding to and/or associated with the second vehicle mode, in this example the trail mode. In comparison, as shown in the illustrated embodiment of FIG. 45, the driveline configuration is in the fourth vehicle mode of Table 3 above (i.e., the track/drive 2WD mode). In response the all-terrain vehicle 2 being in the fourth vehicle mode, the background 1504*b* displays an image corresponding to and/or associated with the fourth vehicle mode, in this example the track/drive mode. Further, the background 1504 can include other images corresponding to the other types of driveline modes in Table 3. For example, the background 1504 can include a distinct image for each of the following driveline modes: the first vehicle mode (i.e., turf mode), the third vehicle mode (i.e., track/drive AWD mode), and the fifth vehicle mode (i.e., rock crawl mode).

As another example of an indication of the driveline configuration being displayed on the user interface 204, the user interface 204 can include one or more icons 1506, 1507 that include an indicium 1508-1511 of the differential status of the all-terrain vehicle 2. In aspects, the indicium 1508-1511 of the differential status included in the one or more icons 1506, 1507 changes in response to a change in the driveline configuration. For example, as shown in the illustrated embodiments of FIGS. 42-44, in response to the all-terrain vehicle 2 being in the second vehicle mode, which corresponds to the front and rear differentials being open/disconnected, the icons 1506*a*, 1507*a* include an indicia 1508*a*, 1509*a* that the front and rear differentials of the all-terrain vehicle 2 are open/disconnected. For example, the icon 1506*a* includes a light circle 1508*a* at a location of the front differential indicating the status of the front differential (i.e., front differential status) is open/disconnected and the icon 1506*a* includes a light circle 1509*a* at a location of the rear differential indicating the status of the rear differential (i.e., rear differential status) is open/disconnected. Similarly, in some examples, the icon 1507*a* includes an unlock symbol 1510*a* at a location of the front differential indicating the status of the front differential is open/disconnected and the icon 1507*a* includes unlock symbol 1511*a* at a location of the rear differential indicating the status of the rear differential is open/disconnected.

Figure 45:
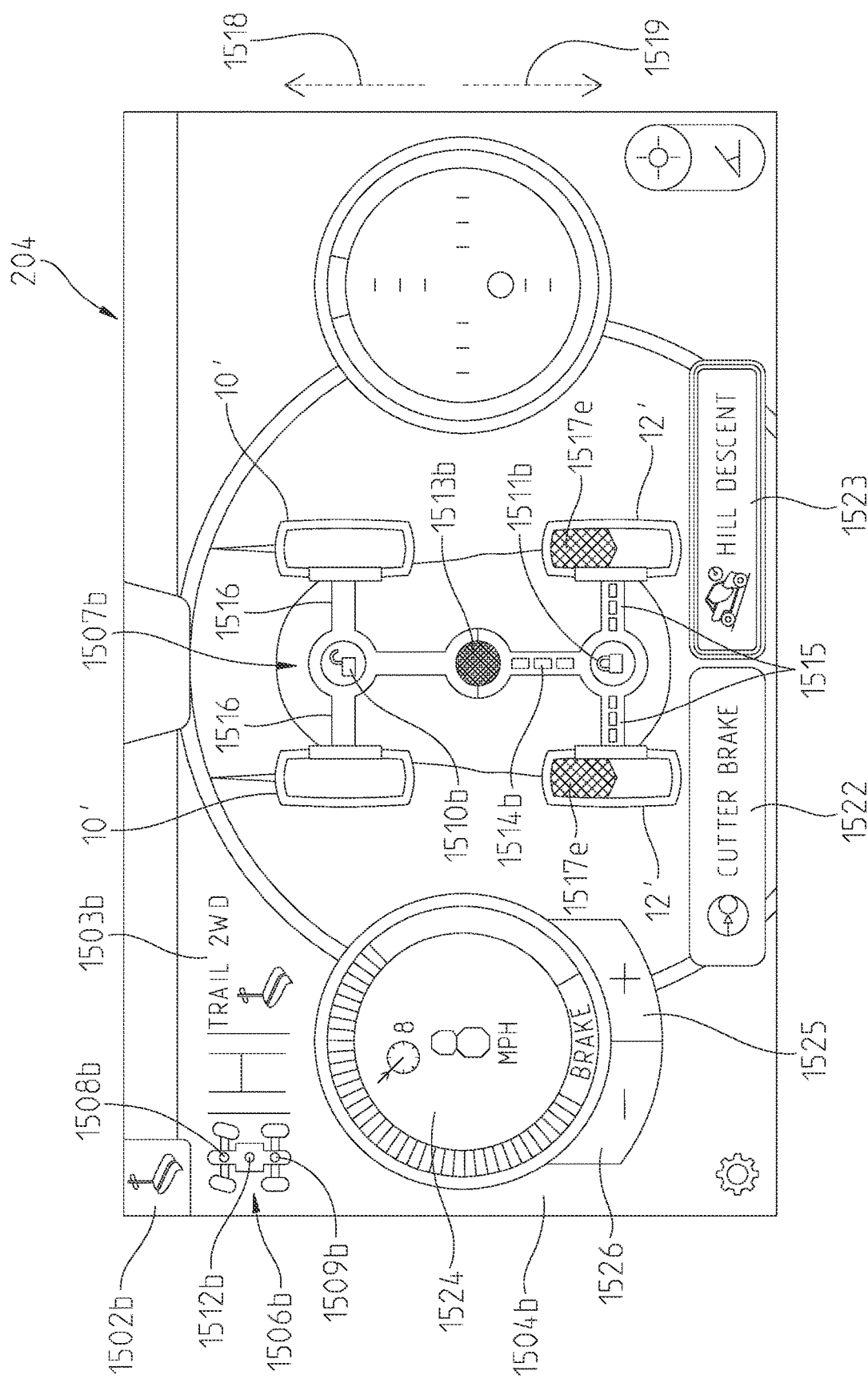

In comparison, as shown in the illustrated embodiment of FIG. 45, in response to the all-terrain vehicle 2 being in the fourth vehicle mode, which corresponds to the rear differentials being locked/closed/connected, the icons 1506*b*, 1507*b* include an indicia 1508*b*, 1509*b* that the rear differential of the all-terrain vehicle 2 is locked/closed/connected. For example, the icon 1506*b* includes a grey circle at a location of the front differential indicating the all-terrain vehicle 2 is operating in 2WD mode and the icon 1506*b* includes a dark circle 1509*b* at a location of the rear differential indicating the status of the rear differential (i.e., rear differential status) is open/disconnected. Similarly, in some examples, the icon 1507*b* includes lock symbol 1511*b* at a location of the rear differential indicating the status of the rear differential is closed/locked/connected.

Figure 42:
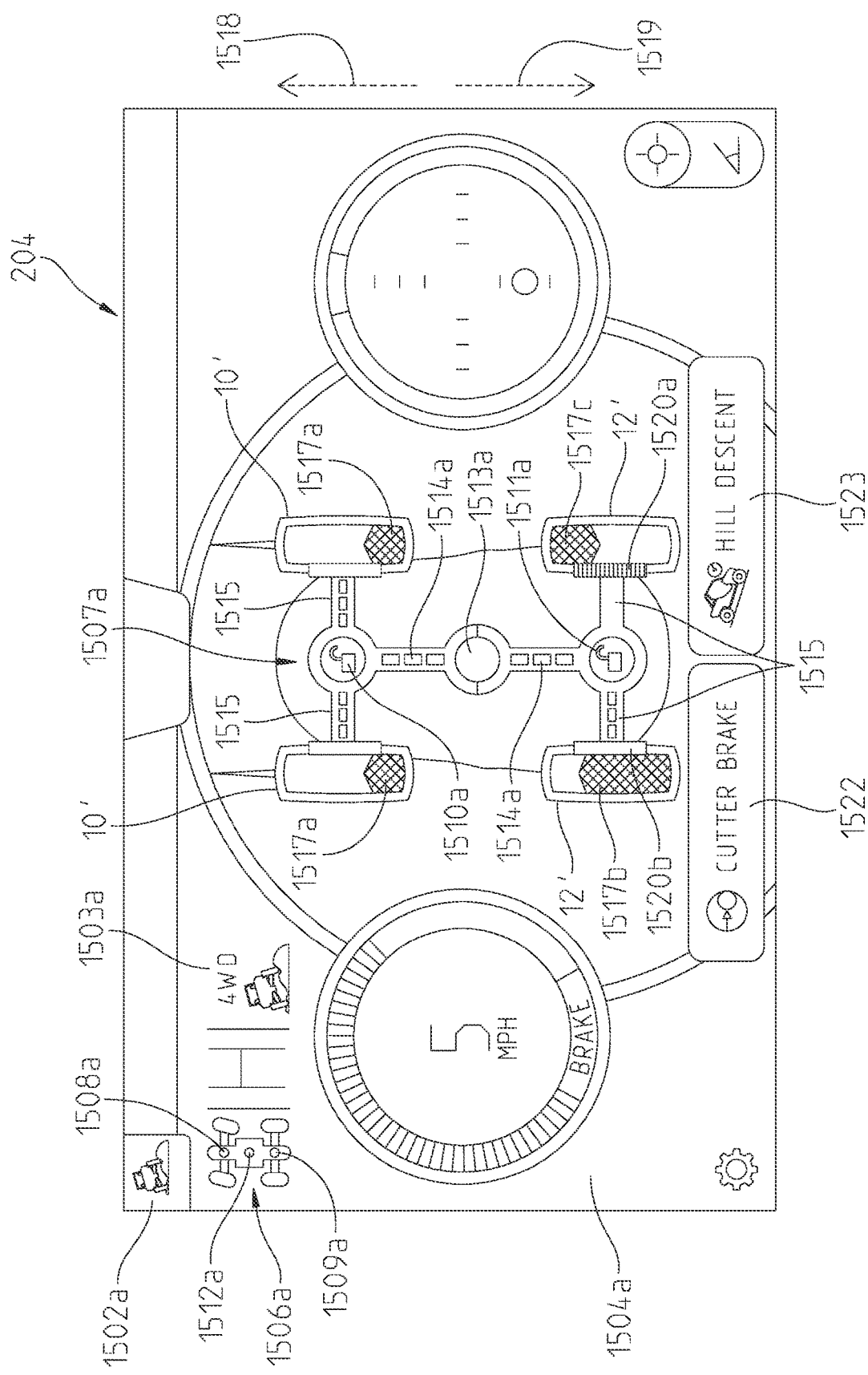
FIGS. 42-45 illustrate examples user interfaces displaying driveline configurations.
Figure 43:
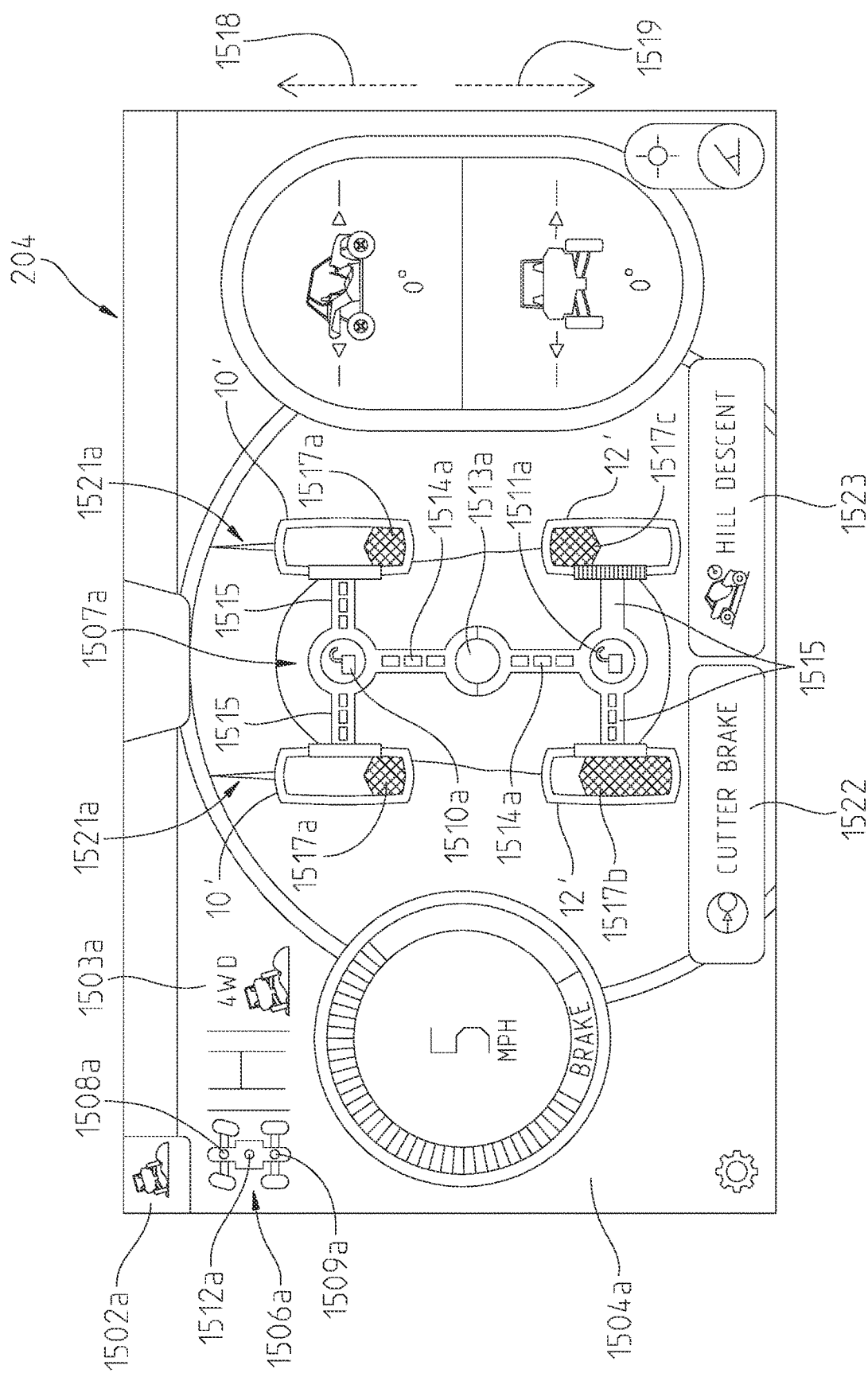
Figure 44:
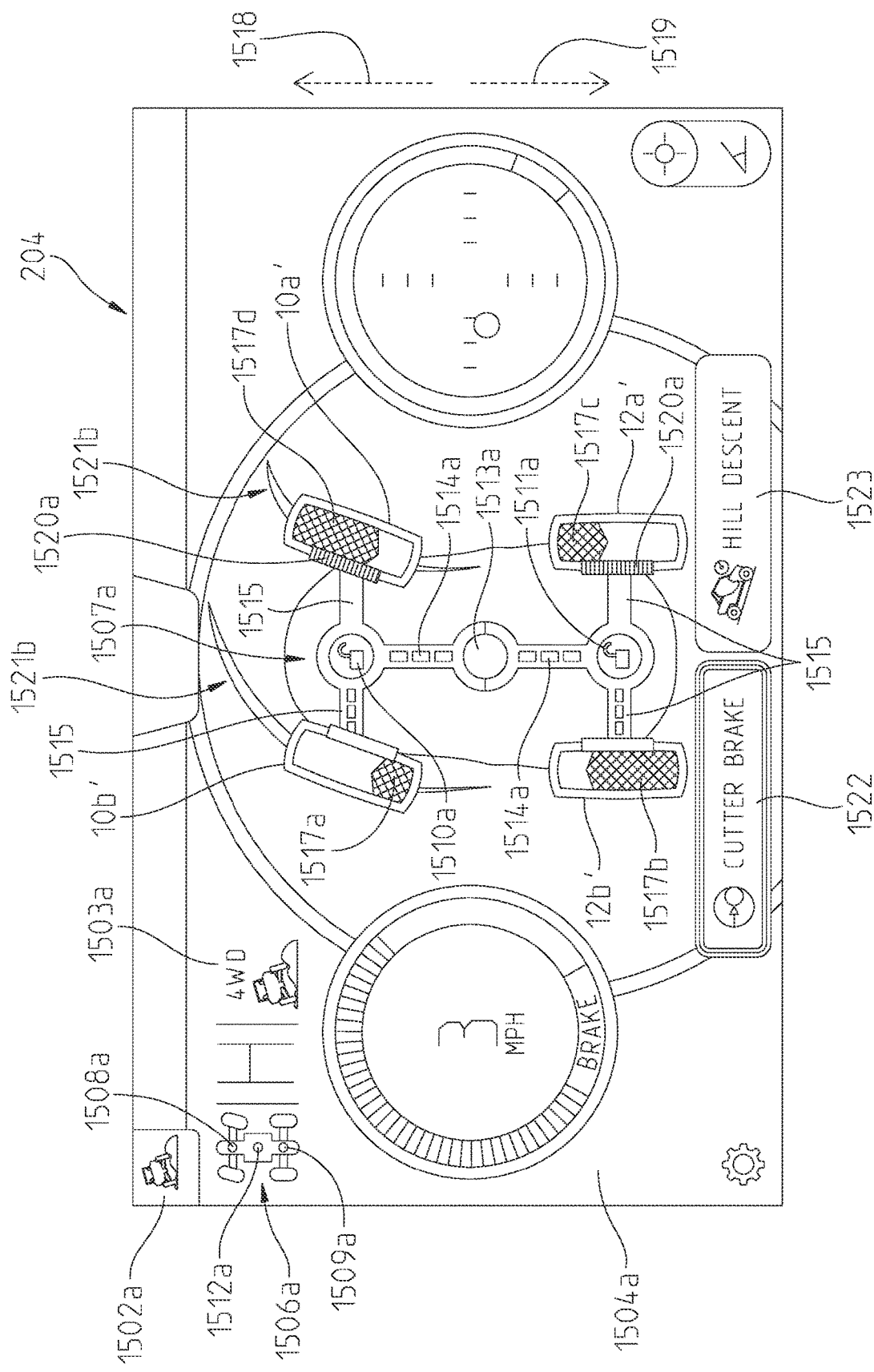

In certain aspects, the one or more icons 1506, 1507 includes an indicia 1512, 1513 of a transfer case status. For example, as illustrated in FIGS. 42-44, in response to the all-terrain vehicle 2 being in AWD mode, the icons 1506*a*, 1507*a* include an indicia 1512*a*, 1513*a* at a location of the transfer case on the icons 1506*a*, 1507*a*, in this example a light circle, indicating the all-terrain vehicle is in AWD. In comparison, as illustrated in FIG. 45, in response to the all-terrain vehicle 2 being in 2WD mode, the icons 1506*b*, 1507*b* include an indicia 1512*b*, 1513*b* at a location of the transfer case on the icons 1506*b*, 1507*b*, in this example a dark circle, indicating the all-terrain vehicle is in 2WD.

As another example, as illustrated in FIGS. 42-44, in response to the all-terrain vehicle 2 being in AWD mode, the icon 1507*a* includes an indicia 1514*a* at a location of the transfer case on the icon 1507*a*, in this example a dotted line extending from the rear differential to the front differential, indicating the all-terrain vehicle is in AWD. In comparison, as illustrated in FIG. 45, in response to the all-terrain vehicle 2 being in 2WD mode, the icon 1507*b* includes an indicia 1514*b* at a location of the transfer case on the icon 1507*b*, in this example a dotted line that extends from the rear differential but does not extend completely to the front differential, indicating the all-terrain vehicle is in 2WD. Other types of indicia can be used as well including other symbols, colors, opacity, line weight, moving dash animations, etc.

Additionally, or alternatively, in certain embodiments, the user interface 204 is configured to display whether power and/or torque and/or how much power and/or torque is being transferred to a specific ground-engaging member 10, 12. For example, as illustrated in FIGS. 42-44, in response to the all-terrain vehicle 2 being in AWD mode, the icon 1507*a* includes an indicia 1515 at a location of the axles on the icon 1507*a*, in this example a dotted line extending from the differentials to the ground-engaging members 10', 12' included in the icon 1507, indicating power and/or torque is being transferred to all the ground-engaging members 10', 12'. Additionally, or alternatively, in certain embodiments, a line weight of the dotted line and/or speed of the dotted line extending from the differentials to the ground-engaging members 10', 12' included in the icon can be used to indicate the amount of power and/or torque being transferred to a ground-engaging member. In comparison, as illustrated in FIG. 45, in response to the all-terrain vehicle 2 being in 2WD mode, the icon 1507*b* includes an indicia 1516 at a location of the front axle on the icon 1507*b*, indicating power and/or torque is not being transferred to the ground-engaging members 10' but power and/or torque is being transferred to the ground-engaging members 12'. Other types of indicia can be used to indicate a power and/or torque transfer and/or a lack of power and/or torque transfer including other symbols, colors, opacity, line weight, moving dash animations, speed of any lines extending from/to a differential, etc.

Additionally, or alternatively, in certain embodiments, the user interface 204 is configured to display an indicia 1517 corresponding to an amount of force on one or more ground-engaging members 10', 12'. For example, as illustrated in FIGS. 42-45, one or more sensors can be incorporated into the all-terrain vehicle 2 that sense a force on one or more ground-engaging members. In response, the sensor measurements can be communicated and displayed as an indicia 1517 on the user interface 204. In certain aspects, the indicia 1517 includes a direction of the force. For example, the indicia 1517*a*, 1517*b* includes an arrow in a forward direction 1518 that corresponds to a force being applied in the forward direction 1518 to the ground-engaging members 10', 12'. As another example, the indicia 1517*c*, 1517*d*, 1517*e* includes an arrow in a rearward direction 1519 that corresponds to a force being applied in the rearward direction 1519 to the ground-engaging members 10', 12'. Additionally, or alternatively, in certain embodiments, the indicia 1517 includes a magnitude of the force being applied to the ground-engaging members 10', 12'. For example, the magnitude of the force being applied to the ground-engaging members 10', 12' can be indicated by a length and/or amount of fill of the indicia 1517. As such, the indicia 1517*b*, 1517*d* indicates a force is being applied to the respective ground-engaging members 10', 12' that is greater than the force being applied to the respective ground-engaging members 10', 12' for the indicia 1517*e* and the respective ground-engaging members 10', 12' for the indicia 1517*a*, 1517*c*. In addition, the indicia 1517*e* indicates a force is being applied to the respective ground-engaging members 10', 12' that is greater than the force being applied to the respective ground-engaging members 10', 12' for the indicia 1517*a*, 1517*c*.

Additionally, or alternatively, in certain instances, the indicia 1517 includes a representation of what type of force the ground-engaging member 10', 12' is experiencing. For example, an indicia 1517 including a first representation (e.g., color, opacity, pattern, etc.) may indicate a normal force in the forward direction 1518, as illustrated by the indicia 1517*a*, 1517*b*. As another example, an indicia 1517 including a second representation (e.g., color, opacity, pattern, etc.) that is different than the first representation may indicate an engine braking force in the rearward direction 1519, as illustrated by indicia 1517*e*. As even another example, an indicia 1517 including a third representation (e.g., color, opacity, pattern, etc.) that is different than the first representation and the second representation may indicate an braking force due to a brake caliper 174 in the rearward direction 1519, as illustrated by indicia 1517*c*, 1517*d*.

Additionally, or alternatively, in certain instances, the user interface 204 is configured to display an indicia 1520 corresponding to whether a brake caliper is engaged. For example, as illustrated in FIG. 42, an indicia 1520*a* including a first representation (e.g., color, opacity, pattern, etc.) may indicate the corresponding brake caliper 174 is engaged. As another example, an indicia 1520*b* including a second representation (e.g., color, opacity, pattern, etc.) that is different than the first representation may indicate the corresponding brake caliper 174 is not engaged.

Additionally, or alternatively, in certain instances, the ground-engaging members 10' included in the icon 1507 are configured to display a direction of the ground-engaging members 10' of the all-terrain vehicle 2. And, the direction of the ground-engaging members 10' included in the icon 1507 change in response to a change in a steering direction of the all-terrain vehicle 2. For example, as illustrated in FIG. 42, the ground-engaging members 10' are oriented in a forward direction 1518. In comparison, as illustrated in FIG. 44, the ground-engaging members 10' are oriented in a direction to the right of the forward direction 1518 in response to a change in the steering direction of the all-terrain vehicle 2.

Additionally, or alternatively, in certain instances, the icon 1507 is configured to display a vehicle steering trajectory 1521 (e.g., predicted trajectory) of the all-terrain vehicle 2. And, the vehicle steering trajectory 1521 (e.g., predicted trajectory) included in the icon 1507 changes in response to a change in the vehicle steering trajectory 1521 of the all-terrain vehicle 2. For example, as illustrated in FIG. 43, the vehicle steering trajectory 1521*a* (e.g., predicted trajectory) is oriented in a forward direction 1518. In comparison, as illustrated in FIG. 44, vehicle steering trajectory 1521*b* (e.g., predicted trajectory) is oriented in a direction to the right of the forward direction 1518 in response to a change in the vehicle steering trajectory of the all-terrain vehicle 2 due to, for example, a change in the steering direction of the all-terrain vehicle 2 and the brake calipers 174 of the inner ground-engaging members 10', 12' being applied, i.e., the brake calipers 174 represented by the indicia 1520*a*. In certain instances, the vehicle steering trajectory 1521 can be represented by a line, symbol, and/or the like.

Additionally, or alternatively, in certain instances, the user interface 204 includes one or more icons 1522, 1523 corresponding to various drive modes and/or driveline configurations of the all-terrain vehicle 2. For example, the icon 1522 corresponds to the cutter brake mode, which may also be referred to herein as the cutter brake driveline configuration, and the icon 1523 corresponds to a hill descent mode, which may also be referred to herein as the hill descent driveline configuration. As set forth above and as shown in FIG. 44, to allow for better and/or smaller turning radiuses, the HECU 60 may slow down the inner rear ground-engaging member 12a' (e.g., initiate flow of hydraulic fluid to only 52a) while maintaining the speed of the outer rear ground-engaging member 12b'. Additionally, or alternatively, the HECU 60 may slow down the inner front ground-engaging member 10a' (e.g., initiate flow of hydraulic fluid to only 52a) while maintaining the speed of the outer front ground-engaging member 10b'. By slowing down the inner rear ground-engaging member 12a' and/or the inner front ground-engaging member 10a', the HECU 60 may cause the vehicle 2 to achieve better and/or smaller turning radius. As stated above, this mode may be referred to herein as "cutter brake mode" and can be represented by a cutter brake mode icon 1522.

In certain instances, the better and/or smaller turning radius (i.e., predicted trajectory 1521b) displayed on the new user interface 204 may be indicated by an indicium that is different than a regular turning radius and/or vehicle steering trajectory 1521a (illustrated in FIG. 43). For example, in certain instances, the predicted trajectory 1521b may be indicated by a color, opacity, symbol, and/or the like that is different than the color, opacity, symbol, and/or the like for the predicted trajectory 1521a, as illustrated by comparing FIGS. 43 and 44.

Additionally, or alternatively, because the cutter brake mode is configured to initiate one or more braking calipers 174 of the all-terrain vehicle 2, the cutter brake mode icon 1522 may include a countdown such that if a user of the all-terrain vehicle 2 does not initiate a turn within a certain amount of time, the cutter brake mode will disengage. In certain instances, the cutter break mode may be referred to herein as "cutter brake ready mode" when the cutter brake mode is initiated. In certain instances, the countdown of the cutter brake ready mode can be illustrated in the cutter brake mode icon 1522 as a bar, fill and/or other indicium (e.g., timer, opacity, and/or the like) that decreases as the time decreases to initiate a turn before the cutter brake mode disengages. If a user does not initiate a turn before the bar, fill and/or other indicium expires, then the cutter brake ready mode will disengage. In at least some embodiments, after a cutter brake turn is completed, the cutter brake ready mode stays engaged for the duration of a timer (repeat), or until the user taps OFF to disengage.

Figure 46:
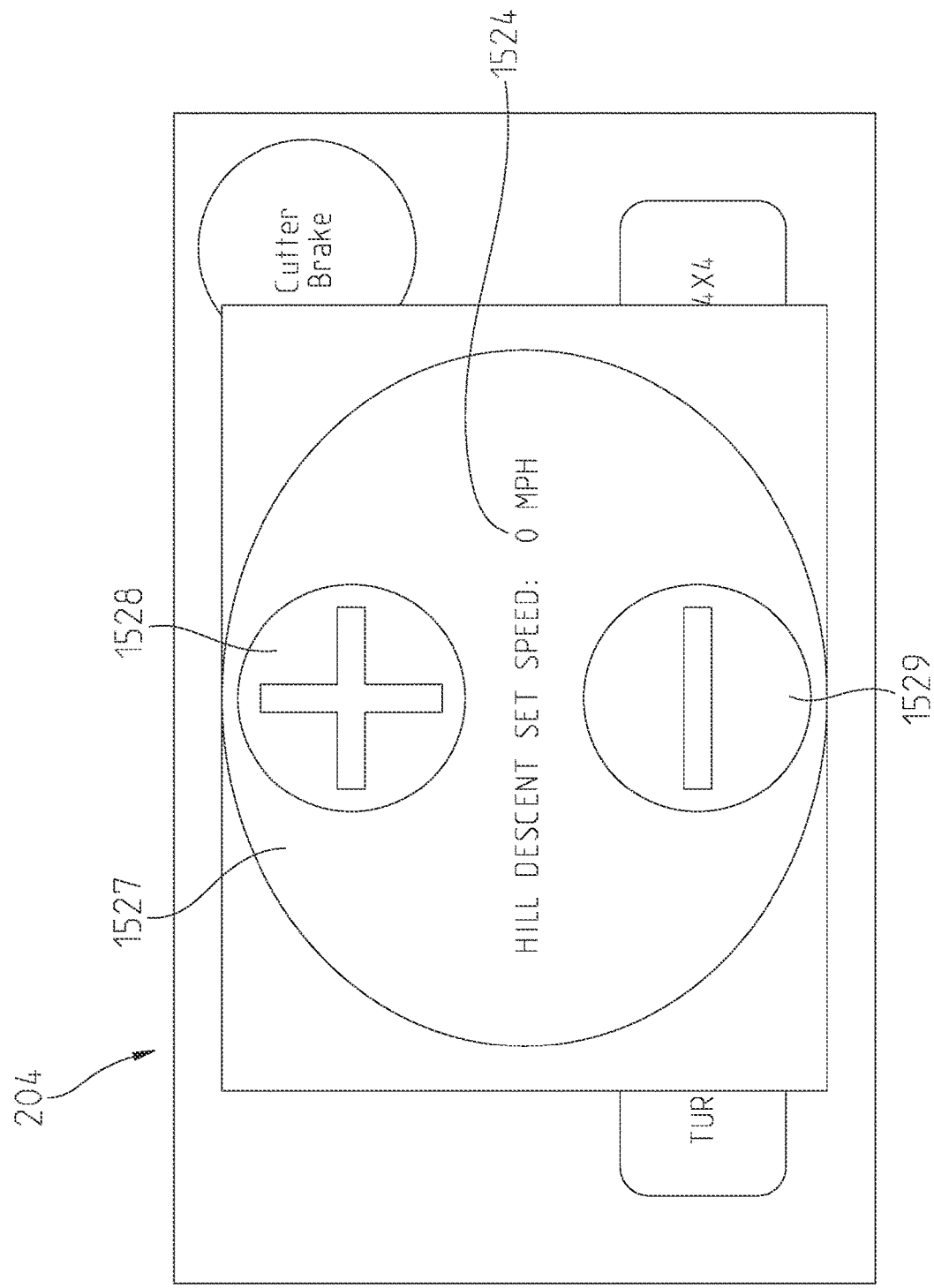
FIG. 46 illustrates an example pop-up for adjusting a set speed.

As another example, the user interface 204 includes the hill descent icon 1523. In certain instances, when the hill descent mode is initiated via the hill descent icon 1523, engine braking and/or one or more brake calipers 174 can be initiate to prevent the all-terrain vehicle 2 from exceeding a set speed 1524 (shown in FIG. 45) and/or reduce the all-terrain vehicle 2 to the set speed 1524 in the event the all-terrain vehicle 2 is travelling faster than the set speed 1524. In some instances, the set speed 1524 is the speed of the all-terrain vehicle 2 at which the brake calipers 174 are released. In certain instances, the set speed 1524 can be changed via one or more icons 1525, 1526. For example, the set speed can be increased via a set speed increase icon 1525 or decreased via a set speed decrease icon 1526. In certain instances, once the hill descent mode is initiated via the hill descent icon 1523, the user interface 204 can include a pop-up icon 1527, as shown in FIG. 46, and/or a slide-out icon that includes the icons 1528, 1529 to increase the set speed 1524 or decrease the set speed 1524, respectively. In certain instances, if the throttle pedal position 208 sensor senses an acceleration of the all-terrain vehicle 2 by the user, the hill descent mode can be disengaged in response to the acceleration. Additionally, or alternatively, in certain instances, if the brake sensor 210 sensor senses braking of the all-terrain vehicle 2 by the user, the hill descent mode can be engaged in response to the braking.

Figure 47:
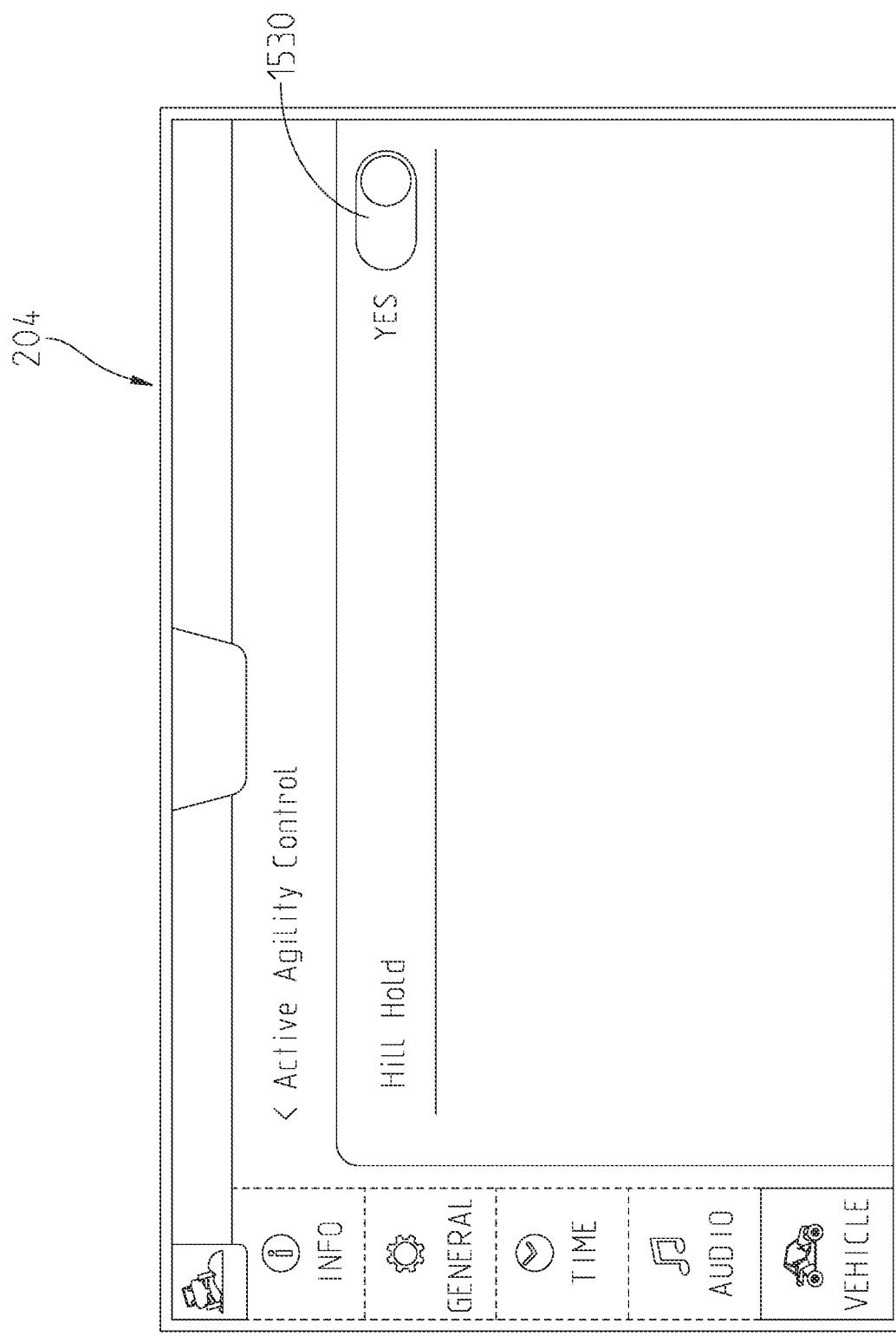
FIG. 47 illustrates an example user interface display for initiating hill hold.

Additionally, or alternatively, the user interface 204 can include a hill hold icon 1530 (as shown in FIG. 47) that, when initiated, will prevent an all-terrain vehicle 2 from rolling. Similarly, if the throttle pedal position 208 sensor senses an acceleration of the all-terrain vehicle 2 by the user, the hill descent mode can be disengaged.

Figure 48:
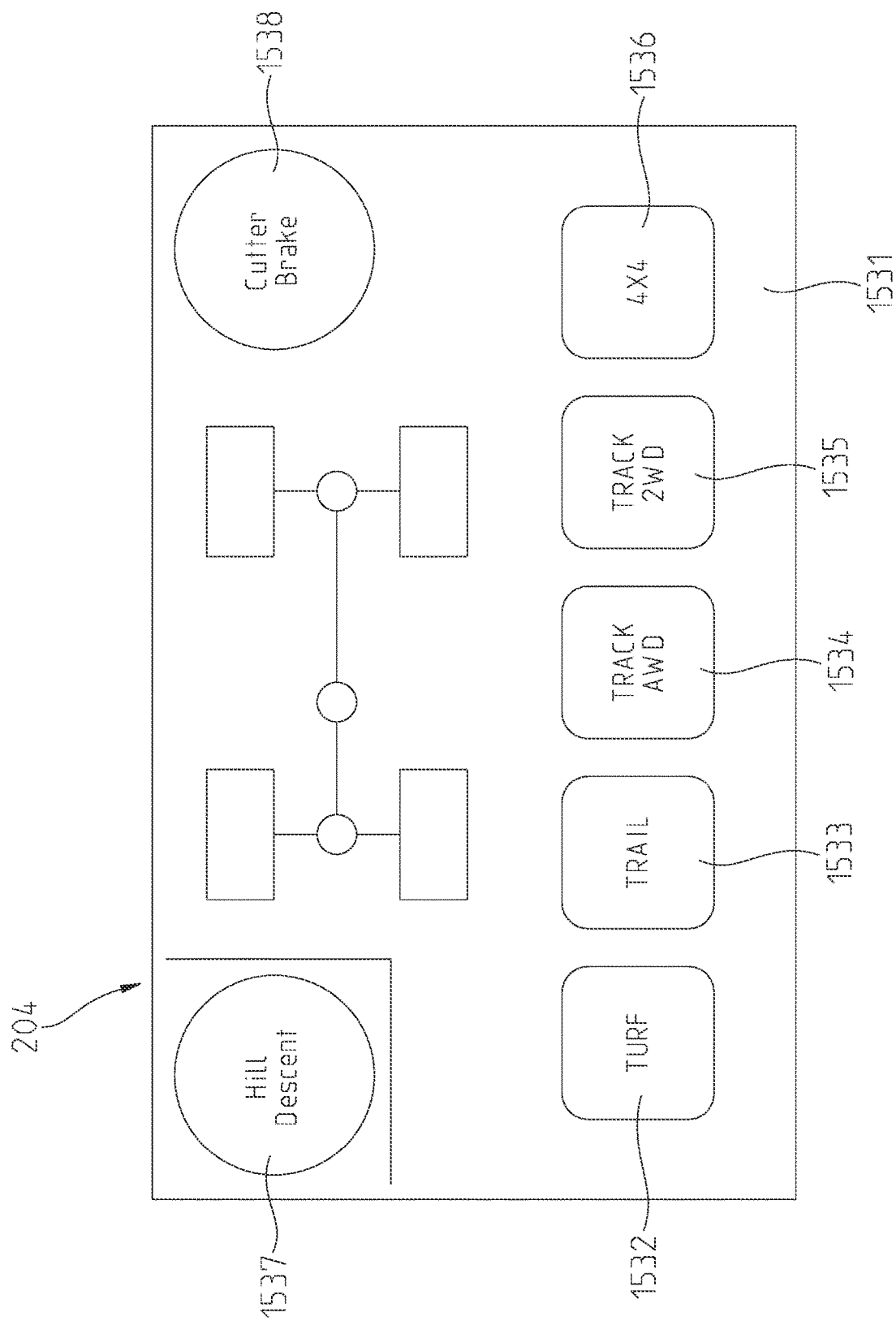
FIG. 48 illustrates another example embodiment of a user interface including a display of a driveline configuration of the all-terrain vehicle.

FIG. 48 illustrates another example embodiment of a user interface 204 including a display 1531 of a driveline configuration of the all-terrain vehicle 2. In certain instances, the display 1531 can be a pop-up and/or a slide out on the user interface 204. As illustrated, the user interface 204 includes a plurality of icons 1532-1538 for initiating different driveline configurations of the all-terrain vehicle 2. For example, the display 1531 can include one or more of the following: a turf icon 1532 that upon selection will initiate a turf driveline configuration (also referred to herein and in Table 3 above as the first vehicle mode), a trail icon 1533 that upon selection will initiate a trail driveline configuration (also referred to herein and in Table 3 above as the second vehicle mode), a track AWD icon 1534 that upon selection will initiate a track AWD driveline configuration (also referred to herein and in Table 3 above as the third vehicle mode), a track 2WD icon 1535 that upon selection will initiate a track 2WD driveline configuration (also referred to herein and in Table 3 above as the fourth vehicle mode), a 4×4 icon 1536 that upon selection will initiate a 4×4 driveline configuration (also referred to herein and in Table 3 above as the fifth vehicle mode and/or 4×4 rock crawl mode), a hill descent icon 1537 that upon selection will initiate a hill descent mode, and/or a cutter brake icon 1538 that upon selection will initiate a cutter brake mode. However, these are only examples and not meant to be limiting.

In certain instances, the user interface 204 discussed above can be a touch screen so that one or more of the driveline modes discussed above can be selected via touching the user interface 204. Additionally, or alternatively, one or more of the driveline modes discussed above can be selected via one or more operator controls 24 included in the all-terrain vehicle 2.

While this invention has been described as having an exemplary design, the present invention may be further modified within the spirit and scope of this disclosure. This application is therefore intended to cover any variations, uses, or adaptations of the invention using its general principles. Further, this application is intended to cover such departures from the present disclosure as come within known or customary practice in the art to which this invention pertains.

The invention claimed is:
1. An all-terrain vehicle, comprising:
a plurality of ground-engaging members;
a frame supported by the plurality of ground-engaging members;
a powertrain assembly supported by the frame and operably coupled to the plurality of ground-engaging members;
a shiftable transmission supported by the frame and operably coupled to the powertrain assembly, the shiftable transmission comprising a plurality of gears having a plurality of configurations including a reverse configuration to cause rearward movement of the all-terrain vehicle, a forward configuration to cause forward movement of the all-terrain vehicle, and a neutral configuration;

a display supported by the frame;

a back-up camera supported by the frame; and a controller operatively coupled to the shiftable transmission, the display, and the back-up camera, wherein the controller is configured to:

receive a signal from the shiftable transmission corresponding to the shiftable transmission being in a configuration of the plurality of configurations other than the reverse configuration;

determine the all-terrain vehicle is moving backwards; and automatically display on the display an output from the back-up camera in response to the shiftable transmission being in one of the plurality of configurations other than the reverse configuration and the all-terrain vehicle moving backwards.

2. The all-terrain vehicle of claim 1, wherein to determine the all-terrain vehicle is moving backwards, the controller is configured to determine the all-terrain vehicle is oriented uphill.

3. The all-terrain vehicle of claim 2, further comprising at least one accelerometer, the controller being configured to determine the all-terrain vehicle is oriented uphill based upon measurements from the at least one accelerometer.

4. The all-terrain vehicle of claim 2, wherein the all-terrain vehicle comprises an active descent mode, the controller being configured to determine the all-terrain vehicle is moving backwards based upon the active descent mode being active.

5. The all-terrain vehicle of claim 2, further comprising a vehicle speed sensor, the controller being configured to determine the all-terrain vehicle is moving backwards based upon measurements from the vehicle speed sensor.

6. The all-terrain vehicle of claim 2, further comprising a sensor, the controller being configured to determine the all-terrain vehicle is moving backwards is based upon the sensor indicating a clutch of the all-terrain vehicle is disengaged.

7. The all-terrain vehicle of claim 2, further comprising a throttle sensor, wherein to determine the all-terrain vehicle is moving backwards, the controller is configured to:

determine the all-terrain vehicle is moving after being stationary; and determine the all-terrain vehicle will not move forward in response to a throttle signal received from the throttle sensor.

8. The all-terrain vehicle of claim 1, further comprising at least one global positioning satellite (GPS) receiver, the controller being configured to determine the all-terrain vehicle is moving backwards based upon measurements from the at least one GPS receiver.

9. The all-terrain vehicle of claim 1, further comprising a wheel speed sensor, the controller being configured to determine the all-terrain vehicle is moving backwards based upon measurements from the wheel speed sensor.

10. The all-terrain vehicle of claim 1, further comprising a brake system, the controller being configured to:

receive a brake signal from the brake system; and enable an anti-lock braking mode in response to the brake signal.

11. A computer-implemented method for controlling a back-up camera installed on an all-terrain vehicle, the method comprising:

receiving a signal from a shiftable transmission of the all-terrain vehicle, the shiftable transmission comprising a plurality of gears having a plurality of configurations including a reverse configuration to cause rearward movement of the all-terrain vehicle, a forward configuration to cause forward movement of the all-terrain vehicle, and a neutral configuration, and the signal corresponding to the shiftable transmission being in a configuration of the plurality of configurations other than the reverse configuration;

determining the all-terrain vehicle is moving backwards; and automatically displaying on a display an output of the back-up camera in response to the signal corresponding to the shiftable transmission being in the configuration other than the reverse configuration and the all-terrain vehicle is moving backwards.

12. The method of claim 11, wherein determining the all-terrain vehicle is moving backwards comprises determining the all-terrain vehicle is oriented uphill.

13. The method of claim 12, further comprising receiving measurements from at least one accelerometer, wherein determining the all-terrain vehicle is oriented uphill is based upon the measurements from the at least one accelerometer.

14. The method of claim 12, wherein the all-terrain vehicle comprises an active descent mode, wherein determining the all-terrain vehicle is moving backwards is based upon the active descent mode being active.

15. The method of claim 11, further comprising receiving measurements from at least one global positioning system (GPS) sensor, wherein determining the all-terrain vehicle is moving backwards is based upon the measurements from the at least one GPS sensor.

16. The method of claim 11, further comprising receiving measurements from a wheel speed sensor, wherein determining the all-terrain vehicle is moving backwards is based upon the measurements from the wheel speed sensor.

17. The method of claim 11, further comprising receiving measurements from a vehicle speed sensor, wherein determining the all-terrain vehicle is moving backwards is based upon the measurements from the vehicle speed sensor.

18. The method of claim 11, further comprising receiving measurements from a sensor, wherein determining the all-terrain vehicle is moving backwards is based upon the measurements from the sensor indicating a clutch of the all-terrain vehicle is disengaged.

19. The method of claim 11, further comprising receiving measurements from a throttle sensor, wherein determining the all-terrain vehicle is moving backwards is based upon the measurements from the throttle sensor.

* * * * *